(12) United States Patent
Petrenko

(10) Patent No.: US 6,870,139 B2
(45) Date of Patent: Mar. 22, 2005

(54) SYSTEMS AND METHODS FOR MODIFYING AN ICE-TO-OBJECT INTERFACE

(75) Inventor: Victor Petrenko, Lebanon, NH (US)

(73) Assignee: The Trustees of Dartmouth College, Hanover, NH (US)

(*) Notice: Subject to any disclaimer, the term of this patent is extended or adjusted under 35 U.S.C. 154(b) by 0 days.

(21) Appl. No.: 10/364,438

(22) Filed: Feb. 11, 2003

(65) Prior Publication Data

US 2003/0155467 A1 Aug. 21, 2003

Related U.S. Application Data

(60) Provisional application No. 60/356,476, filed on Feb. 11, 2002, provisional application No. 60/398,004, filed on Jul. 23, 2002, and provisional application No. 60/404,872, filed on Aug. 21, 2002.

(51) Int. Cl.$^7$ ................................................ H05B 3/02
(52) U.S. Cl. ........................ 219/482; 219/201; 219/202; 219/213; 219/492
(58) Field of Search ................................ 219/200, 201, 219/202, 203, 213, 220, 482, 492, 209, 490; 37/197, 195, 227; 392/424; 404/77, 79, 95

(56) References Cited

U.S. PATENT DOCUMENTS

| 1,157,344 A | 10/1915 | Thomson |
| 1,656,329 A | 1/1928 | Sievert et al. |
| 2,496,279 A | 2/1950 | Ely et al. |
| 2,870,311 A | 1/1959 | Greenfield et al. |
| 3,204,084 A | 8/1965 | Spencer, Jr. et al. |
| 3,316,344 A | 4/1967 | Kidd et al. |
| 3,318,345 A | 5/1967 | Toms et al. |
| 3,790,752 A | 2/1974 | Boaz et al. |
| 3,809,341 A | 5/1974 | Levin et al. |

(List continued on next page.)

FOREIGN PATENT DOCUMENTS

| GB | 2 106 966 A | 4/1981 |
| GB | 2 252 285 A | 5/1992 |
| JP | 405292638 A | 11/1993 |
| JP | 407023520 A | 1/1995 |
| WO | WO 00/24634 | 5/2000 |
| WO | WO 00/33614 | 6/2000 |
| WO | WO 00/52966 | 9/2000 |
| WO | WO 01/49564 | 7/2001 |

OTHER PUBLICATIONS

Petrenko, Victor F., "The effect of static electric fields on ice friction", Journal of Applied Physics, Jul. 15, 1994, pp. 1216–1219, vol. 76, No. 2.

Petrenko, Victor F. and Colebeck, Samuel C., "Generation of electric fields by ice and snow friction", Journal of Applied Physics, May 1, 1995, pp. 4518–4521, vol. 77, No. 9.

"Everstart Automotive", http://www.everstart-batteries.com/products/use/automotive.asp, May 5, 2003, 1 page.

"Maxwell Technologies: Ultracapacitors–Boostcap PC2500", http://www.maxwell.com/ultracapacitors/products/PC2500.html, May 5, 2003, 2 pages.

(List continued on next page.)

*Primary Examiner*—Tu Hoang
(74) *Attorney, Agent, or Firm*—Lathrop & Gage, L.C.

(57) ABSTRACT

Systems and methods for thermally modifying an ice-to-object interface. One system includes a power supply configured to generate a magnitude of power. The magnitude of the power is sufficient to melt an interfacial layer of ice at the interface; typically the interfacial layer has a thickness in a range one micron to one millimeter. A controller may be used to limit the duration in which power supply generates the magnitude of the power, to limit unneeded heat energy dissipation into the environment. Modulating the pulsed heating energy to the interface modifies a coefficient of friction between the object and the ice.

35 Claims, 62 Drawing Sheets

U.S. PATENT DOCUMENTS

| | | |
|---|---|---|
| 3,825,371 A | 7/1974 | Roder et al. |
| 3,835,269 A | 9/1974 | Levin et al. |
| 3,915,883 A | 10/1975 | VanMeter et al. |
| 3,964,183 A * | 6/1976 | Mouat ......................... 219/220 |
| 3,971,056 A | 7/1976 | Jaskolski et al. |
| 4,082,962 A | 4/1978 | Burgsdorf et al. |
| 4,085,338 A | 4/1978 | Genrikh et al. |
| 4,119,866 A | 10/1978 | Genrikh et al. |
| 4,135,221 A | 1/1979 | Genrikh et al. |
| 4,137,447 A | 1/1979 | Boaz |
| 4,190,137 A | 2/1980 | Shimada et al. |
| 4,278,875 A | 7/1981 | Bain |
| 4,321,296 A | 3/1982 | Rougier |
| 4,330,703 A | 5/1982 | Horsma et al. |
| 4,638,960 A | 1/1987 | Straube et al. |
| 4,690,353 A | 9/1987 | Haslim et al. |
| 4,732,351 A | 3/1988 | Bird |
| 4,737,618 A | 4/1988 | Barbier et al. |
| 4,760,978 A | 8/1988 | Schuyler et al. |
| 4,773,976 A | 9/1988 | Vexler |
| 4,814,546 A | 3/1989 | Whitney et al. |
| 4,875,644 A | 10/1989 | Adams et al. |
| 4,887,041 A | 12/1989 | Mashikian et al. |
| 4,897,597 A | 1/1990 | Whitener |
| 4,950,950 A | 8/1990 | Perry et al. |
| 4,985,313 A | 1/1991 | Penneck et al. |
| 5,109,140 A | 4/1992 | Nguyen |
| 5,112,449 A | 5/1992 | Jozefowicz et al. |
| 5,143,325 A | 9/1992 | Zieve et al. |
| 5,144,962 A | 9/1992 | Counts et al. |
| 5,218,472 A | 6/1993 | Jozefowicz et al. |
| 5,344,696 A | 9/1994 | Hastings et al. |
| 5,398,547 A | 3/1995 | Gerardi et al. |
| 5,411,121 A | 5/1995 | LaForte et al. |
| 5,496,989 A | 3/1996 | Bradford et al. |
| 5,523,959 A | 6/1996 | Seegmiller |
| 5,551,288 A | 9/1996 | Geraldi et al. |
| 5,605,418 A | 2/1997 | Watanabe et al. |
| 5,744,704 A | 4/1998 | Hu et al. |
| 5,861,855 A | 1/1999 | Arsenault et al. |
| 5,873,254 A | 2/1999 | Arav |
| 5,902,962 A | 5/1999 | Gazdzinski |
| 5,947,418 A | 9/1999 | Bessiere et al. |
| 6,018,152 A | 1/2000 | Allaire et al. |
| 6,027,075 A | 2/2000 | Petrenko |
| 6,031,214 A | 2/2000 | Bost et al. |
| 6,129,314 A | 10/2000 | Giamati et al. |
| 6,145,787 A | 11/2000 | Rolls |
| 6,194,685 B1 | 2/2001 | Rutherford |
| 6,227,492 B1 | 5/2001 | Schellhase et al. |
| 6,239,601 B1 | 5/2001 | Weinstein |
| 6,279,856 B1 | 8/2001 | Rutherford et al. |
| 6,297,165 B1 | 10/2001 | Okumura et al. |
| 6,297,474 B1 | 10/2001 | Kelly et al. |
| 6,330,986 B1 | 12/2001 | Rutherford et al. |
| 6,396,172 B1 | 5/2002 | Couture |
| 6,427,946 B1 | 8/2002 | Petrenko |
| 6,492,629 B1 | 12/2002 | Sopory |
| 2001/0052731 A1 | 12/2001 | Petrenko |
| 2002/0017466 A1 | 2/2002 | Petrenko |
| 2002/0092849 A1 | 7/2002 | Petrenko |
| 2002/0096515 A1 | 7/2002 | Petrenko |
| 2002/0118550 A1 | 8/2002 | Petrenko et al. |
| 2002/0170909 A1 | 11/2002 | Petrenko |
| 2002/0175152 A1 | 11/2002 | Petrenko |
| 2003/0024726 A1 | 2/2003 | Petrenko |

OTHER PUBLICATIONS

Petrenko, V.F. and Schulson, E.M., "Action of Electric Fields on the Plastic Deformation of Pure and Doped Ice Single Crystals", Philosophical Magazine A, 1993, pp. 173–185, vol. 67, no. 1.

Reich, A., AIA 94–0714, "Interface Influences Upon Ice Adhesion to Airfoil Materials", BFGoodrich Aerospace/De–icing Systems, Brecksville/Uniontown, OH (32$^{nd}$ Aerospace Sciences Meeting and Exhibit, Jan. 10–13, 1994), pp. 1–8.

"Icing Wind Tunnel", Meeting the Challenges of Ice Testing in a World–Class Facility—BFGoodrich Aerospace Ice Protection Systems, 4 pages.

Phillips, Edward H., "New Goodrich Wind Tunnel Tests Advanced Aircraft De–Icing Systems", Uniontown, Ohio, Aviation Week Magazine, Oct. 3, 1988, 3 pages.

"The Evolution of Ice Protection Creates a Revolution in Ice Detection", BFGoodrich Aerospace Ice Protection Systems, 2 pages.

Petrenko, Victor F., "Electromechanical Phenomena in Ice", Thayer School of Engineering Special Report 96–2; Feb. 1996.

Petrenko, Victor F., "Study of the Surface of Ice, Ice/Solid and Ice–Liquid Interfaces with Scanning Force Microscopy", Journal of Physical Chemistry B., 1997, 1001; 6285–6289.

Petrenko, V.F. and Peng, S., "Reduction of Ice Adhesion to Metal by Using Self–Assembling Monolayers (SAMs)", Canadian Journal of Physics, Jan./Feb. 2003, pp. 387–393, vol. 81, no. ½.

Petrenko, Victor F., "The effect of static electric fields on proton conductivity of single ice crystals", Philosophical Magazine B, 1992, pp. 341–353, vol. 66, no. 3.

Courville, Zoe and Petrenko, V.F., "De–icing Layers of Interdigitated Microelectrodes", Mat. Res. Soc. Symp. Proc. 2000, pp. 329–334, vol. 604.

Petrenko, V.F. and Qi, Suogen, "Reduction of Ice Adhesion to Stainless Steel by Ice Electrolysis", Journal of Applied Phy7sics, pp. 5450–5454, Nov. 1999, vol. 86, no. 10.

Petrenko, Victor F. and Whitworth, Robert W., *Physics of Ice*, © 1999, pp. 1–373, Oxford University Press, Oxford, New York.

International Search Report for PCT/US99/28330, completed May 5, 2000.

Best, Christian Michael (Authorized Officer), International Search Report for PCT/US00/35529, completed Feb. 5, 2001, 2 pages.

Smith, Dianne for Hoang, Tu (Authorized Officer), International Search Report for PCT/US00/05665, completed Jun. 26, 2000, 2 pages.

Poon, Peter (Authorized Officer), International Search Report for PCT/US99/25124, completed Jan. 5, 2000, 1 page.

Charles Jordan, Examiner, U.S. Patent Office, "International Search Report", U.S. Patent Office (Washington, D.C.), p. 1, (Nov. 3, 1998).

* cited by examiner

SYSTEMS AND METHODS FOR MODIFYING AN ICE-TO-OBJECT INTERFACE

RELATED APPLICATIONS

This application claims the benefit of U.S. provisional application Ser. No. 60/356,476, filed Feb. 11, 2002 and incorporated herein by reference. This application also claims the benefit of U.S. provisional application Ser. No. 60/398,004, filed Jul. 23, 2002 and incorporated herein by reference. This application also claims the benefit of U.S. provisional application Ser. No. 60/404,872, filed Aug. 21, 2002 and incorporated herein by reference.

BACKGROUND

Ice presents many problems to a variety of industries. An example of one such problem can be found in the aviation industry when ice forms on surfaces of an aircraft. Ice on a surface of an aircraft, such as a wing, can create hazardous conditions for the aircraft, particularly while the aircraft is in flight. Another example can be found in the ground transportation industry when ice forms on a windshield of an automobile. Ice on the windshield can create a hazardous driving environment for the driver of the automobile. Removing the ice from such surfaces can minimize hazardous conditions.

Present systems for removing ice include electric heaters that apply power to resistive elements to generate heat. Other present systems include chemical solutions that generate chemical reactions to thermally dissolve the ice. The electric heaters apply a magnitude of power to a resistive element to directly and proportionally melt all ice from the surface in contact with the electric heaters. The chemical solutions may thermally dissolve the ice but do not last for extended periods of time and produce undesirable conditions for the natural environment. These systems are inefficient since they seek to completely melt all of the ice.

Methods to remove ice include using a mechanical scrapper. Mechanical scrappers are often used to address the problem of ice adhering to an object's surface. However, mechanical scrappers are often hand-held and unwieldy to operate. Furthermore, mechanical scrappers are not always effective in removing ice and may damage the surface to which the ice has adhered.

Failure to properly remove ice from the surface of an object can have potentially catastrophic results. For example, an overabundance of ice on an aircraft in flight can dangerously reduce lift force of the aircraft and deny proper operation of some aircraft components. Another example includes a build up of ice on an automobile windshield; if the ice is not removed, a driver's vision may become impaired to the point that the driver will no longer be able to properly navigate the vehicle.

SUMMARY OF THE INVENTION

The following commonly owned patents and patent applications provide useful background and are thus incorporated herein by reference: U.S. Pat. No. 6,027,075; U.S. Pat. No. 6,427,946; PCT application PCT/US99/25124, filed 26 Oct. 1999; PCT application PCT/US99/28330, filed 30 Nov. 1999; PCT application PCT/US02/01858, filed 22 Jan. 2002; PCT application PCT/US00/35529, filed 28 Dec. 2000; U.S. patent application Ser. No. 09/971,287, filed on 4 Oct. 2001; and U.S. patent application Ser. No. 09/970,555, filed on 4 Oct. 2001.

In one aspect, a pulse de-icer system heats an interface to a surface of an object so as to disrupt adhesion of ice and/or snow (as used herein, ice and/or snow may sometimes be denoted as "ice") with the surface. To reduce the energy requirement, one embodiment of a pulse de-icer explores a very low speed of heat propagation in non-metallic solid materials, including ice and snow, and applies heating power to the interface for time sufficiently short for the heat to escape far from the interface zone; accordingly, most of the heat is used to heat and melt only very thin layer of ice (hereinafter "interfacial ice"). The system includes a power supply configured to generate a magnitude of power. In one aspect, the magnitude of the power has a substantially inverse-proportional relationship to a magnitude of energy used to melt ice at the interface. The pulse de-icer system may also include a controller configured to limit a duration in which the power supply generates the magnitude of the power. In one aspect, the duration has a substantially inverse-proportional relationship to a square of the magnitude of the power. The power supply may further include a switching power supply capable of pulsing voltage. The pulsed voltage may be supplied by a storage device, such as a battery or a capacitor. The battery or capacitor can, thus, be used to supply power to a heating element that is in thermal communication with the interface. Optionally, the pulsed voltage may be directly applied to a heating element so as to disrupt the adhesion of ice at the surface. In another aspect, the heating element includes a thin film of conductive material or a thin film that includes a semiconductor material. The semiconductor material does not preclude vision through the thin film, to facilitate use with a car windshield, for example as the "object." The power supply may modulate power to the semiconductor material to convert the power into thermal energy. The modulated power transfers an appropriate magnitude of thermal energy that can disrupt the adhesion of the ice to the surface.

In certain aspects, the capacitor is either a supercapacitor or an ultracapacitor. In certain other aspects, the power supply is a flywheel and/or a high voltage power supply. Power from the power supply can be converted into thermal energy for disrupting the adhesion of ice to the surface of the object. For example, the system may use the power supply to remove ice and snow from the surface of an aircraft, a tire, an automobile windshield, a boat, a road, a bridge, a sidewalk, a freezer, a refrigerator, a building, a runway, or a window. Those skilled in the art will understand that other objects may be de-iced with a pulse de-icer system.

In another aspect, a thermal transfer system uses a heat storage sub-system connected with a heating element. The heating element may include a thermally conductive material such as a metal. The heating element may further include a membrane attached to the heating element. The membrane is for example inflatable such that when the membrane is inflated, heat is deterred from transferring to the surface of the object to be de-iced. As the membrane deflates, the heating element transfers thermal energy to the surface to disrupt the adhesion of ice to the surface. The membrane can be frequently inflated and deflated to modulate the thermal energy transfer to the surface.

In another aspect of a thermal transfer system, the heating element includes two regions of thermally conductive material separated by a thermal insulator. At least one of the regions of the thermally conductive material is moveably attached to the thermal insulator such that when the regions are positioned in a particular way, the two regions physically contact one another. The movement of at least one of the regions may be modulated at a certain frequency such that one region of thermally conductive material transfers an appropriate magnitude of thermal energy to the other region. The transfer of thermal energy thereby disrupts the adhesion of ice to the surface of the other region.

In one aspect, a method is provided to thermally modify interfacial ice at the interface between an object and ice. The method includes the step of applying heating energy to the interface to melt an interfacial layer of ice. The step of applying is then limited in duration so that heating energy applied to the interface has a heat diffusion distance within the ice that extends no more than through the thickness of the interfacial layer of ice.

In one aspect, the step of applying heating energy includes the step of applying power at the interface with a magnitude that is at least about inverse proportional to a magnitude of energy used to melt the interfacial layer of ice. In a related aspect, the step of limiting duration includes the step of limiting duration of the step of applying power at the interface such that the duration is at least about inverse proportional to a square of the magnitude of the power.

In one aspect, the step of applying heating energy includes the step of applying power to the interface with a magnitude that is substantially inverse proportion to a magnitude of energy used to melt the interfacial ice, and the step of limiting duration includes the step of limiting the duration so that the duration is substantially inverse proportion to a square of the magnitude of the power.

In one aspect, the method includes the further step of facilitating refreezing of the interfacial layer of the ice to affect a coefficient of friction between the object and the ice. By way of example, the step of facilitating may include one or more of the following steps: (1) waiting for refreezing after the step of limiting duration; (2) blowing cold air at the interface; and (3) misting water at the interface.

In certain aspects herein, the object is one of an aircraft structure, a windshield, a mirror, a headlight, a power line, a ski lift structure, a rotor surface of a windmill, a rotor surface of a helicopter, a roof, a deck, a building structure, a road, a bridge structure, a freezer structure, an antenna, a satellite, a railroad structure, a tunnel structure, a cable, a road sign, a snowshoe, a ski, a snowboard, a skate, and a shoe.

In another aspect, the step of applying heating energy to the interface includes the step of applying heating energy to the interface to melt an interfacial layer of ice having a thickness that is less than about five centimeters. In one aspect, the method step limits the duration such that the interfacial layer of ice has a thickness that is less than about one millimeter. In a related aspect, heat diffusion distance is further restricted by limiting pulse duration such that the thickness of interfacial ice is between about one micron and one millimeter.

In one aspect, the step of limiting duration applies the heating energy to the interface for a maximum of 100 s. In another aspect, the step of limiting duration limits duration of applied heat energy to between about 1 ms to 10 s.

In another aspect, the step of applying heating energy to the interface includes the step of applying power to a heating element in thermal communication with the interface, within the object, and/or in contact with the interface. In a related aspect, the step of applying heating energy may include the step of electrically resisting the power with the heating element.

In one aspect, the steps applying and limiting are repeated in a periodic manner to generate a desired coefficient of friction between the object and the ice.

In one aspect, power is reapplyied at the interface after the interfacial layer refreezes to selectively control a coefficient of friction between the ice and the object while the object moves over the ice.

Those skilled in the art appreciate that, in certain aspects, ice may include or be replaced by snow without departing from the scope hereby.

In one aspect, the object is a slider such as a shoe, a snowboard, or a ski.

A method is also provided for controlling a coefficient of friction between an object and ice, including the steps of:

(1) pulsing power to an interface between the object and the ice to melt an interfacial layer of ice at the interface and decrease the coefficient of friction;

(2) facilitating refreezing of the interfacial ice at the interface to increase the coefficient of friction; and (3) repeating steps (1) and (2) in a controllable manner to control an average coefficient of friction between the object and the ice.

In one aspect, the step of facilitating refreezing includes the step of moving the object over the ice to decrease temperature of the object. For example, a car tire may be heated and then rotated (during car motion) to put the heated tire in contact with an ice-covered road, to facilitate refreezing.

In one aspect, the step of pulsing power includes the steps of blowing first air onto the object (e.g., a vehicle tire), the first air having a temperature above freezing, and moving the object in contact with the ice. In a related aspect, the step of facilitating refreezing includes the step of blowing second air onto the object (e.g., the tire), the second air having a temperature less than the temperature of the first air.

A slider is also provided, the slider having a surface intended to interface with ice or snow. A power supply (e.g., a battery) generates power. A heating element is configured to convert the power to heat at the surface, the heat being sufficient to melt an interfacial layer of ice at the interface. A controller controls delivery of power to the heating element to control a coefficient of friction between the slider and the ice or snow.

By way of example, the slider may take the form a shoe, a snowboard, a ski, or a snowshoe.

In one aspect, the slider is in a form of a ski, a skate or a snowboard, and the controller is responsive to user commands to modulate power applied to the surface such that speed of the slider is controllable. In this manner, for example, a skier may control her speed down the ski slope, as desired.

In still another aspect, a windshield de-icer is provided. The windshield deicer has a windshield and a substantially transparent heating element disposed with the windshield that generates heat in response to applied power in a magnitude sufficient to melt an interfacial layer of ice on the windshield.

In one aspect, the heating element is selected from visually transparent semiconductor material having an electron gap larger than about 3 eV. For example, the material may be one of ZnO, ZnS, and mixtures thereof.

In another aspect, the heating element is selected from transparent conductor material. For example, the transparent conductor material may be one of indium tin oxide (ITO), tin oxide, thin metal films, and mixtures thereof.

DETAILED DESCRIPTION OF THE DRAWINGS

Figure 1:
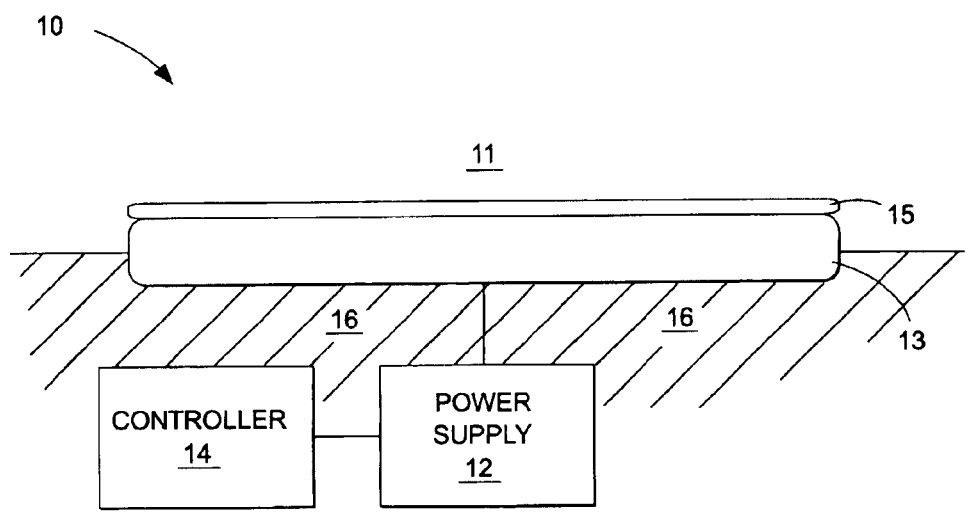
FIG. 1 shows one pulse de-icer system for modifying an interface between an object and ice.

Certain embodiments described below pertain to systems and methods for modifying an interface between an object and ice. In one embodiment, for example, a system applies energy to the interface between ice (or snow) and a surface of an object to remove ice from the surface, in order to "de-ice" the object. In another embodiment, for example, a system modulates melting at an interfacial layer of ice at an ice-object interface such that a melted interfacial layer quickly refreezes to modify the coefficient of friction between the object surface and ice.

Certain embodiments of de-icers or sliders utilize alternating current (AC) high frequency (HF) power sources, while other embodiments of de-icers or sliders utilize direct current (DC) power sources and/or thermal energy transfer systems (e.g., heat storage system).

Certain sections below are categorized with the following headings: Pulse De-Icer Systems; Heating Elements As Used In Pulse De-Icer Systems; Pulse De-Icer System Analysis; HF De-Icer Systems; Interdigitated Circuit For Use In An HF De-Icer System; HF De-Icer System Analysis; Thermal Transfer De-Icer Systems; Thermal Transfer De-Icer System Analysis; Methods Of Coefficient Of Friction Manipulation; and Coefficient Of Friction Manipulation Analysis.

In certain sections describing pulse de-icer systems, for example, certain embodiments describe operations of removing ice by melting an interfacial layer of the ice adhering to a surface of an object. Heating elements of certain pulse de-icer systems may also be used to melt the interfacial layer, such as through an electrical connection to a DC or AC power supply. Certain other embodiments of pulse de-icer systems modulate heating at the ice-to-object interface such that the object refreezes (during a cycle of non-heating) and a coefficient of friction changes between the object and the ice. Certain pulse de-icers operate as or with a slider, as discussed hereinbelow.

In certain sections describing HF de-icer systems, for example, certain embodiments describe operations of removing ice by melting an interfacial layer of the ice that adheres to a surface of an object. Interdigitated electrodes of certain HF de-icer systems may be used to melt the interfacial layer and may be powered with an AC power supply, for example.

Certain other embodiments of the HF de-icer systems may be used to modify a coefficient of friction between ice and a "slider." As used herein, a "slider" is an object that may interface with ice and/or snow; it may "slide" thereon due to interaction with the ice and/or snow and the coefficient of friction between the slider and the ice and/or snow. Examples of sliders include, but are not limited to, tires;

skis; snowboards; shoes; snowmobile tracks; sleds; aircraft landing gear, et cetera.

In certain sections describing thermal transfer de-icer systems, for example, certain embodiments are used to remove ice by melting an interfacial layer of the ice adhering to a surface of an object. The thermal transfer de-icer systems can be described to include heat storage sub-systems which store thermal energy. The thermal energy in these storage sub-systems may be transferred to a heating element that is in thermal communication with the object-to-ice interface. Certain embodiments of thermal transfer de-icer systems thus store thermal energy and transfer that energy to an object-to-ice interface selectively and/or in a controllable manner.

Certain other embodiments below describe systems that modify a coefficient of friction between ice and a slider by melting an interfacial layer of the ice adjacent to the slider. Once melted, the interfacial layer of ice refreezes to create a bond between the slider and the ice. This bond acts as a "brake" which increases the coefficient of friction to the slider and the ice. Such systems then re-melt the interfacial layer to break the bond, again modifying the coefficient of friction. This modulated interaction of freeing and refreezing at the object-to-ice interface may control the coefficient of friction to a desired amount. This controlled coefficient of friction is for example useful in devices such as cross-country skis, snow shoes, shoes, tires, snowboards, skates, and other devices which interact with ice and snow.

Pulse De-icer Systems

Pulse de-icer systems are now described. The pulse de-icer systems may be used to remove ice from a surface of an object. The following systems may also be used to melt an interfacial layer of ice and/or to modify a coefficient of friction of an object-to-ice interface, as described in more detail below.

FIG. 1 shows one pulse de-icer system 10 for modifying an interface 15 between an object 16 and ice 11. System 10 includes power supply 12, controller 14, and heating element 13. In one embodiment, power supply 12 is configured for generating power with a magnitude that is substantially inversely proportional to a magnitude of energy used to melt interfacial ice (hereinafter "interfacial ice") at interface 15. Heating element 13 is coupled to power supply 12 to convert the power into heat at interface 15. Controller 14 is coupled to the power supply 12 to limit a duration in which heating element 13 converts the power into heat. In one embodiment, the duration in which heating element 13 converts the power into heat at interface 15 is substantially inversely proportional to a square of the magnitude of the power.

More particularly, when a heating power density W (watt/m$^2$) is applied for time t to an interface between ice and a substrate, the heat propagates in a distance $l_{Di}$ in ice and in a distance $l_{DS}$ in the substrate. The thickness of these heated layers and their respective heat capacities then determine how much heat is absorbed. If $\lambda_i$ and $\lambda_S$ are respective thermal conductivities of the ice and substrate, $\rho_I$ and $\rho_S$ are respective densities, and $C_i$ and $C_S$ are the respective specific heat capacities, then for a heat flux $Q_i$ in ice and a heat flux $Q_S$ in the substrate, one skilled in the art of heat exchange will then appreciate the following:

$$Q_i \approx C_i l_{Di} \rho_i (T_m - T) \quad \text{(Eq. 0-1)}$$

where $T_m - T$ is the temperature change of the interface, $$Q_S \approx C_S l_{DS} \rho_S (T_m - T) \quad \text{(Eq. 0-2)}$$

$$l_{Di} = \sqrt{\frac{\lambda_i t}{\rho_i C_i}} \quad \text{(Eq. 0-3)}$$

$$l_{DS} = \sqrt{\frac{\lambda_S t}{\rho_S C_S}} \quad \text{(Eq. 0-4)}$$

Solving Eq. (0-1)–Eq. (0-4) for the total amount of heat escaped from the interface, one can find:

$$Q = Q_i + Q_S \approx W \cdot t = \frac{(T_m - T)^2}{W}\left[\sqrt{\rho_i c_i \lambda_i} + \sqrt{\rho_S c_S \lambda_S}\right] \quad \text{(Eq. 0-5)}$$

where W is density of heating power on the interface.

In one embodiment, therefore, the above algebraic analysis returns an approximate result for power requirements within one pulse de-icer system and associated method. An accurate mathematical consideration solves a system of partial differential equations to predict, for a de-icing time t and de-icing energy Q, the following exemplary embodiment:

In the example, controller 14 may control the time in which power is delivered to heating element 13 according to the following relationship:

$$t = \frac{\pi(T_m - T)^2}{4W^2}\left[\sqrt{\lambda_i \rho_i c_i} + \sqrt{\lambda_S \rho_S c_S}\right]^2, \quad \text{(Eq. 1-1)}$$

where
$T_m$ is an ice melting temperature, T is an ambient temperature, $\lambda$ is a thermal conductivity coefficient, $\rho$ is the material density, and C is the material heat capacity (subscript "i" denotes ice and/or snow and subscript "s" denotes substrate material) and W is a power per square meter.

In the example, controller 14 also controls the magnitude of power that is delivered to heating element 13 such that energy Q at interface 15 is substantially inversely proportional to the magnitude of power. In the example, controller 14 controls the magnitude of power according the following relationship:

$$Q = W \cdot t = \frac{\pi(T_m - T)^2}{4W}\left[\sqrt{\rho_i c_i \lambda_i} + \sqrt{\rho_S c_S \lambda_S}\right]^2. \quad \text{(Eq. 1-2)}$$

Accordingly, to reach a desired temperature (e.g., to melt ice at interface 15) with less energy, one increases heating power W while applying the heating power over a shorter period of time. By way of comparison, the simplified analysis result of Eq. 0-5 differs from the more precise solution of Eq. 1-2 by a factor of $\pi/4=0.785$. These equations are particularly useful to describe short power pulses when a heat diffusion length is less then the target object thickness (e.g., the thickness of interfacial ice within interface 15).

In one embodiment, a more accurate approximation is found by adding the energy used to melt a very thin layer of interfacial ice and to heat a thin heater of thickness $d_{heater}$, $Q_{min}$:

$$Q_{min} = l_i \cdot q_i \cdot \rho_i + d_{heater} C_{heater} \rho_{heater}(T_m - T), \quad \text{(Eq. 1-3)}$$

where
$l_i$ is melted layer thickness, $\rho_i$ is ice density, $q_i$ is ice latent heat of fusion, and $C_{heater}$ and $\rho_{heater}$ are heater specific heat capacity and density, respectively. Accordingly, in the example, controller 14 may control the magnitude of power according the following relationship:

$$Q = \frac{\pi(T_m - T)^2}{4W}\left[\sqrt{\rho_i c_i \lambda_i} + \sqrt{\rho_s c_s \lambda_s}\right]^2 + \quad \text{(Eq. 1-4)}$$
$$d_i \cdot q_i \cdot \rho_i + d_{heater} C_{heater} \rho_{heater}(T_m - T)$$

The energy of Eq. 1-4 is given per square meter ($J/m^2$). Convective heat exchange can also be added to Eq. 1-4; but that term is usually neglected due to very short heating-pulse duration. When the substrate and/or ice layer is thinner than the heat diffusion lengths (Eq. 0-3, Eq. 0-4, respectively), the energy is even less than that in Eq. 1-4.

In illustrative operation, system 10 may for example be used with an automobile to remove ice 11 from a windshield (as object 16). In this example, heating element 13 is transparent and embedded in the windshield 16, and power supply 12 and controller 14 cooperate to provide power that is sufficient to melt interfacial ice at interface 15 in accordance with Eqs. 1-1 and 1-2.

To further illustrate operation of system 10, consider the properties of ice:

$$\lambda_i = 2.2 W\ m^{-1}K^{-1},\ \rho_i = 920\ kg\ m^{-3},\ c_i = 2\ kJ\ kg^{-1}K^{-1}, q_i = 333.5\ kJ\ kg^{-1}. \quad \text{(Eq. 1-5)}$$

The properties of a typical windshield (e.g., as the substrate) are:

$$\lambda_s \approx 1 W\ m^{-1}K^{-1},\ \rho_s \approx 3000\ kg\ m^{-3}, c_s \approx 1.54\ kJ\ kg^{-1}K^{-1}. \quad \text{(Eq. 1-6)}$$

According to Eq. 1-1, the time it takes to reach the ice melting point (0° C.) starting at −10° C. and at a power rate of 100 kW/m² is t≈0.142 second with a glass or glass-like substrate 16. The correction from Eq. 1-3 may add about 0.016 second to the duration, i.e. about 10%. Reducing the peak heating power by a factor of ten (e.g., from 100 kW/m² to 10 kW/m²) further increases this time by about two orders of magnitude. Comparatively, at −30° C., the total de-icing time at W=100 k W/m² can be as long as 1.42 second. A corresponding total de-icing energy Q at W=100 kW/m² and −10° C. may thus be defined as:

$$Q = 100\ kW/m^2 \cdot 0.158\ sec = 15.8\ \frac{kJoule}{m^2}. \quad \text{(Eq. 1-7)}$$

At the same temperature of −10° C. and a lower power of W=10 kW/m², however, the energy Q given by Eq. 1-4 is:

$$Q = 144\ k\frac{Joule}{m^2}. \quad \text{(Eq. 1-8)}$$

This result is by almost one order of magnitude larger than at W=100 kwatt/m².

One advantage of the foregoing example is that a decreased de-icing energy is used, as compared to prior art systems, by about one order of magnitude by increasing the power rate by about one order of magnitude and while shortening the time of applied power by about two orders of magnitude. By limiting the time power is applied to interface 15, the drain of heat energy into the environment and into bulk ice 11 is limited. Instead, more energy remains conformed to interface 15 for melting interfacial ice as a result of shorter power pulses.

Figure 2:
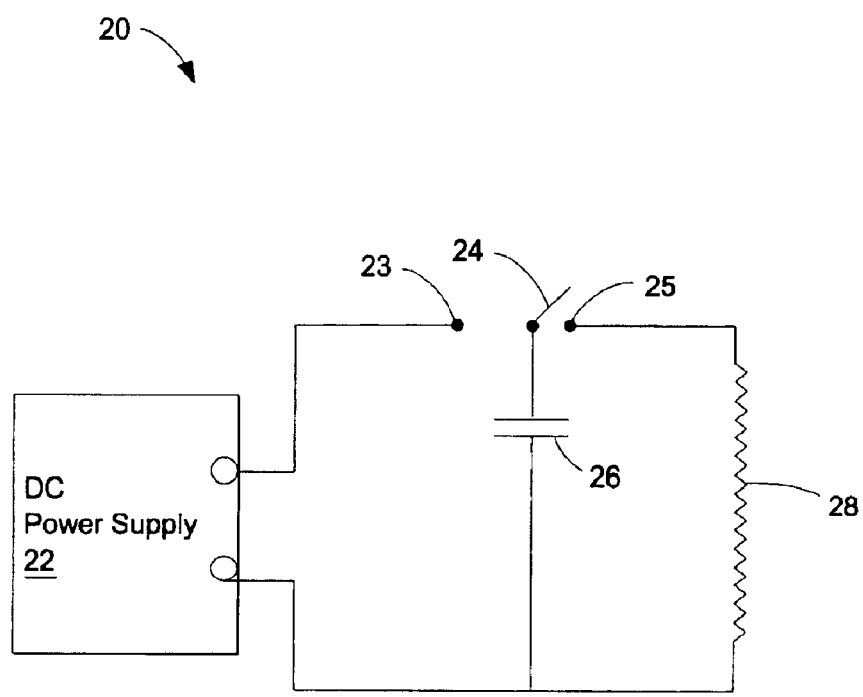
FIG. 2 shows one pulse de-icer system.

FIG. 2 shows one pulse de-icer system 20 in accord with one embodiment. De-icer system 20 has a DC power supply 22, a charge capacitor 26, a resistive heating element 28, and a switch 24. DC power supply 22 is configured for supplying power to charge capacitor 26 when switch 24 is closed on node 23. Capacitor 26, when cooperatively coupled to resistive heating element 28 via node 25, is configured for supplying a magnitude of power in accordance with the equations of FIG. 1. Switch 24 is for example operatively controlled by a controller or a microprocessor to pulse current from capacitor 26 into resistive heating element 28 as switch 24 closes on node 25, in accordance with Eq. 1-1 of FIG. 1. In one example, DC power supply 22 charges capacitor 26 when switch 24 is closed on node 23. Once capacitor 26 is charged, switch 24 opens and then closes on node 25 to discharge current into resistive heating element 28. Resistive heating element 28 then generates sufficient heating power to melt an interfacial layer of ice at the object interface (e.g., interface 15, FIG. 1). Depending on the application of pulse de-icer system 20, melting the interfacial layer is useful to remove ice from a surface of an object, prevent its formation on the surface, and/or modify its adhesion strength and/or change a coefficient of friction between the ice or snow and the object.

Figure 3:
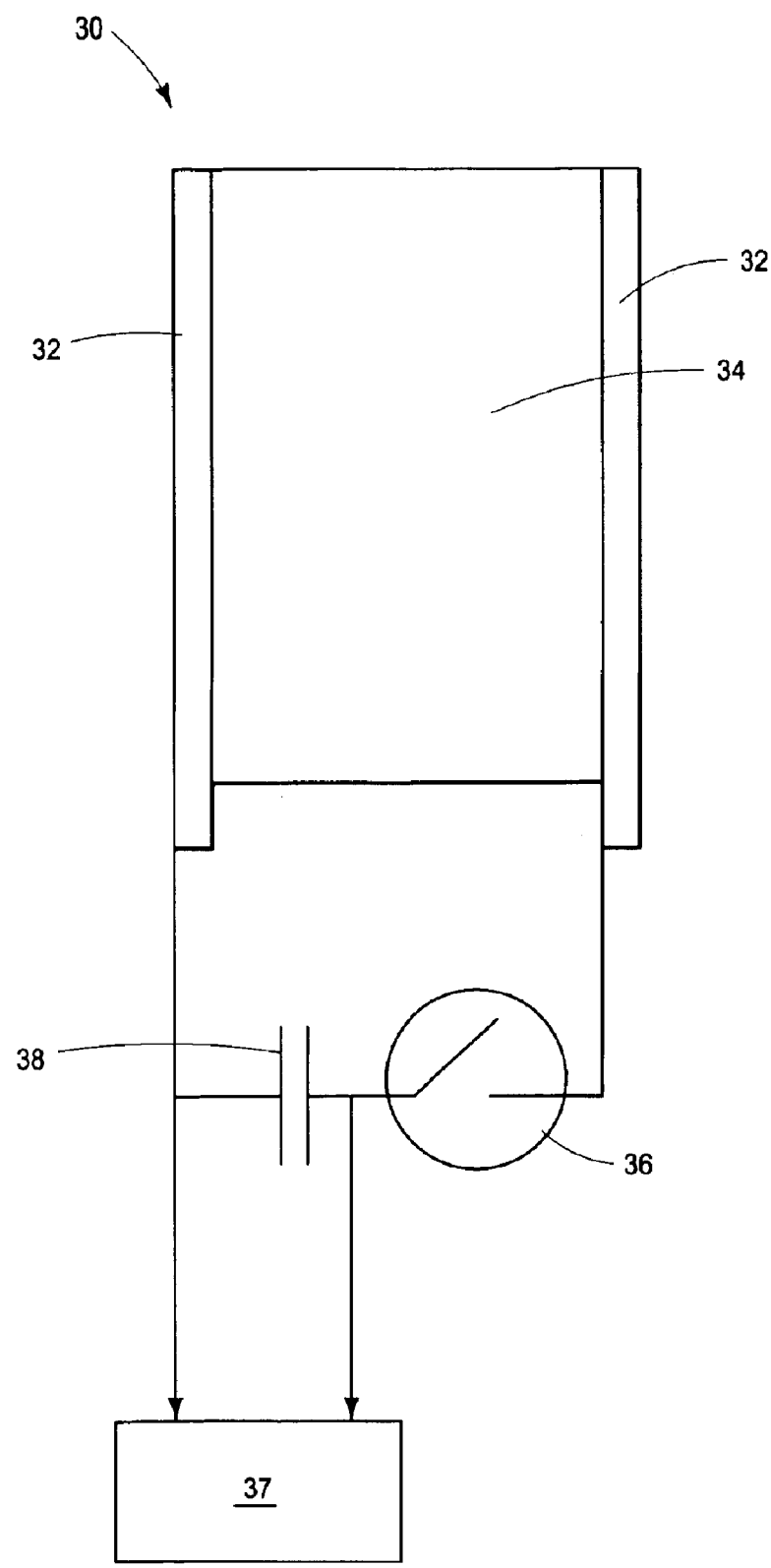
FIG. 3 shows one pulse de-icer system.

FIG. 3 shows one pulse de-icer system 30 in accord with one embodiment. Pulse de-icer system 30 includes a pair of power buses 32, a heating element 34, a capacitor 38, a switch 36, and a power supply 37. Pulse de-icer system 30 is configured for removing ice adjacent to element 34 (e.g., element 34 is disposed with, within and/or on the object to be de-iced). In the illustrated embodiment of FIG. 3, capacitor 38 is a supercapacitor having a storage capacity of about 1000 F and a potential of about 2.5V, such as a PC2500 supercapacitor produced by Maxwell Technology. Also in this embodiment, heating element 34 has a 50 $\mu$m sheet of stainless steel foil affixed to a 1 cm thick Plexiglas plate; and power supply 37 is a 2.5V DC power supply. Switch 36 may operate as a high current mechanical switch to limit a duration in which power supply 37 applies power to heating element 34. Optionally, switch 36 operates as an electrical switch that receives a control from a controller, such as controller 14 of FIG. 1. Resistance of heating element 34 is about 6 m$\Omega$. With an initial power density of about 40 kW/m², a total stored energy of about 3.125 kJ, and a total energy density of about 83.33 kJ/m², pulse de-icer system 30 effectively de-ices about 2 cm of ice on about 375 cm² of surface area in approximately one second at an ambient temperature of about −10° C., using an energy density of about 40 kJ/m².

In another embodiment of pulse de-icer system 30, capacitor 38 is a car battery, such as an EverStart® car battery with a peak current of about 1000 A and a potential of about 12V. Also in this embodiment, heating element 34 has a 100 $\mu$m sheet of stainless steel foil affixed to a 1 cm thick Plexiglas plate. Switch 36 may for example be starter-solenoid switch. With an initial power density of about 25 kW/m², pulse de-icer system 30 effectively de-ices about 2 cm of ice grown on about 375 cm² of surface area in approximately two seconds at an ambient temperature of about −10° C., using an energy density of about 50 kJ/m². In another embodiment, power supply 37 is a 2.5V DC power supply that charges capacitor 38.

Figure 4:
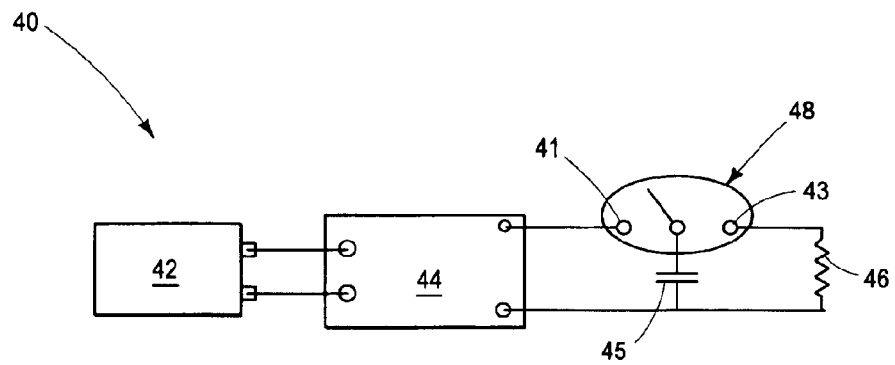
FIG. 4 shows one pulse de-icer system.

FIG. 4 shows one pulse de-icer system 40 in accord with one embodiment. Pulse de-icer system 40 utilizes a DC power supply 42, a capacitor 45, a resistive heating element 46, a DC-to-DC converter 44, and a switch 48. DC power supply 42 is configured for supplying power via DC-to-DC converter 44 to charge capacitor 45 when switch 48 is closed on node 41. DC-to-DC converter 44 may be configured for "stepping up" the voltage from DC power supply 42. In one example, DC-to-DC converter 44 has boost electronics that boost the power of DC power supply 42. In one embodiment, capacitor 45 cooperatively couples to resistive heating element 46 via node 43 and is configured to supply a magnitude of power in accordance with the equations of FIG. 1. Switch 48 is then operatively controlled by varying means, such as a controller or a microprocessor, to pulse current from capacitor 45 into resistive heating element 46 as switch 48 closes on node 43, for example in accordance with Eq. 1-1 of FIG. 1. In one example, DC power supply 42 charges capacitor 45 when switch 48 is closed on node 41. Once capacitor 45 is charged, switch 48 opens and then closes on node 43 to discharge current into resistive heating element 46. Resistive heating element 46 then generates sufficient heating power to melt an interfacial layer of ice. Depending on the application of pulse de-icer system 40, melting the interfacial layer of the ice is for example useful to remove ice from a surface of an object, to prevent its formation on the surface, and/or to modify a coefficient of friction between the ice and the object. Pulse de-icer system 40 is also useful when large power supplies are not available or with objects having small surface area in contact with snow, such as a shoe (e.g., shoe 684, FIG. 61). In one embodiment, pulse de-icer system 40 is used as a "pulse brake" described in more detail below.

Figure 5:
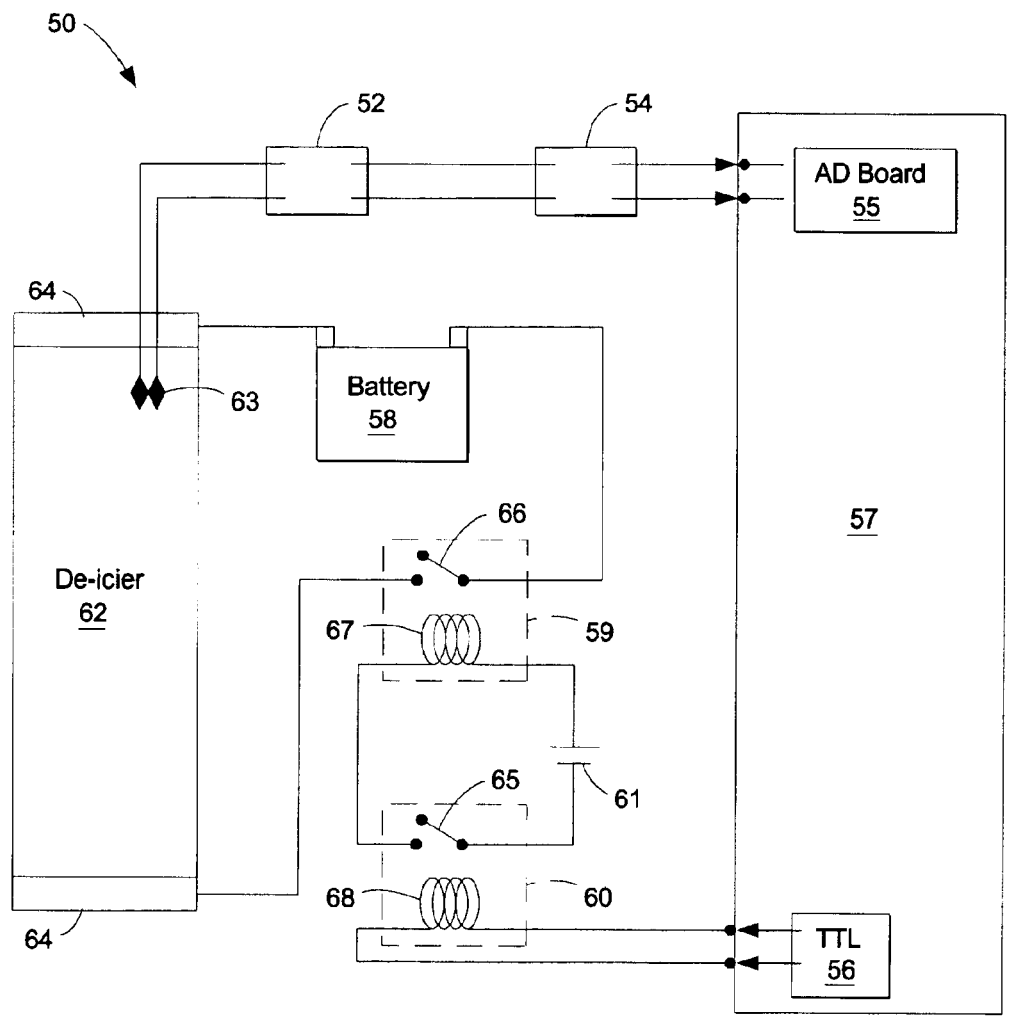
FIG. 5 shows one pulse de-icer system.

FIG. 5 shows one pulse de-icer system 50 in accord with one embodiment. Pulse de-icer system 50 is configured for de-icing an object. Pulse de-icer system 50 has a de-icer 62, a pair of power buses 64, a thermocouple 63, a thermocouple module 52, an amplifier 54, a battery 58, a starter/solenoid 59, a capacitor 61, a solid-state relay (SSR) 60, and a computer system 57. De-icer 62 is coupled to power buses 64 for receiving power from battery 58. Computer system 57 is coupled to de-icer 62 through thermocouple module 52 and amplifier 54 to receive temperature information about de-icer 62 through thermocouple 63. Computer system 57 may include an analog to digital (A/D) converter board 55 configured to receive the temperature information in an analog form and to convert the analog temperature information into a digital format for use by computer system 57. Computer system 57 also couples to de-icer 62 through SSR 60 to control the duration and magnitude of the power applied to de-icer 62, for example in accordance with the equations of FIG. 1. In one example, computer system 57 operatively controls SSR 60 and starter solenoid 59 to apply power from battery 58 to de-icer 62.

SSR 60 may be replaced with an inductor 68 and a switch 65. Starter-solenoid 59 may also include an inductor 67 and a switch 66. Computer system 57 may additionally include a transistor-transistor logic (TTL) module 56 to send control information to SSR 60, such that when inductor 68 receives a step input from TTL module 56, inductor 68 closes switch 65. Once switch 65 closes, capacitor 61 discharges into inductor 67 to close switch 66. Once switch 66 closes, battery 58 delivers power to de-icer 62. In one embodiment, computer system 57 decouples power from de-icer 62 when the temperature rises to a predetermined level, as determined by thermocouple 63. In one example, computer system 57 receives temperature information from thermocouple 63 via thermocouple module 52 and amplifier 54. Thermocouple module 52 relays the temperature information to computer system 57. Amplifier 54 amplifies the temperature information such that A/D converter board 55 digitizes the temperature information for computer system 57. Once the temperature of de-icer 62 reaches a predetermined level sufficient to melt an interfacial layer of ice, computer system 57 directs TTL module 56 to open switch 65 via inductor 68. Since switch 65 is open when computer system 57 determines that power should be decoupled from de-icer 62, capacitor 61 discharges and switch 66 opens because inductor 67 no longer maintains a voltage. As such, inductor 67 begins to charge capacitor 61.

In one embodiment, de-icer 62 is made of 50 $\mu$m thick stainless steel and attached to a leading edge of a small aerofoil (e.g., a forward exposed portion of an aircraft wing). In this embodiment, the aerofoil has a span of about 20 cm and thickness of about 5 cm and de-icer 62 has dimensions of about 20 cm×10 cm.

System 50 was tested as follows. De-icer 62 was formed into an aerofoil and placed in an icing wind tunnel; it was tested at an air speed of about 142 km/h at about −10° C. with about 20 $\mu$m water droplets. Atmospheric ice formed on the aerofoil. After ice grew to about 5 mm to 10 mm thickness, computer system 57 directed battery 58 to apply power to de-icer 62 in a pulsed manner, such as that described in FIG. 5. With a power density W of about 100 kW/m$^2$ and a power pulse duration t of about 0.3 second, de-icer 62 melts the interfacial layer of ice to the aerofoil such that the adhesion of the ice to the aerofoil surface is substantially modified and/or broken. The ice thereafter is removable from the aerofoil surface by air drag force. The pulse duration in this example is longer than in the example of the windshield de-icer because of the larger heat capacity in the metal-foil heater.

Figure 6:
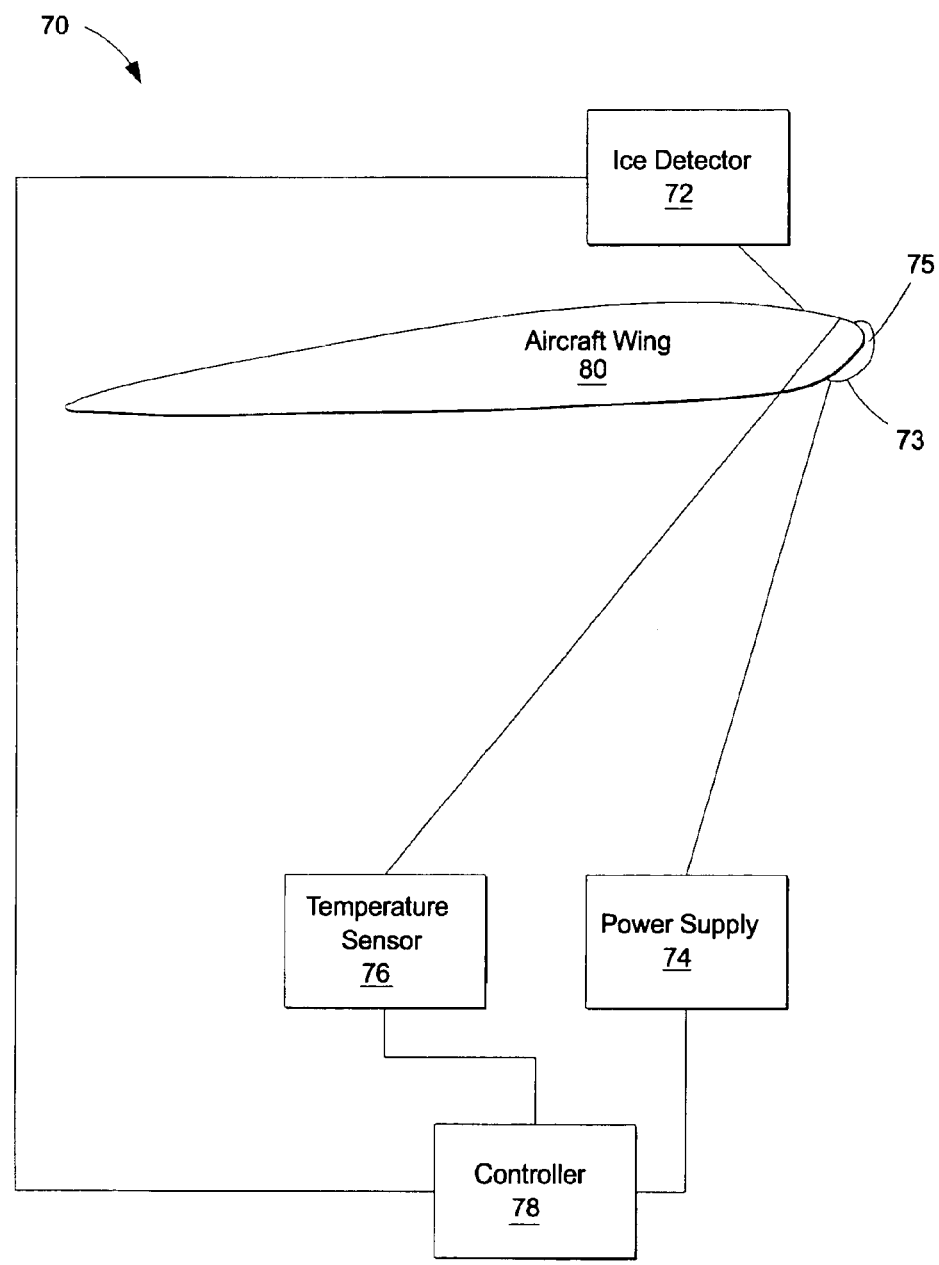
FIG. 6 shows one pulse de-icer system as applied to an aircraft wing.

FIG. 6 shows one pulse de-icer system 70 as applied to aircraft wing 80, in accord with one embodiment. Pulse de-icer system 70 has a power supply 74 and a controller 78. Power supply 74 is configured for generating power with a magnitude that is substantially inversely proportional to a magnitude of energy used to melt an interfacial layer of ice at an interface 73. As shown, interface 73 is the surface of aircraft wing 80 that is in contact with ice and/or snow. Pulse de-icer system 70 also has a heating element 75 coupled to power supply 74 to convert the power into heat at interface 73. System 70 has a controller 78 coupled to power supply 74 to limit a duration in which heating element 75 converts the power into heat. The duration in which power is applied is for example inversely proportional to a square of the magnitude of the power.

In one embodiment, system 70 also includes an ice detector 72 and a temperature sensor 76. Temperature sensor 76 is coupled to interface 73 to detect a temperature at interface 73. Temperature sensor 76 provides temperature information about interface 73 in the form of a feedback signal to controller 78. Controller 78 then processes the temperature information to control the manner in which power is applied to heating element 75 and/or interface 73.

Ice detector 72 is configured to detect a thickness of ice on interface 73. Ice detector 72 may for example include a grid of electrodes that facilitate measurement of ice thickness. Since ice has a unique dielectric constant that differs from the dielectric constants of water and air, the presence and thickness of ice may be determined by measuring inter-electrode capacitance of ice detector 72. Ice detector 72 relays information about the ice (e.g., ice presence and thickness) to controller 78. Controller 78 processes the information to determine when power should be applied to heating element 75. In one embodiment, when ice on aircraft wing 80 reaches a certain thickness, controller 78 automatically determines that the ice is to be removed and operatively controls power supply 74 to apply power to heating element 75.

An example of the operative characteristics of system 70 is now described. Consider a de-icer environment in which the ambient temperature T is about −10° C., air speed is about 320 km/hour, and thickness of aircraft wing 80 is about 10 cm, with a convective heat exchange coefficient $h_c$ of about 1200 watt/K·m² (based on experimental data).

By way of comparison, a prior art de-icer system would operate to apply power W to the surface of aircraft wing 80 to maintain the temperature $T_m$ at the surface of aircraft wing 80 above the freezing point of water (e.g., 0° C.), as in the following equation:

$$W = h_c(T_m - T) = 12 \text{ kwatt}/m^2. \quad \text{(Eq. 6-1)}$$

Maintaining that power for a period of three minutes results in a large amount of energy Q, as determined by the following equation:

$$W = 12 \cdot 10^3 \, \frac{\text{watt}}{m^2} \cdot 180 \, \text{sec} = 432 \cdot \frac{\text{kJoule}}{m^2}. \quad \text{(Eq. 6-2)}$$

Pulse de-icer system 70, on the other hand, distinguishes from the prior art de-icer system by, among other features, melting an interfacial layer of the ice at interface as opposed to all of the ice. In one example, pulse de-icer system 70 cleans the aerofoil of ice using only 30 kJoule/m². With three minute intervals between pulses, pulse de-icer system 70 consumes a very low "mean" power of:

$$W_{mean} = \frac{30 \text{ kJoule}}{180 \text{ s} \cdot m^2} = 0.167 \, \frac{\text{kwatt}}{m^2}. \quad \text{(Eq. 6-3)}$$

Specifically, the result of Eq. 6-3 is only 1.4% of what a prior art electrothermal de-icer uses, per Eq. 6-2.

In one embodiment, pulse de-icer system 70 pulses energy to heating element 75 according to the equations of FIG. 1. Heating element 75 may for example include a grid of electrodes to melt the interfacial layer of ice at interface 73. When ice thickness reaches a certain preset value (e.g., 3 mm), controller 78 directs power supply 74 to deliver a short pulse of power to heating element 75. The duration of the pulse depends upon the temperature as supplied by temperature sensor 76, power as supplied by power supply 74, and physical properties of a substrate material (e.g., the surface of aircraft wing 80 and/or heating element 75). For example, the pulse duration in which power is applied may follow Eq. 1-1 of FIG. 1.

In one embodiment, pulse de-icer system 70 employs a second temperature sensor (not shown) near heating element 75 to improve power control. For example, once the interfacial temperature reaches a predetermined value as pulse power is applied, controller 78 may direct power supply 74 to decouple power from heating element 75, thereby conserving energy usage.

Experimentation with various heaters, such as a HF dielectric-loss heater and a DC heater, yields results that conform to theoretical predictions described above. In certain embodiments herein, when a de-icing area is too large for the power supply to simultaneously heat the entire area, de-icing may be performed section-by-section. By way of example, an entire structure may be de-iced by sequentially by de-icing these sections. Air-drag forces associated with an aircraft may additionally remove ice from an aerofoil; however, as it takes time to keep the most forward-advanced portion of aircraft wing 80 unfrozen (e.g., a parting strip), this may increase the average power shown in Eq. 6-3. Other heaters may be used with pulse de-icer system 70 without departing from the scope hereof, such as the hot bleed-air heater found in many aircraft.

Heating Elements as Used in Pulse De-icer Systems

In certain of the following embodiments, heating elements as used in various pulse de-icer systems are described. These heating elements for example receive power from a power supply, such as a DC power supply, and then melt an interfacial layer of ice at a surface-to-ice interface of an object. Once the interfacial layer of ice is melted, the ice is for example removed or refrozen depending on the desired application, such as those applications described in more detail below.

Figure 7:
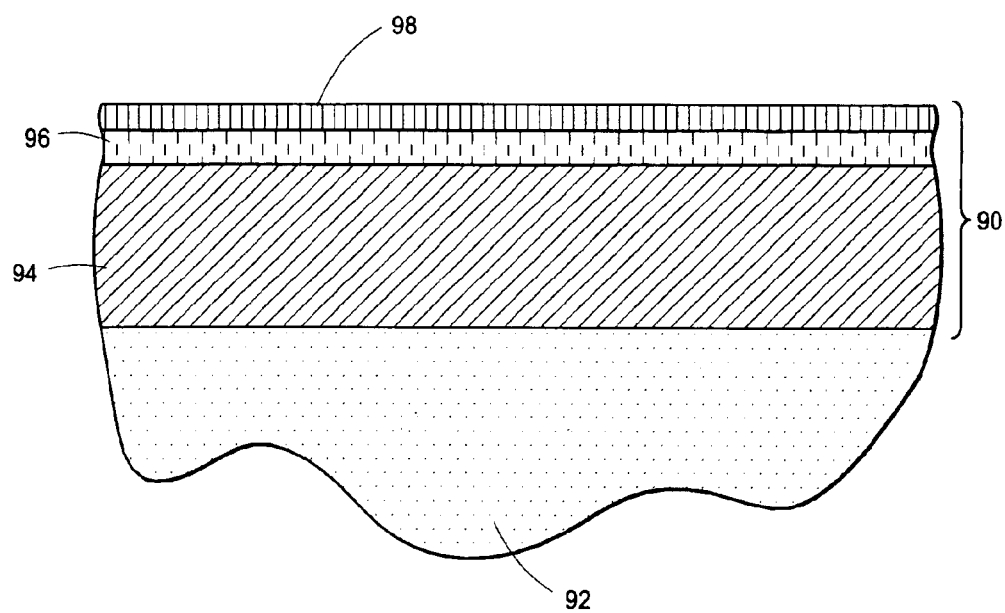
FIG. 7 shows one pulse de-icer heating element laminate.

FIG. 7 shows exemplary pulse de-icer heating element laminate 90 for removing ice from a structure 92, for example by applying power in accordance with the equations of FIG. 1. Laminate 90 includes an electrical and substrate thermal insulator 94, an electrically conductive layer 96, and a protective layer 98. Layer 96 receives power and converts that power into heat to remove and/or prevent ice formation on structure 92. Layer 96 is for example one of various heating elements described herein. In one embodiment, laminate 90 includes a plurality of individual components affixed to structure 92, thereby forming "cells" in which ice can be discretely removed (e.g., removed cell by cell, or section by section).

In one embodiment, the deliverable power to laminate 90 is in a range of about $$10 \, \frac{\text{kW}}{m^2} \text{ to } 100 \, \frac{\text{kW}}{m^2}.$$

Accordingly, a power supply selected to deliver such power should have a capacity of about $$10 \, \frac{\text{kJ}}{m^2} \text{ to } 100 \, \frac{\text{kJ}}{m^2}$$

depending on the desired de-icing time and the outside temperature. Certain power supplies with these characteristics are in the form of chemical batteries, such as car batteries, supercapacitors, ultracapacitors, electrolytic capacitors, flywheels coupled with generators, DC/DC and DC/AC invertors, and combinations thereof.

Modem chemical batteries are known for high density of stored electric energy (e.g., about 60 kJ/kg for a lead battery). However, chemical batteries have a relatively low power density. For example, a car battery can deliver up to about 1000 A at twelve volts for about ten seconds, corresponding to a power of about 12 kW. A typical car battery has a large capacity of about $Q \approx 12V \times 100 \text{ A} \times 3600 \text{ sec} = 4.32 \cdot 10^6$ J. Therefore, for use in pulse de-icer systems and methods, the car battery may effectively de-ice areas up to about 1.5 m², which is ideal for automobile windshields.

Supercapacitors and ultracapacitors are known as good supplies for both peak power and peak capacity. Certain supercapacitors can store 10 kJ/kg and can deliver 1.5 kW/kg of power (e.g., the PC2500 supercapacitor by Maxwell Technology). As power supplies, supercapacitors may be well suited for use with laminate 90 in pulse de-icer systems.

A flywheel made of light composite materials and coupled with a generator provides another energy storage. Certain flywheels can store up to about 2 MJ/kg and, when coupled with a generator, can deliver a power density of about 100 kW/kg. As an example, a motor-generator initially operates as a motor spinning the flywheel to a high speed. The motor uses a low-power source, such as 100 watt to 1000 watt source (e.g., a battery). When peak power is needed, the coils of the motor-generator are disconnected from the low-power source and connected to a low-impedance load (e.g., electrically conductive layer 96), thereby inverting a kinetic energy stored in the flywheel into heat.

Certain applications of pulse method de-icers may use high-electric impedance heaters (e.g., a resistive heating element of an automobile windshield de-icer) and, therefore, may need a high-voltage power supply. For example, an automobile windshield de-icer may use about 120 volts and up to 240 volts. This voltage exceeds an output voltage of a typical car battery (e.g., about 12 volts) and that of a supercapacitor (e.g., about 2.5 volts). Instead of employing a bank of batteries to increase the voltage, DC/AC invertors or step-up DC/DC converters can be used to increase the voltage.

Thin electrical heating layers (e.g., electrically conductive layer 96, FIG. 7) are useful in reducing energy requirements and de-icing thermal inertia. Examples of materials that may be used as layer 96 are thin metal foils, such as stainless steel foil, titanium foil, copper foil, and aluminum foil. Sputtering metals, alloys, conductive metal oxides, conductive fibers (e.g., carbon fibers) and conductive paints may be used as well. A typical thickness of layer 96 may be in a range of about 50 nm to 100 μm; however, other ranges, such as that of about 10 nm to 1 mm, may also be used.

In one optional embodiment, protective layer 98 is configured to protect layer 96 from harsh environments. For example, layer 98 protects layer 96 from abrasion, erosion, high-speed impacts, and/or scratches. Protective layer 98 may be either dielectric or conductive and applied directly to layer 96. For example, layer 96 may have relatively good thermal conductivity properties and relatively high mechanical strength. Certain examples of materials that may be used as protective layer 98 include TiN, TiCN, tungsten carbide, WC, $Al_2O_3$, $SiO_2$, Cr, Ni, CrNi, $TiO_2$, and AlTiO. Protective layer 98 may be applied to layer 96 by sputtering, chemical vapor deposition ("CVD"), physical vapor deposition ("PVD"), and/or sol-gel methods (e.g., a colloidal suspension of silica particles that is gelled to form a solid). Sputtering, as known to those skilled in the art, may include placing a substrate in a vacuum chamber. A plasma generated by a passive source gas (e.g., Argon) generates an ion bombardment directed towards a target on the substrate, thereby causing material of the substrate to be "sputtered". The sputtered material condenses on the chamber walls and the substrate. CVD and PVD techniques are known to those skilled in the art.

Because energy requirements for pulse method de-icers can depend on substrate properties (e.g., $\sqrt{\rho_s c_s \lambda_s}$ of Eqs. 1-1, 1-2, 1-4), de-icing power can be lowered for substrate materials of low density, low heat capacity, and/or low thermal conductivity. Many polymers have low ($\rho_s c_s \lambda_s$) product while metals have high ($\rho_s c_s \lambda_s$) product. Solid foams also have low ($\rho_s c_s \lambda_s$) product. Glass has a ($\rho_s c_s \lambda_s$) product that is higher than that of a typical polymer, but comparatively lower than that of metals. Depending on the application, substrate thermal insulator 94 can be about 100 nm to 1 mm-thick, but is typically about 0.1 mm to 20 mm thick.

Figure 8:
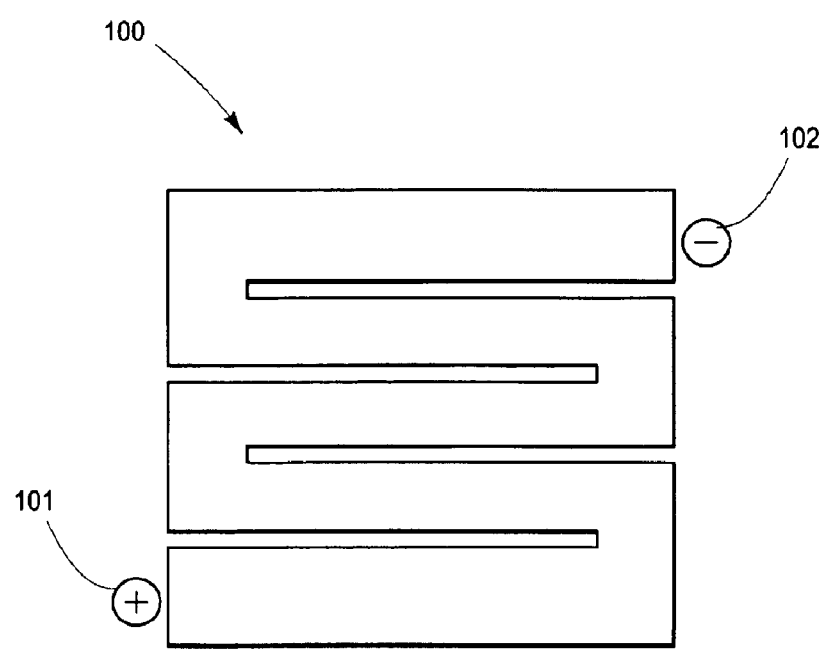
FIG. 8 shows one pulse de-icer heating element.

FIG. 8 shows one pulse de-icer heating element 100, in accord with one embodiment. Heating element 100 is configured for melting an interfacial layer of ice on an object by receiving pulsed energy, such as in accordance with the equations of FIG. 1. For example, power may be applied to heating element 100 at terminals 101 and 102 such that heating element 100 melts an interfacial layer of ice. A power supply, such as those described herein, may supply power to heating element 100 to melt the interfacial layer of ice. Depending on the application of heating element 100, melting the interfacial layer of the ice may be useful to remove ice from a surface of an object, prevent its formation on the surface, and/or modify its adhesion strength and change a coefficient of friction between ice and the object. Element 100 may be disposed at, in, or adjacent to the object surface to be de-iced, for example.

Pulse De-icer System Analysis

Certain operative characteristics of various pulse de-icer systems are next analyzed and described. In the following exemplary analyses, certain component values are illustrated to show how heat from a heating element diffuses into ice to remove the ice from an object.

Figure 9:
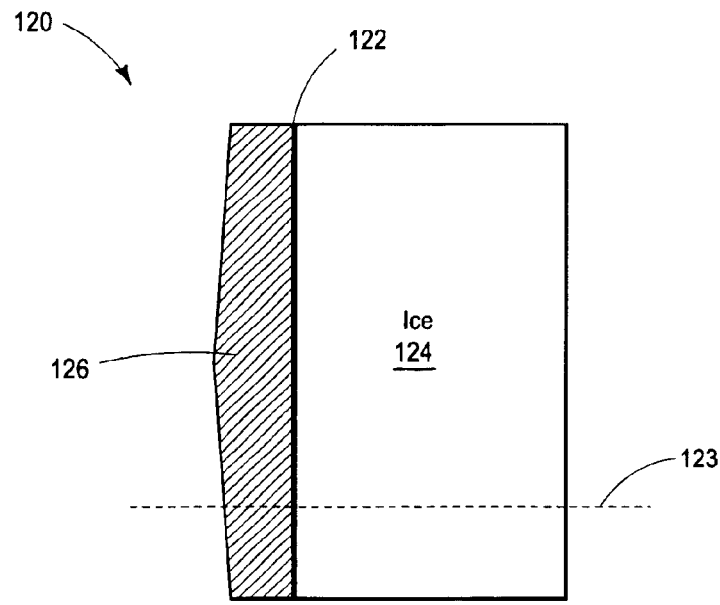
FIGS. 9 and 10 illustrate an exemplary heat diffusion distance over a given time for one pulse de-icer apparatus.

FIG. 9 shows one pulse de-icer apparatus 120. Illustratively, ice 124 adheres to a thermally conductive substrate 126 forming an ice-object interface 122. A heating element such as described herein is disposed with interface 122 (e.g., within substrate 126) to facilitate delivery of pulsed energy to interface 122. Substrate 126 represents a structure such as an aircraft wing, car windshield, window, outside mirror, headlight, rotor of a windmill, building, road structure, bridge, refrigerator, antenna, communication tower, train, railway, tunnel, road sign, power line, high tension wire, ski lift structure or ski lift cable.

Figure 10:
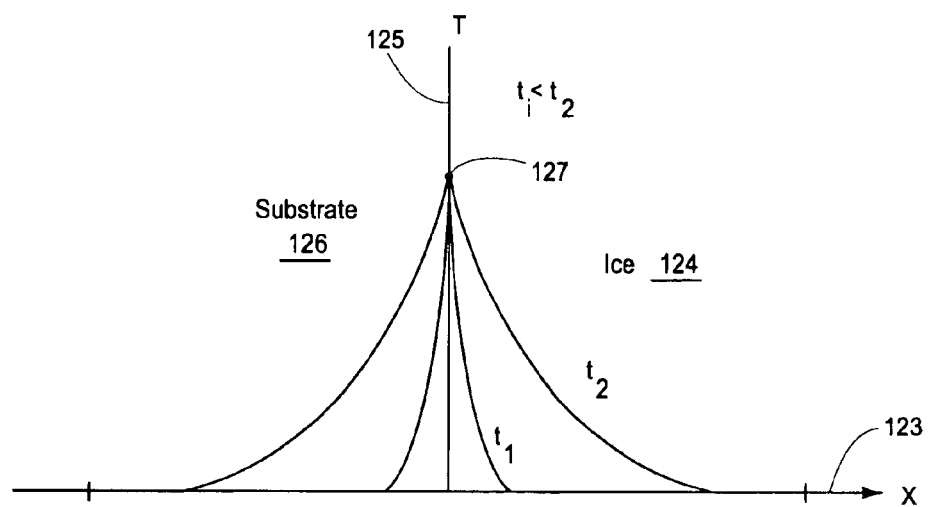

FIG. 10 illustratively shows heat diffusion distance over a given time t (e.g., $t_1$ and $t_2$), through ice 124 and substrate 126, from a temperature T at the ice-object interface 122. X-axis 123 represents distance perpendicular to interface 122, as shown in FIG. 9; and Y-axis 125 represents temperature T. Each curve $t_1$ or $t_2$ represents time for heat diffusion distance into thermally conductive substrate 126 and ice 124 on opposing sides of interface 122. As shown, the peak of each curve $t_1$ and $t_2$ is at a melting point temperature 127 on Y-axis 125, i.e., the temperature sufficient to melt an interfacial layer of ice at interface 122.

The two curves $t_1$ and $t_2$ depend on pulsed power that melts the interfacial layer of ice. As shown, $t_1$ is less than $t_2$ and thereby corresponds to a higher rate of power. Since a pulsed amount of energy applied under either curve $t_1$ and $t_2$ is sufficient to melt the interfacial layer of ice at interface 122, it is preferable to apply such pulsed energy in accordance with $t_1$, which utilizes a higher rate of power but overall less power as compared to $t_2$.

More particularly, consider the following equation for diffusion time t over a length L coincident with X-axis 123:

$$t = \frac{L^2}{D}, \quad \text{(Eq. 10-1)}$$

where
D is a coefficient of heat diffusivity set forth by:

$$D = \frac{\lambda}{\rho c}, \quad \text{(Eq. 10-2)}$$

where
$\lambda$ is a thermal conductivity coefficient, $\rho$ is the material density, and c is the material heat capacity. Pulses of shorter duration power applied to interface 122, accordingly, heats thinner interfacial layers of ice. By controlling heating power duration, it is better focused at interface 122, where needed. In one embodiment, the time t and energy Q applied to interface 122—to heat an interfacial layer of ice 124 from an ambient temperature T to a melting point temperature 127—follow the equations discussed in connection with FIG. 1. By employing the equations of FIG. 1, energy is saved when de-icing with apparatus 120. Additionally, the time t between heating pulses may be controlled such that the time t is defined by a rate of ice growth and tolerance to ice thickness. For example, when ice reaches a thickness of about 3 mm on an aircraft wing, a feedback mechanism enables apparatus 120 to remove ice 124 such as discussed in connection with FIG. 6.

Figure 11:
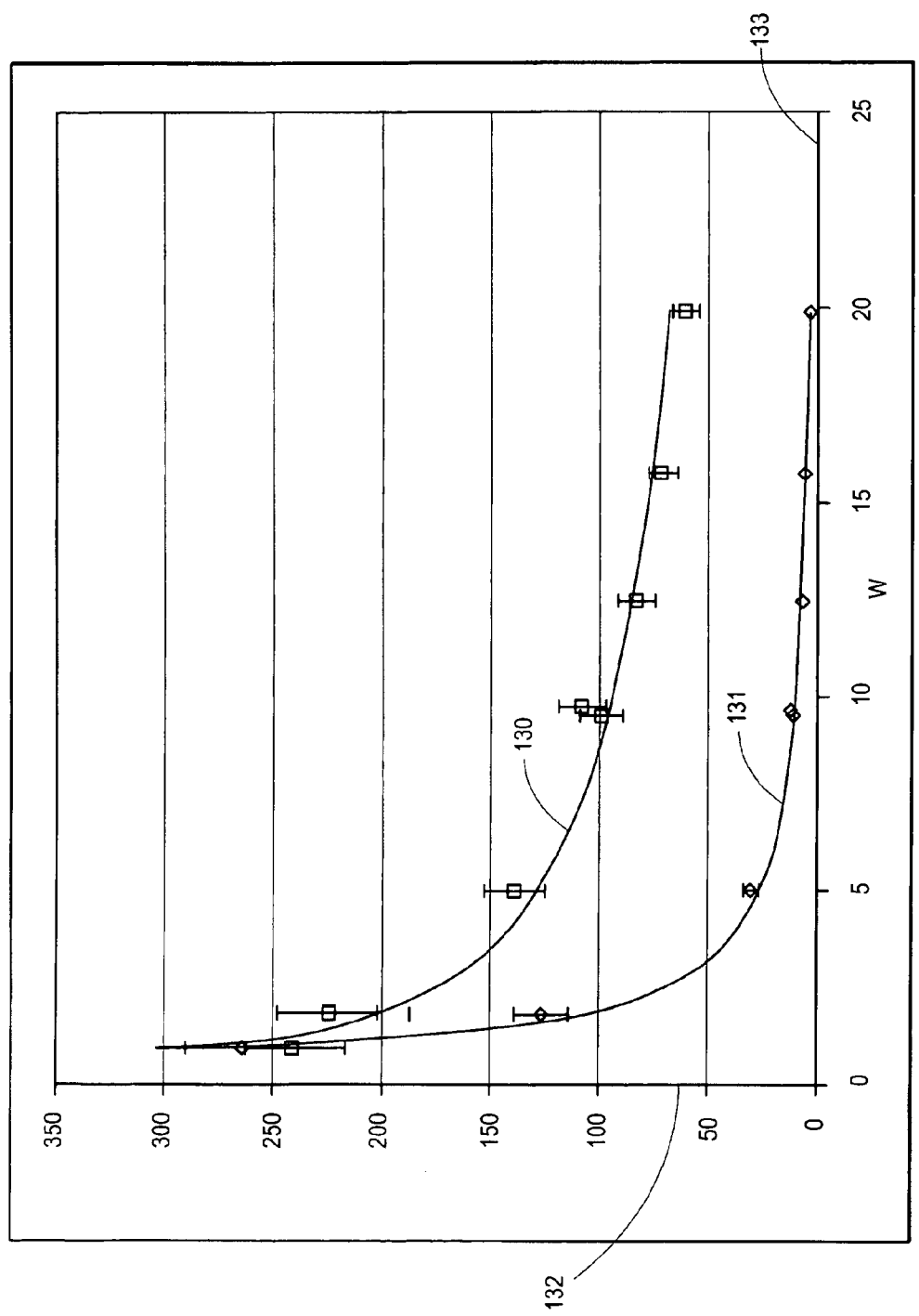
FIG. 11 shows a graph illustrating a dependence of de-icing time and de-icing energy for one pulse de-icer system.

FIG. 11 shows a dependence of de-icing time and de-icing energy (e.g., thermal energy) on the density of heating power for one pulse de-icer system as applied to a car windshield, in accord with one embodiment. For example, a 0.5 μm layer of conductive indium-tin oxide (ITO) coated on one side of the windshield made of glass and having dimensions of about 10 cm×10 cm×5 mm may be used as a heating element in the pulse de-icer system. When ice grows on the windshield with about 2 cm thickness in an environment of about −10° C., pulses of about 60 Hz AC power are applied to the heating element to heat an interfacial layer of the ice. Once the interfacial layer of ice is melted, the force of gravity may remove the ice. The thermal energy Q needed to melt the interfacial layer of ice may depend on the time and power density in which power is applied to the heating element. FIG. 11 illustrates such a dependency where Y-axis 132 represents de-icing time and de-icing energy, and X-axis 133 represents heating power rate W; the time is shown in seconds and the energy is shown in kjoule/m².

Two plots 130 and 131 substantially conform to theoretical predictions given in Eq. 1-4 of FIG. 1. For example, plots 130 and 131 show that the de-icing time is inversely proportional to a square of the heating power rate W, while the thermal energy Q is approximately inversely proportional to a first power of the heating power rate W. Accordingly, such a pulse de-icer system reduces the magnitude of average power delivered to the heating element to remove ice from, or prevent its formation on, an object.

HF De-icer Systems

HF de-icer systems are now described. HF de-icer systems are for example used to remove ice from a surface of an object. As above, HF de-icer systems may melt an interfacial layer of ice at an object-to-ice interface such that the adhesion of ice to the surface is disrupted, modified, and/or broken. Once the adhesion of the ice is disrupted, the ice may be removed from the surface, such as by the force of gravity and/or windshear.

Figure 12:
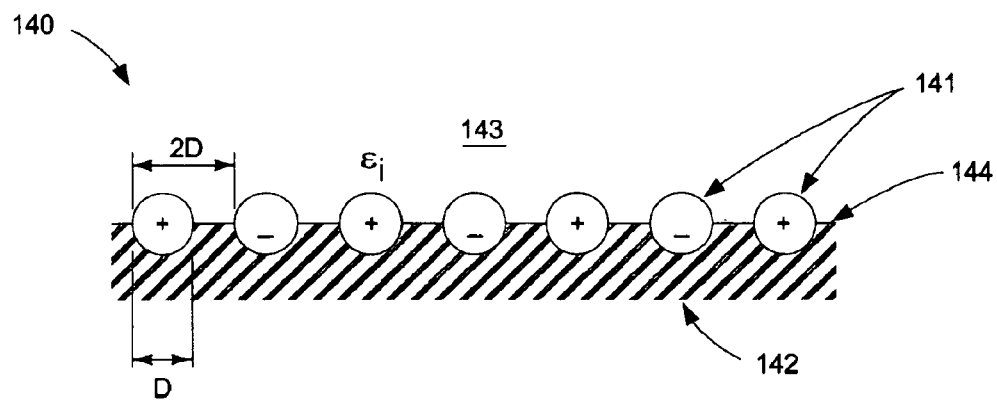
FIG. 12 shows one HF de-icer system for modifying an ice-to-object interface.

FIG. 12 shows HF de-icer system 140 in accord with one embodiment. HF de-icer system 140 has bifilar wound coil 141 implanted onto a dielectric substrate 142. Illustratively, ice and/or snow 143 is shown adhered to a surface 144 of dielectric substrate 142. Coil 141 may be coated with a dielectric layer to prevent mechanical and environmental degradation and/or to prevent an electric breakdown of air. Windings of coil 141 are spaced on dielectric substrate 142 by a distance D. When power is applied to coil 142, for example in accordance with the equations of FIG. 1, HF de-icer system 140 disrupts or modifies adhesion of ice and/or snow 143 from surface 144. Exemplary operative characteristics of HF de-icer system 140 are now described.

Typical ice has a capacitance per square meter of:

$$C_i \cong \frac{1.2 \times 10^{-11}}{D(m)} \frac{F}{m^2} \qquad \text{(Eq. 12-1)}$$

and a HF-conductance per square meter of:

$$G_i \cong \frac{0.53 \cdot 10^{-4}}{D(m)} \cdot e^{6670\left(\frac{1}{273} - \frac{1}{T(k)}\right)} \left(\frac{1}{ohm \cdot m^2}\right), \qquad \text{(Eq. 12-2)}$$

where D is in meters and T in Kelvins. Electric breakdown of air occurs at a voltage $V_B$ of about:

$$V_B \approx 2.4 \times 10^6 D(m). \qquad \text{(Eq. 12-3)}$$

As calculated at sea level, and using the air-breakdown electric field of about 30 kV/cm, the root mean squared (rms) voltage $V_B$ is about:

$$V_B \approx 1.7 \times 10^6 D(m). \qquad \text{(Eq. 12-4)}$$

As a matter of design preference, the maximum voltage is determined to be about 70% of $V_B$ in (Eq. 10-4), for safety considerations. Accordingly, $V_{max}$ is determined to be:

$$V_{max} = 0.7 \cdot 1.7 \times 10^6 D(m) \approx 1.2 \times 10^6 D(m). \qquad \text{(Eq. 12-5)}$$

Combining Eqs. 12-2 and 12-5, the maximum heating power $W_{max}$ is determined to be:

$$W_{max}(T) = G_i V_{max}^2 = 0.763 \cdot 10^8 \cdot D(m) \cdot e^{6670\left(\frac{1}{273} - \frac{1}{T}\right)}. \qquad \text{(Eq. 12-6)}$$

De-icing time of HF de-icer system 140 is heuristically determined by applying "safe" voltages according to the following equation:

$$W(T, V) = W_{max}(T) \cdot \left(\frac{V}{V_{max}}\right)^2. \qquad \text{(Eq. 12-7)}$$

Assuming 0.5 mm wires in coil 141 and a safe voltage of 600 volts rms, de-icing time of HF de-icer system 140 is heuristically determined to be about thirteen seconds, to melt an interfacial layer of ice 143 at surface 144 at an ambient temperature of −30° C. Other de-icing times are heuristically determined to be about 4.3 seconds at an ambient temperature of −20° C. and about 1.2 seconds at an ambient temperature of −10° C.

It has been found that typical ice growth rate does not exceed 1.5 mm/min. Accordingly, if desirous to shed (e.g., de-ice) ice 143 from surface 144 about every three minutes, approximate average powers for de-icing can be determined to be:

$$1.75 \text{ kW/m}^2 \text{ at } -30° \text{ C}. \qquad \text{(Eq. 12-8)}$$

The power density used to keep a 0.2 inch wide parting strip free of ice may be determined by adding the power density of an eight-inch wide protective band to each of the power densities of Eq. 10-8, assuming a 40 kW/m² typical power density. For example, a typical power density for the 5 mm-wide parting strip with an 8-inch wide protective band is determined as follows:

$$W = 40(kwatt/m2) \cdot 0.2 \text{ inch}/8 \text{ inch} = 1 \text{ kwatt/m}^2 \qquad \text{(Eq. 12-9)}$$

Accordingly, adding Eq. 10-9 to the power densities of Eq. 12-8 yields the following results:

$$4.1 \text{ kW/m}^2 \text{ at } -30° \text{ C}. \quad \text{(Eq. 12-8)}$$

The power density of HF de-icer system 140 at −30° C. (e.g., 4.1 kW/m²) is therefore only about 10% that of a prior art DC heater.

Figure 13:
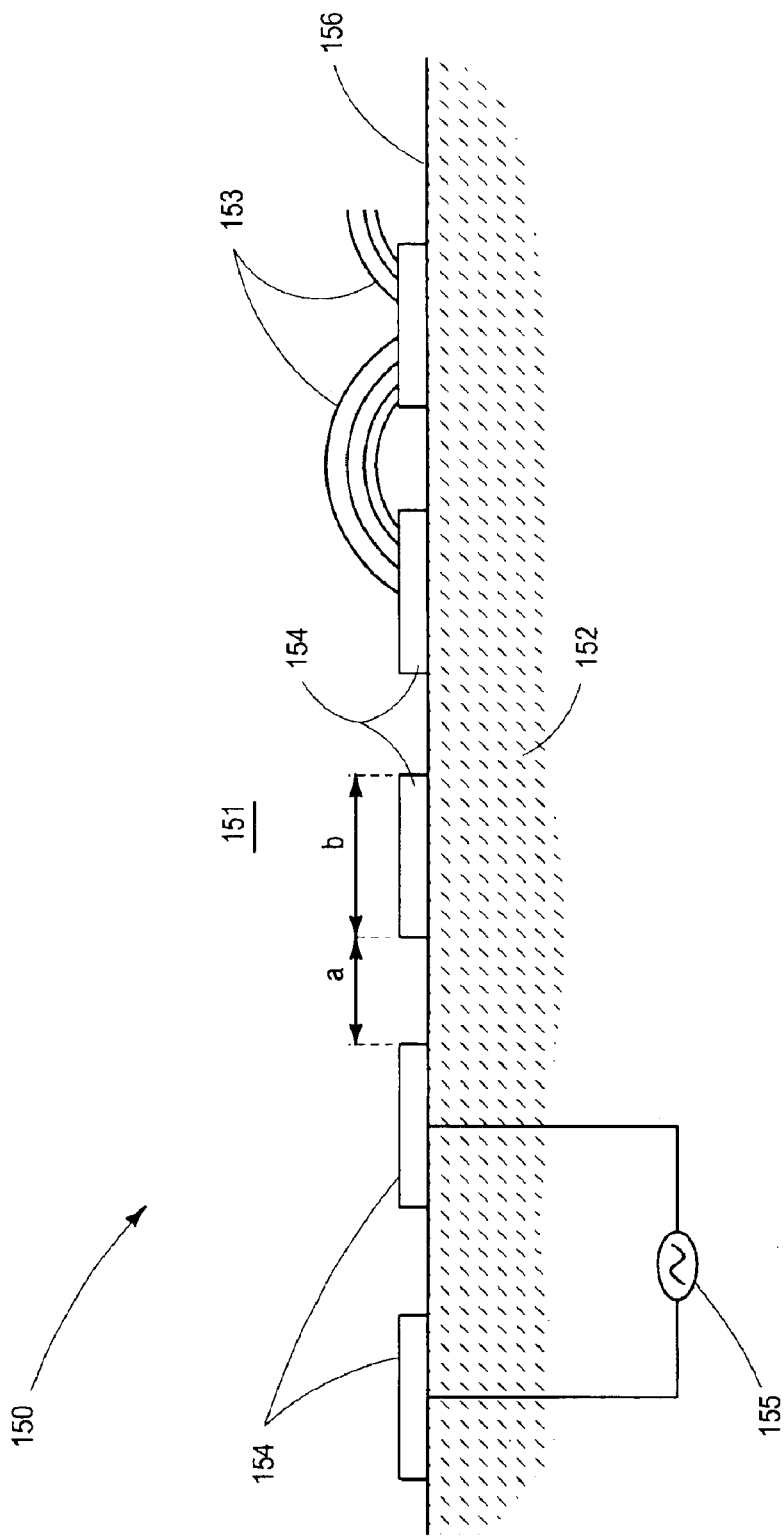
FIG. 13 shows one HF de-icer system.

FIG. 13 illustrates another HF de-icer system 150 in accord with one embodiment. HF de-icer system 150 has a plurality of electrodes 154 implanted onto a dielectric substrate 152 in the form of an interdigitated electronic circuit. HF de-icer system 150 removes ice 151 from surface 156 by applying electrical power to electrodes 154 from HF AC power supply 155. HF de-icer system 150 has de-icing characteristics in which the density of heating power substantially depends on circuit dimensions a and b, where a is a distance between electrodes 154 and b is an electrode width. In one embodiment, electrodes 154 are woven into a mesh.

As electrical power is applied to electrodes 154, electric field lines 153 form about electrodes 154, as shown. In HF de-icer system 150, circuit conductance G is proportional to circuit capacitance C per square meter caused by electric field lines 153 above dielectric substrate 152. For example, $$G \alpha C \left( \frac{C}{G} \right) = \left( \frac{\varepsilon \varepsilon_0}{\sigma} \right), \quad \text{(Eq. 13-1)}$$

where
$\varepsilon_o$ is free space permittivity (e.g., $\varepsilon_o = 8.85 \cdot 10^{-12}$ F/m), $\varepsilon$ is a relative permittivity of ice, and $\sigma$ is a conductivity of ice. Assuming a=b, the following can be concluded:

$$C \propto G \propto \frac{1}{l} \cdot \frac{b}{a} \cdot \varepsilon \varepsilon_0 \propto \frac{1}{l} \propto \frac{\sigma}{l}, \quad \text{(Eq. 13-2)}$$

where l is equal to a plus b, also known as the structure period. The mean electric field E is:

$$E \approx \frac{V}{l}, \quad \text{(Eq. 13-3)}$$

where V is the rms voltage applied to the circuit of HF de-icer system 150. Accordingly, the heating power W per cubic meter is:

$$W = GV^2 \propto \frac{\sigma V^2}{l} \propto \sigma \cdot l \cdot E^2. \quad \text{(Eq. 13-4)}$$

Thus, if maximum heating power $W_{max}$ is limited in HF de-icer system 150 by the maximum possible electric field $E_{max}$ (e.g., breakdown field), then $W_{max}$ follows the equation:

$$W_{max} \propto \sigma \cdot l \cdot E_{max}^2. \quad \text{(Eq. 13-5)}$$

In this embodiment, therefore, $W_{max}$ increases linearly as l increases. Additionally, the volume density $$W_{max}^v$$

of $W_{max}$ does not depend on l because:

$$W_{max}^v = \frac{W_{max}}{l} \propto \sigma \cdot E_{max}^2. \quad \text{(Eq. 13-6)}$$

Therefore, to keep W constant, E is decreased as f increases. Accordingly, E can be reduced such that there is no corona discharge (e.g., beneficial when using polymer substrates and electrode insulation).

Experimentally, HF de-icer system 150 was operated at −12° C. with various heating powers and voltages and with electrodes having dimensions of a=b=75 μm (e.g., when coated with 5 μm of polyimide film, such as a Kapton® polyimid, "Kapton"). The following results were obtained:

$$\begin{cases} W = 1 \text{ kW/m}^2, & \text{at } V = 80 \text{ V} \\ W = 2 \text{ kW/m}^2, & \text{at } V = 120 \text{ V} \end{cases} \quad \text{(Eq. 13-7)}$$

Imposing new dimensions a=b=500 μm (e.g., a structure period of mm), the voltage that maintain the power grows as a square root of the ratio of new and previous structure periods, resulting in the following:

$$\begin{cases} V' = \sqrt{\frac{500 \text{ μm}}{75 \text{ μm}}} \cdot 80 \text{ V} \approx 207 \text{ V}(1 \text{ kW/m}^2) \\ V' = \sqrt{\frac{500 \text{ μm}}{75 \text{ μm}}} \cdot 120 \text{ V} \approx 310 \text{ V}(2 \text{ kW/m}^2) \end{cases} \quad \text{(Eq. 13-8)}$$

One advantage of HF de-icer system 150 is that its circuit may be fabricated without photolithography, even on curved surfaces. The electric field strength may also decrease at a rate substantially equal to an increase in l.

Interdigitated Circuit for Use in HF De-icer System

The following shows embodiments and analyses of interdigitated circuits which may be used as heating elements in HF de-icer systems. The heating elements may be configured to receive HF-AC power from an AC power supply and used to melt an interfacial layer of ice at a surface-to-ice interface of an object. Once the interfacial layer of ice is melted, the ice may be removed or refrozen depending on the desired application, such as those described below in the below section entitled "Methods Of Coefficient Of Friction Manipulation."

Figure 14:
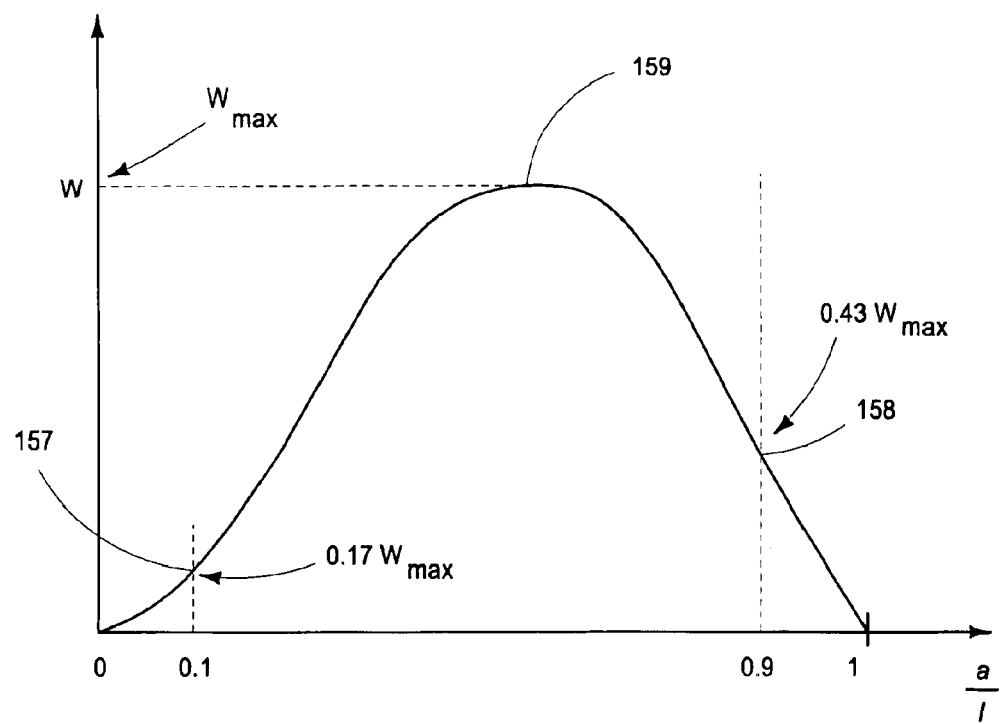
FIG. 14 shows an analysis of one HF de-icer system.

FIG. 14 shows an analysis of HF de-icer system 140 of FIG. 13 in accord with one embodiment. In this analysis, an improved $$\frac{a}{b}$$

ratio is determined for a given l. For example, $$G \propto \frac{1}{l} \cdot G', \quad \text{(Eq. 14-1)}$$

where
G' is per cell conductance. As conductance is proportional to capacitance, G' is proportional to the per cell capacitance as follows:

$$G' \propto C' \cdot \propto \frac{Q}{V} \propto \int_{\frac{a}{2}}^{(a+\frac{b}{2})} \frac{E_y \cdot dx}{V} = \qquad \text{(Eq. 14-2)}$$

$$\frac{1}{2}\ln\left(\frac{2a+b}{2a}\right) = \frac{1}{2}\ln\left(\frac{a+l}{2a}\right).$$

From Eq. 14-2, the heating power can be determined as follows:

$$W \propto GV^2 \propto \frac{G'}{l} \cdot V^2 \propto \frac{V^2}{l} \cdot \ln\left(\frac{a+l}{2a}\right) \qquad \text{(Eq. 14-3)}$$

$$W \propto \frac{V^2}{l}\ln\left(\frac{a+l}{2a}\right) = \frac{E^2}{l_{\max}} \cdot a^2 \cdot \ln\left(\frac{a+l}{2a}\right). \qquad \text{(Eq. 14-4)}$$

where
$0 \leq a \leq 1$. As shown in the graph of FIG. 14, when E is maintained as a constant, the maximum heating power $W_{max}$ is reached at point 159 where $$\frac{a}{l} \cong 0.576$$

(e.g., an approximation $a \approx b$ is relatively good since $l=a+b$). The heating power W, when $a=b=0.5\, l$, is approximately 97% of the maximum heating power $W_{max}$. The graph of FIG. 14 also illustrates ratios of 10% and 90% at respective points 157 and 158 where the heating power W is found to be 17% and 43% of the maximum heating power $W_{max}$. In contrast, when voltage is maintained as a constant, wider electrodes (e.g., dimension "b") increase the amount of heating power.

Figure 15:
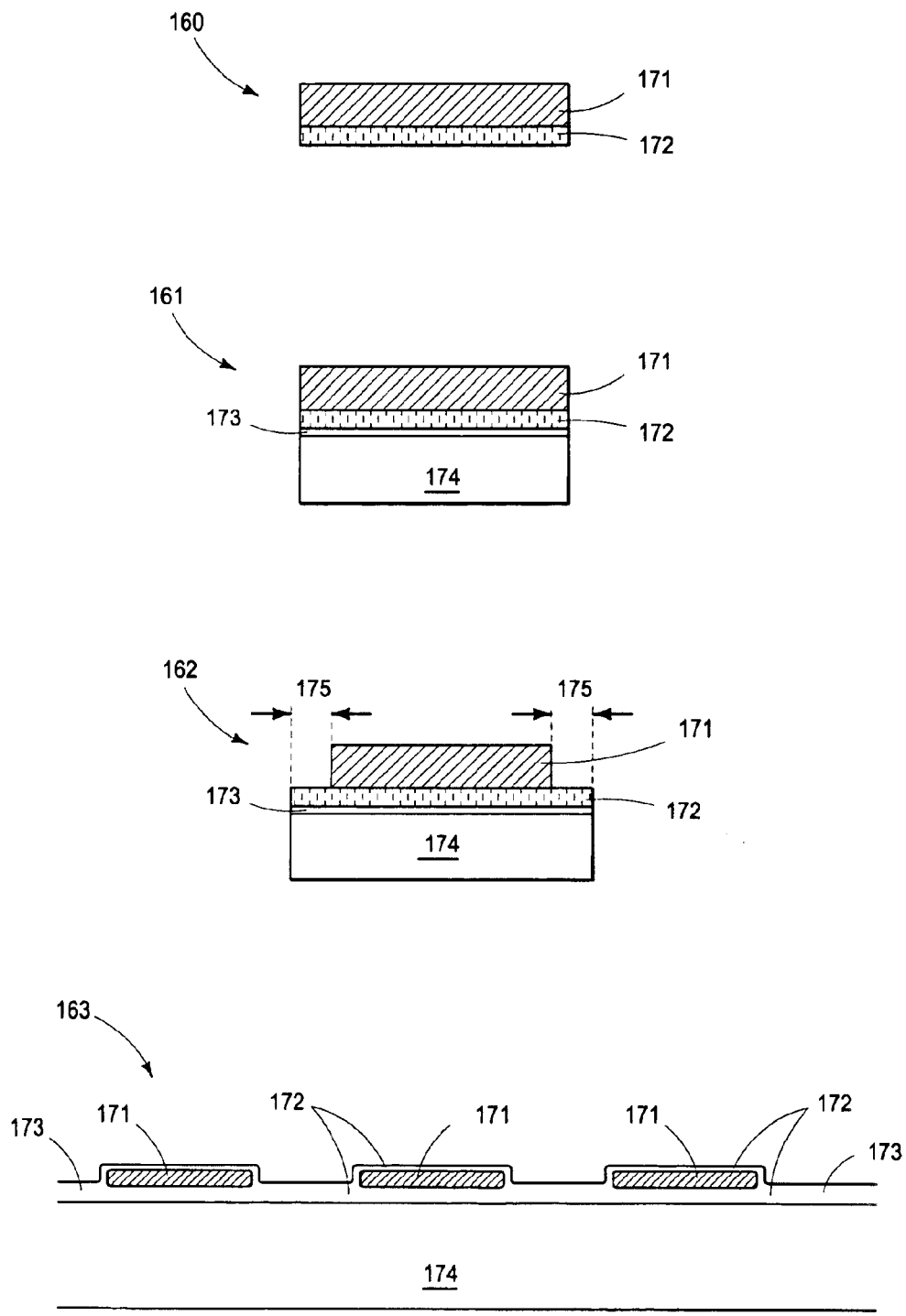
FIG. 15 shows assembly views of one interdigitated circuit for use in one HF de-icer system.

FIG. 15 shows assembly views 160–163 of an exemplary interdigitated circuit in accord with one embodiment. The interdigitated circuit of FIG. 15 may be used in a de-icer system such as those described in the HF de-icer systems and the pulse de-icer systems described above. In view 160, the interdigitated circuit is initially assembled by hard-anodizing one side (e.g., "hard anodized layer 172") of thick aluminum foil 171. Hard anodized aluminum foil 171/172 is physically mounted to polymer substrate 174 with adhesive 173 in view 161. Once hard anodized aluminum foil 171/172 is mounted to polymer substrate 174, electrodes are formed by etching and/or patening aluminum foil 171 from the overall structure as shown in view 162 (e.g., patened edges 175). Afterwards, the structure is bent or fitted into a desirable shape as a matter of design choice. The remaining exposed side of aluminum foil 171 is hard anodized to encapsulate the formed electrodes and to cure cracks in hard anodized layer 172 that result from bending, as shown in view 163.

While views 160–163 show one method of forming an interdigitated circuit, other methods of forming the interdigitated circuit fall within the scope hereof. Examples of other methods include etching and/or patening copper foil to form copper electrodes and mounting the copper electrodes to a Kapton substrate. An example of a copper interdigitated circuit on a Kapton substrate is shown in FIG. 16.

Figure 16:
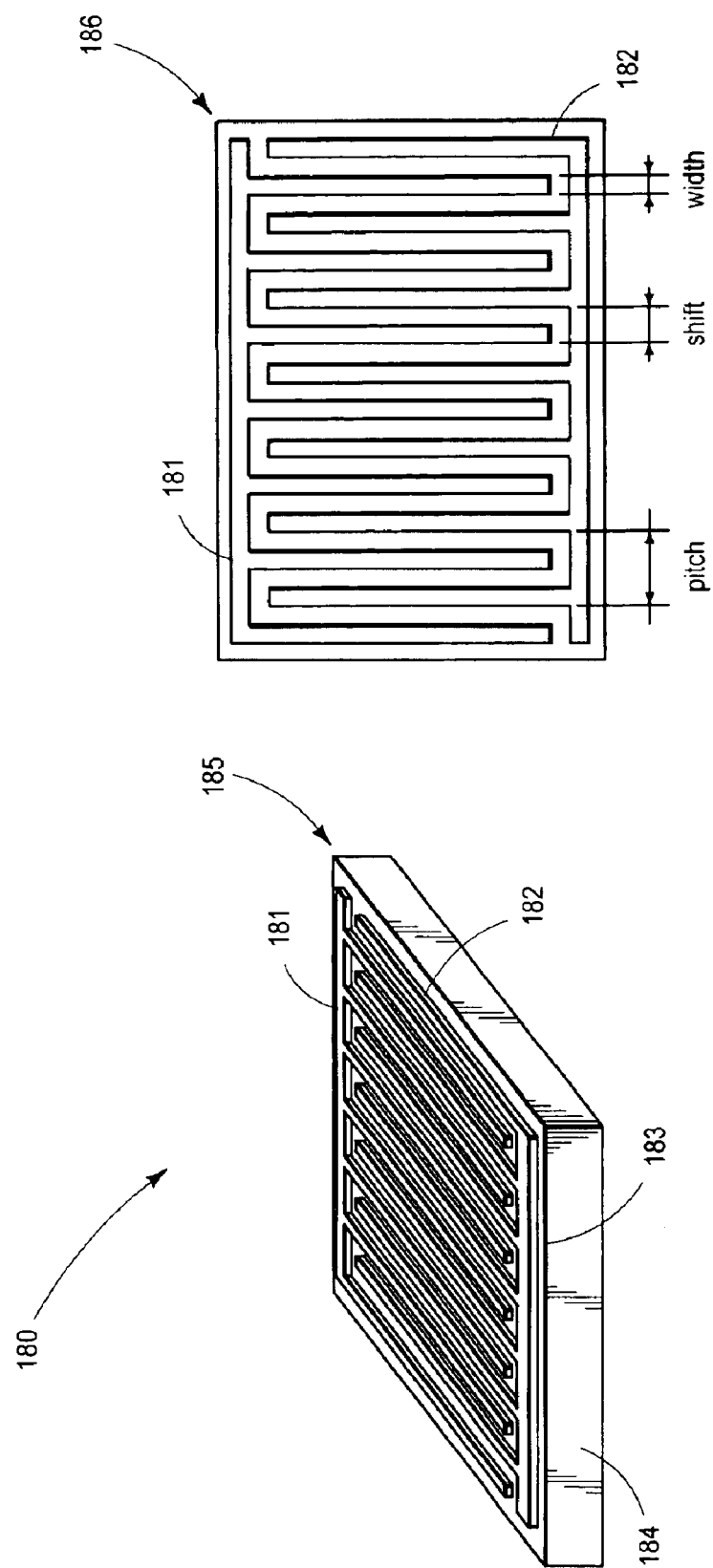
FIG. 16 shows views of an exemplary interdigitated circuit for use in one HF de-icer system.

FIG. 16 shows two views of an exemplary interdigitated circuit 180 in accord with one embodiment. Interdigitated circuit 180 includes copper anode 181, interdigitated electrode 182, copper cathode 183, and Kapton substrate 184. Interdigitated circuit 180 may be formed in a manner similar to that discussed in FIG. 15. View 185 shows an isometric view of interdigitated circuit 180, while view 186 shows an overhead view. As shown in view 186, the pitch of interdigitated circuit 180 defines the distal spacing between electrodes of interdigitated electrode 182. The pitch of interdigitated circuit 180 may also define the distal spacing between electrodes of copper anode 181. The shift of interdigitated circuit 180 defines the spacing between electrodes of interdigitated electrode 182 and electrodes of copper anode 181. The width of the interdigitated circuit 180 defines the width dimension of the electrodes of anode 181. The width of interdigitated circuit 180 may also define the width dimension of the electrodes of interdigitated electrode 182.

Interdigitated circuit 180 may be employed to modify friction between an object and ice and/or snow by applying electrical power to interdigitated electrode 182. For example, DC electrical power may be applied to interdigitated electrode 182 according to the equations of FIG. 1. In another example, AC electrical power may be applied to interdigitated electrode 182.

In one embodiment, interdigitated circuit 180 modifies a coefficient of friction of an object's surface-to-ice interface in cooperation with natural friction change between an object and ice or snow over temperature. For example, a steel object "slider" slides on ice when at a velocity of 3.14 m/s, the friction coefficient of the slider on the ice drops from 0.025 at −15° C. to 0.01 at −1° C. To increase the temperature of ice that is in direct contact with the slider, interdigitated circuit 180 can either heat the ice directly using HF electric fields or heat a surface of the slider.

Interdigitated circuit 180 may be affixed at the surface of the slider that is typically in contact with ice and snow. Either AC or DC electrical power may be applied to interdigitated circuit 180 to heat the surface of the slider. For example, application of the electrical power to the surface of the slider according to the equations of FIG. 1 may heat the ice and/or the surface and change the coefficient of friction between the slider surface and the ice.

In one embodiment, HF AC electrical power is applied to interdigitated circuit 180 so as to directly heat the ice. When HF power is applied to the electrodes of interdigitated circuit 180, electric field lines, such as electric field lines 153 of FIG. 13, penetrate into an interfacial layer of ice and generate Joule's electric heating in the ice, as follows:

$$W_h = \sigma_i E^2, \text{ where} \qquad \text{(Eq. 16-1)}$$

$W_h$ is heating power in watts per cubic meter, $\sigma_i$ is conductivity of ice or snow, and E is electric-field strength. The electric field penetrates ice or snow to a depth that is approximately the same as the distance d, or pitch, between the electrodes of interdigitated circuit 180. Accordingly, the heating power $W_h$ follows the equation:

$$W_h \approx \sigma_i \cdot \frac{V^2}{d^2}, \qquad \text{(Eq. 16-2)}$$

where
V is the rms AC voltage. While the power $W_h$ of Eq. 16-2 relates to electric power per unit volume, power per square meter $W_s$ of an ice/slider interface is of greater concern. To estimate the power per square meter $W_s$, the power $W_h$ is multiplied by the thickness of the heated layer, approximately d, as previously indicated. Therefore, the power per square meter $W_s$ follows the equation:

$$W_s \approx \sigma_i \cdot \frac{V^2}{d}. \tag{Eq. 16-3}$$

The heating power per square meter $W_s$ may be limited by air electric breakdown of electrified strength $E_b$, therefore:

$$\frac{V}{d} \le E_b \approx 3 \cdot 10^6 \text{ V/m} \tag{Eq. 16-4}$$

From Eq's 16-3 and 16-4, the relation for maximum heating power of HF voltage as measured per unit area of a slider is derived as follows:

$$W_s \le \sigma_i \cdot d \cdot E_b^2. \tag{Eq. 16-5}$$

For substantially pure ice at $-10°$ C., conductivity of the ice at high-frequencies (e.g., greater than 10 kHz) is about $2 \cdot 10^{-5}$ S/m. Inputting the values of conductivity $\sigma_i$, electrified strength $E_b$, and a distance of d≈0.25 mm (e.g., a typical dimension within HF-deicers) into Eq. 16-5 establishes a maximum limit for HF-heating power at:

$$W_s \le 45 \text{ kW}/m^2. \tag{Eq. 16-6}$$

A more realistic power used to increase the temperature of the interfacial layer of ice by $\Delta T$ can be calculated according to the following equation:

$$W_{speed} = l_D \cdot a \cdot v \cdot \rho \cdot C \cdot \Delta T, \text{ where} \tag{Eq. 16-7}$$

where v is slider velocity, $\rho$ is density of ice or snow, a is slider width, C is ice specific heat capacitance, and $l_D$ is a heat diffusion length in ice or snow. The heat diffusion length $l_D$ is of the form:

$$l_D = \sqrt{D \cdot t}, \text{ where} \tag{Eq. 16-8}$$

t is time in which a particular location of ice is in contact with the slider of the following form:

$$t = \frac{L}{v}, \tag{Eq. 16-9}$$

where
L is slider length, and D is a heat diffusion coefficient of the following form:

$$D = \frac{\lambda}{C \cdot \rho}, \tag{Eq. 16-10}$$

where
$\lambda$ is the thermal conductivity of ice or snow. Substitution of Eqs. 16-8, 16-9 and 16-10 into Eq. 16-7 yields the following power estimate for modifying the coefficient of friction between the ice and the slider:

$$W_{speed} = a \cdot \Delta T \sqrt{v \cdot \lambda \cdot C \cdot L \cdot \rho}. \tag{Eq. 16-11}$$

As a practical numerical example, two skis with a total width of approximately $a=10^{-1}$ m and a length of L=1.5 m may employ interdigitated circuit 180 to modify the coefficient of friction between the skis and snow. Assume the skis are traveling at velocity of v=10 m/s. Snow density $\rho$ is $$\rho = 3 \cdot 10^2 \frac{\text{kg}}{\text{m}^3}, \tag{Eq. 16-12}$$

the change in temperature of the interfacial layer of snow $\Delta T$ is $$\Delta T = 1° \text{ C., and} \tag{Eq. 16-13}$$

the specific heat capacitance of snow C is $$C = 2 \cdot 10^3 \frac{\text{J}}{\text{m} \cdot \text{K}}. \tag{Eq. 16-14}$$

From these values, the power requirement estimate $W_{speed}$ can be calculated as follows:

$$W_{speed} = 134 W. \tag{Eq. 16-15}$$

Since only a small fraction of the skis may actually be in contact with the snow at any given time, the power requirement estimate $W_{speed}$ can be further decreased to a fraction of $W_{speed}$, or $W_{speed-fraction}$, according to the following:

$$W_{speed-fraction} = \frac{W}{H \cdot a \cdot L}, \tag{Eq. 16-16}$$

where
W is a skier's weight and H is a compressive strength of the snow in Pascals (Pa). For a heavy skier (e.g., 100 kg) and $H=10^5$ Pa, $W_{speed-fraction}$ can be calculated as:

$$W_{speed-fraction} \approx 6.6\%. \tag{Eq. 16-17}$$

Accordingly, the HF-power needed to modify the coefficient of friction is then:

$$W_{speed} = 134 W \times 0.066 \approx 9 W. \tag{Eq. 16-18}$$

While this embodiment shows one example of an application for interdigitated circuit 180 (e.g., applied to skis), those skilled in the art should appreciate that interdigitated circuit 180 may be employed to modify the coefficient of friction between ice and surfaces of other objects, including for example snowboards and snowshoes.

HF De-icer System Analysis

Certain operative characteristics of various HF de-icer systems are next analyzed and described. In the following exemplary analyses, certain component values are varied to illustrate various conditions, such as changing environmental conditions and/or changing heat transfer methods.

Figure 17:
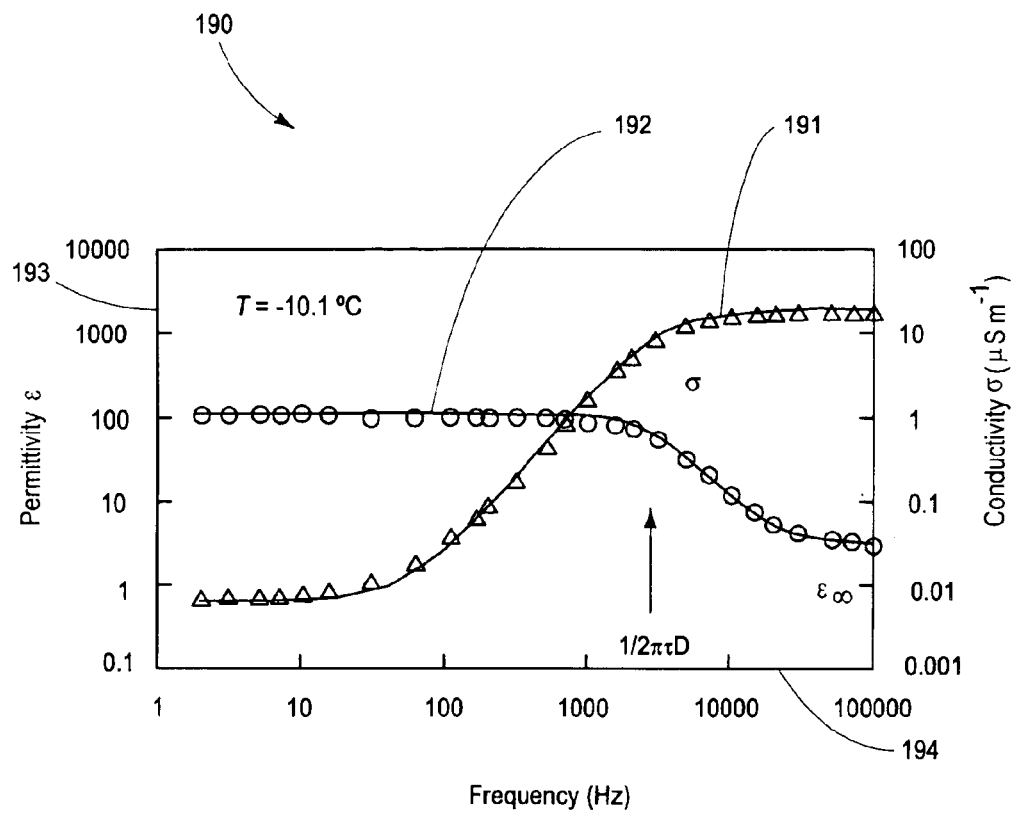
FIG. 17 shows a graph of frequency dependence of ice conductivity and ice dielectric permittivity.

FIG. 17 shows a graph 190 illustrating frequency dependence of ice conductivity and ice dielectric permittivity. In graph 190, Y-axis 193 represents permitivity $\epsilon$ and X-axis 194 represents frequency. Graph 190 also summarizes HF heating power for interdigitated circuits, such as interdigitated circuit 180 of FIG. 16.

When an electrically conductive material is placed in an electric field E, a heat density per cubic meter W is generated as follows:

$$W = \sigma E^2, \text{ where} \tag{Eq. 17-1}$$

$\sigma$ is the material electrical conductivity (e.g., ice conductivity). As evident from Eq. 17-1, the heat density is linearly proportional to the conductivity and is quadratically dependent on the electric field strength. Therefore, to increase a heating rate and, thereby, reduce de-icing time, ice conductivity and/or electric field strength may be increased.

Ice electrical conductivity depends on temperature, frequency, and impurities within the ice. Ice conductivity is illustratively increased by adjusting a frequency of AC power used to modify a coefficient of friction between ice and a surface of an object. As such, frequency dependence of ice conductivity may be written as:

$$\sigma'(\omega) = \sigma_s + \frac{\omega^2 \tau_D^2 (\sigma_\infty - \sigma_s)}{1 + \omega^2 \tau_D^2}, \quad \text{(Eq. 17-2)}$$

where
$\sigma_s$ and $\sigma_\infty$ are static and HF conductivities of ice, respectively, $\Omega$ is the radial frequency of the AC power, and $\tau_D$ is an ice dielectric relaxation time.

In graph 190, conductivity varies as frequency is increased in an exemplary temperature environment of about $-10.1°$ C. For example, conductivity increases with increasing frequency in curve 191 while conductivity decreases with increasing frequency in curve 192. Accordingly, curves 191 and 192 illustrate different ways in which to vary the conductivity of an ice-object interface by adjusting HF heating power frequency.

In graph 190, at $-10.1°$ C., ice has an electrical conductivity of about 0.1 $\mu$S/m at approximately 10 kHz. Ice conductivity decays exponentially when temperature decreases. Accordingly, the conductivity of ice at $-30°$ C. would be about one order of magnitude less than conductivity of ice at $-10°$ C.

Dimensions of an HF deicer heating element, such as interdigitated circuit 180 of FIG. 16, may depend on ice conductivity and a desired rate of heating. Accordingly, when generating heat per square meter W' in a thickness of an interfacial layer of ice using an applied voltage V with a distance d between the electrodes, the electric field strength E follows the equation:

$$E = V/d. \quad \text{(Eq. 17-3)}$$

The heat per square meter W', thereby follows the equation:

$$W' = W \cdot d. \quad \text{(Eq. 17-4)}$$

After combining Eqs. 17-1 through 17-4, the heating power per square meter is derived as follows:

$$W' = \sigma V^2 / d. \quad \text{(Eq. 17-5)}$$

As an example, a typical heating density for a car windshield is about 1 kW/m$^2$ and a typical applied voltage V is about 100 volts. Using these values and the value for ice conductivity in Eq. 17-5 returns a value of about 0.1 mm for the pitch of the electrodes. While this example provides typical estimates for electrode pitch, other embodiments may vary. For example, ice conductivity and electrode dimensions may also depend on thickness and electrical properties of protective layers that coat the electrodes.

Figure 18:
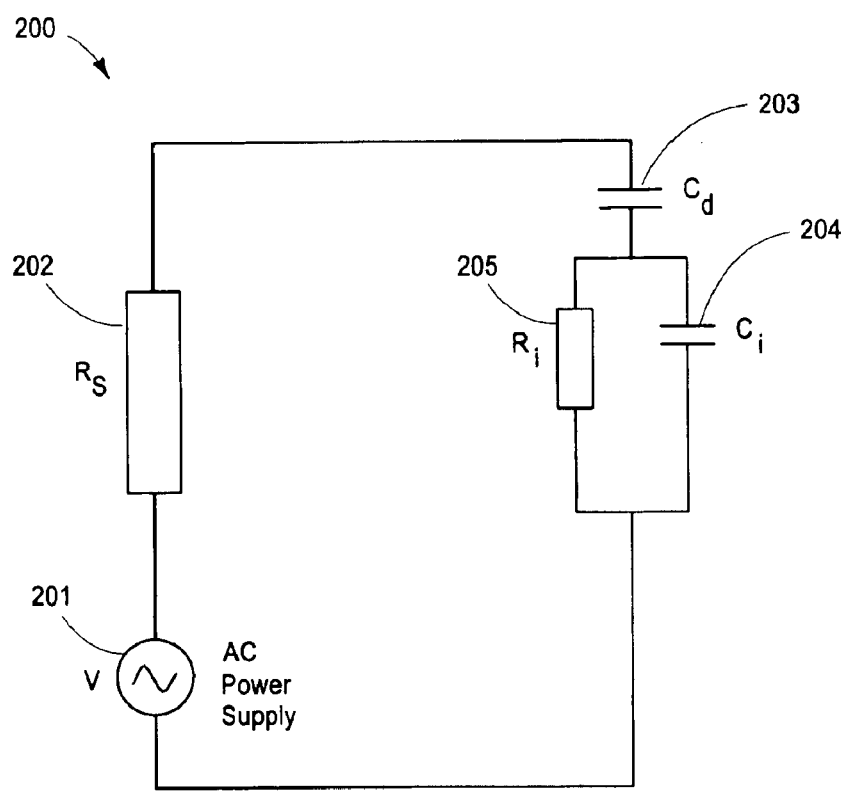
FIG. 18 shows an exemplary circuit characterizing one HF de-icer.

FIG. 18 shows an exemplary circuit 200 characterizing an HF de-icer in accord with one embodiment. Circuit 200 has an AC power supply 201, a capacitor 203, a capacitor 204, a resistor 202, and a resistor 205. Resistor 202 is coupled to power supply 201 and to capacitor 203 and has a resistance $R_s$ representing an internal resistance of power supply 201. Resistor 205 is coupled in parallel with capacitor 204 and has a resistance $R_i$ representing ice resistance. Capacitor 204 has a capacitance $C_i$ representing an ice layer capacitance. Capacitor 203 is coupled to resistor 205 and capacitor 204 and has a capacitance $C_d$ representing capacitance of a protective dielectric layer on de-icing electrodes, such as coil 141 shown and described in FIG. 12. Circuit 200 represents an electric circuit diagram suitable to simulate and analyze certain de-icing systems hereof.

FIGS. 19–23 graphically illustrate certain test analyses of circuit 200 in accord with one embodiment in which circuit 200 has a dielectric layer that envelops electrodes (e.g., a circuit such as interdigitated circuit 180, FIG. 16, with a dielectric layer enveloping the electrodes). In this embodiment, circuit 200 may be characterized by the following Table 19-1:

TABLE 19-1

$\epsilon_0 := 8.85 \cdot 10^{-12}$
$f := 10, 100 \ldots 1 \cdot 10^5$
$\omega(f) := 2 \cdot \pi \cdot f$
$T := 243, 244 \ldots 273$ $$\tau_D(T) := 1.5 \cdot 10^{-4} \cdot \exp\left[6670\left(\frac{1}{T} - \frac{1}{253}\right)\right]$$

$$\varepsilon_s(T) := \frac{25047}{T}$$

$\epsilon_{inf} := 3.2$ $$\sigma_{inf}(T) := 1.8 \cdot 10^{-5} \cdot \exp\left[6670\left(\frac{1}{253} - \frac{1}{T}\right)\right]$$

$\sigma_0 := 10^{-8}$ $$\varepsilon(f, T) := \varepsilon_{inf} + \frac{(\varepsilon_s(T) - \varepsilon_{inf})}{1 + (\tau_D(T) \cdot \omega(f))^2}$$

$$\sigma(f, T) := \left[\frac{[(\sigma_{inf}(T) - \sigma_0) \cdot (\tau_D(T) \cdot \omega(f))^2]}{1 + (\tau_D(T) \cdot \omega(f))^2}\right] + \sigma_0$$

$d := 10^{-7}, 2 \cdot 10^{-7} \ldots 3 \cdot 10^{-5}$
$\epsilon_d := 9.9$ $$C_d(d) := \frac{\varepsilon_0 \cdot \varepsilon_d}{8d}$$

$l := 2.5 \cdot 10^{-4}$
$V = 500$
$R_s := 0$ $$R_i(f, T, d) := \frac{4\left(\frac{3}{2}l - 2 \cdot d\right)}{\sigma(f, T)}$$

$$C_i(f, T, d) := \frac{\varepsilon_0 \cdot \varepsilon(f, T)}{4\left(\frac{3}{2}l - 2 \cdot d\right)}$$

$$Z_i(f, T, d) := \frac{R_i(f, T, d)}{2\pi \cdot f \cdot i \cdot C_i(f, T, d) \cdot \left(R_i(f, T, d) + \frac{1}{2 \cdot \pi \cdot f \cdot i \cdot C_i(f, T, d)}\right)}$$

$$Z(f, T, d) := Z_i(f, T, d) + \frac{1}{2 \cdot \pi \cdot f \cdot i \cdot C_d(d)}$$

$$I(f, T, d) := \frac{V}{R_S + Z(f, T, d)} \pi$$

$P_i(f, T, d) := V \cdot \text{Re}(I(f, T, d))$
$\epsilon_w := 80$
$\sigma_w = 5 \cdot 10^{-4}$ TABLE 19-1-continued $$R_w(d) := \frac{4\left(\frac{3}{2}l - 2 \cdot d\right)}{\sigma_w}$$

$$C_w(d) := \frac{\varepsilon_0 \cdot \varepsilon_w}{4\left(\frac{3}{2}l - 2 \cdot d\right)}$$

$$Z(f, d) := \frac{R_w(d)}{2\pi \cdot f \cdot i \cdot C_w(d) \cdot \left(R_w(d) + \frac{1}{2 \cdot \pi \cdot f \cdot i \cdot C_w(d)}\right)}$$

$$Z_w(f, d) := Z(f, d) + \frac{1}{2 \cdot \pi \cdot f \cdot i \cdot C_d(d)}$$

$$I_w(f, d) := \frac{V}{R_S + Z_w(f, d)}$$

$$P_w(f, d) := V \cdot Re(I_w(f, d)),$$

where $\varepsilon_0$ is free space permittivity, f is incremental frequency, $\omega$ is radial frequency as a function of f, T is incremental ambient temperature in K, $\tau_D$ is an ice dielectric relaxation time, $\varepsilon_s$ is a static dielectric permittivity of ice, $\varepsilon_{inf}$ is a high-frequency permittivity of ice, $\sigma_{inf}$ is a high-frequency conductivity of ice, $\sigma_0$ is a static conductivity of ice, $\varepsilon$ is an ice permittivity (e.g., as a function of frequency f and temperature T), $\sigma$ is an ice conductivity (e.g., as a function of frequency f and temperature T), d is a thickness of the protective dielectric layer, $\varepsilon_d$ is a permittivity of the protective dielectric layer l, V is voltage, $Z_i$ is impedance of ice (e.g., as a function of frequency f, temperature T, and distance d), Z(f,T,d) is a total circuit impedance with ice covering the electrodes (e.g., as a function of frequency f, temperature T, and distance d), I is applied current (e.g., as a function of frequency f, temperature T, and distance d), $P_i$ is power delivered to heat the ice (e.g., as a function of frequency f, temperature T, and distance d), $\varepsilon_w$ is a permittivity for water, $\sigma_w$ is a conductivity for water, $R_w$ is a water resistance, $C_W$ is a water capacitance, Z(T,d) is a total circuit impedance with water covering the electrodes (e.g., as a function of frequency f and distance d), $Z_w$ is impedance for water (e.g., as a function of frequency f and distance d), $I_w$ is applied current (e.g., as a function of frequency f and distance d), and $P_w$ is power delivered to the water (e.g., as a function of frequency f and distance d). Electric power was calculated for both of the following cases: when ice covers the electrodes, and when ice was melted and water is in contact with the electrodes.

Figure 19:
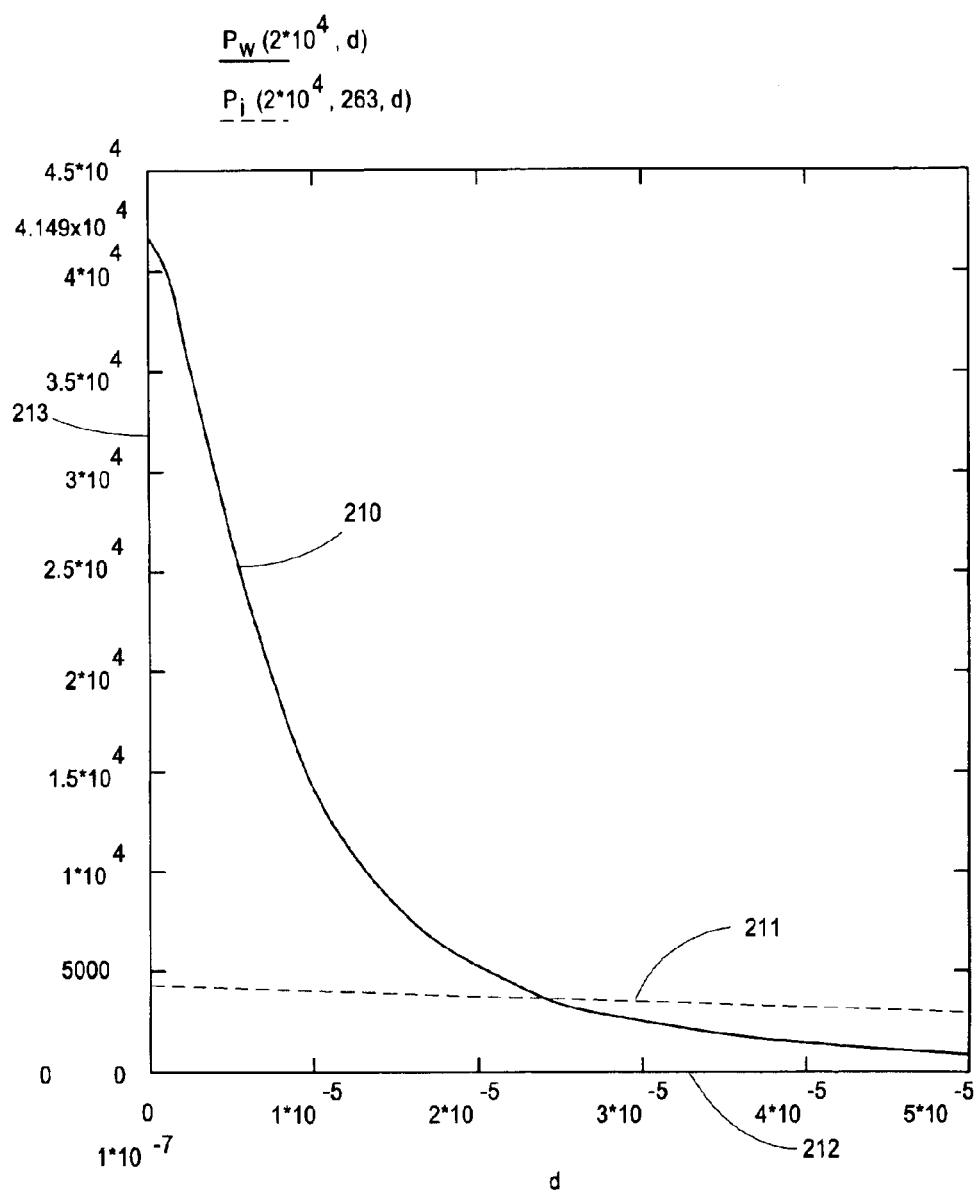
FIGS. 19–29 graphically illustrate certain test analyses of the circuit of FIG. 18.

FIG. 19 illustrates the dependence of heating power generated in distilled water (i.e., plot 210) at 20° C. and in ice (i.e., plot 211) at −10° C. on a thickness of a dielectric coating on the electrodes. In FIG. 19, Y-axis 213 represents heating power per m² and X-axis 212 represents thickness of the dielectric coating, in meters. In this embodiment, the coating was an alumina coating. The frequency of the AC power was about 20 kHz at a voltage of about 500 volts rms. At a coating thickness of about 25 μm, the heating powers for water and ice are approximately equal.

Figure 20:
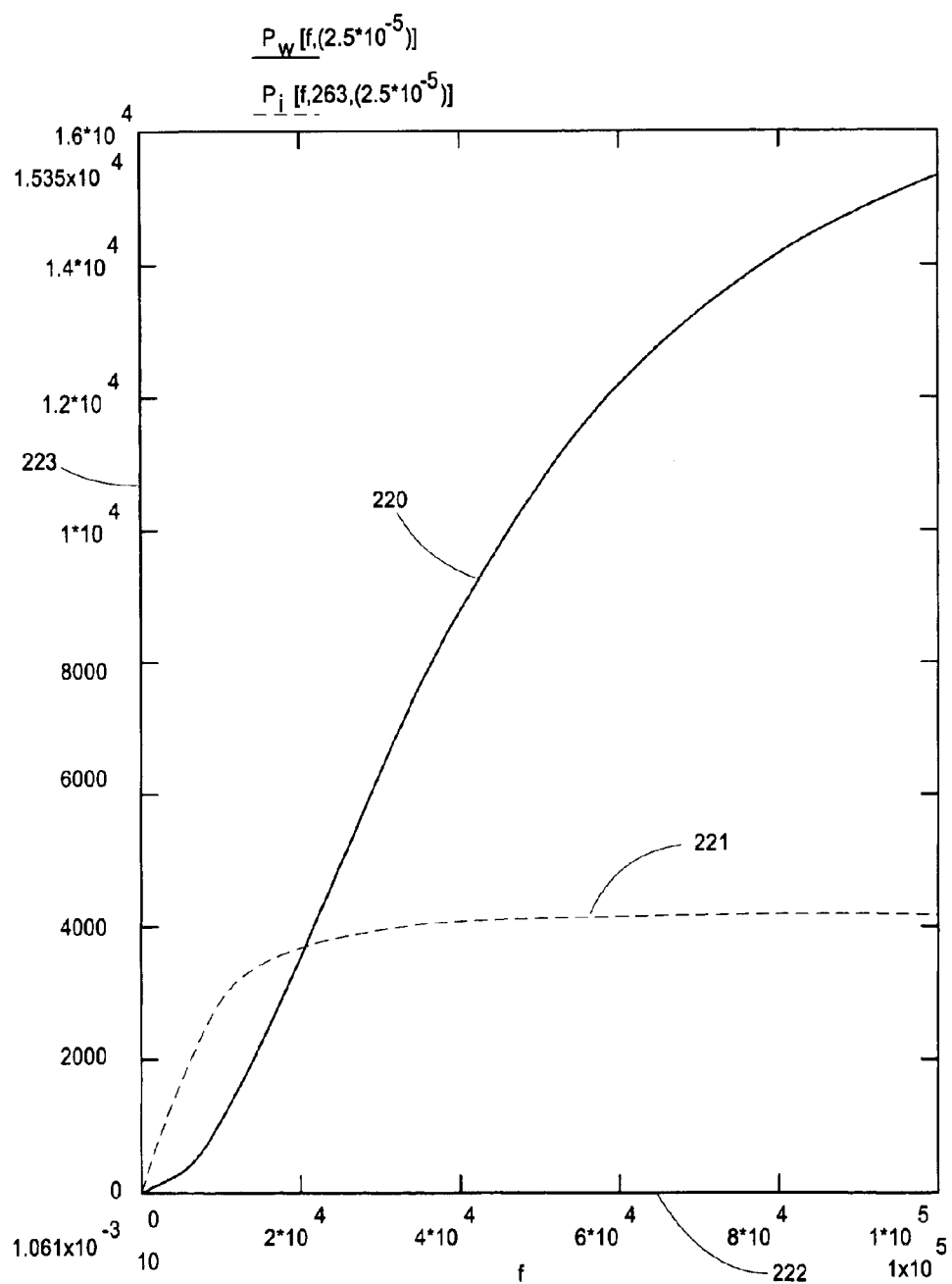

FIG. 20 illustrates the dependence of heating power generated in distilled water (i.e., plot 220) at 20° C. and in ice (i.e., plot 221) at −10° C. on frequency. In FIG. 20, Y-axis 223 represents heating power in watt/m² and X-axis 222 represents frequency in Hz. At about a frequency of 20 kHz, the respective heating powers for water and ice are equal. It is useful to match the heating powers for water and ice to prevent cold or hot patches on the de-icer at which ice melted.

Figure 21:
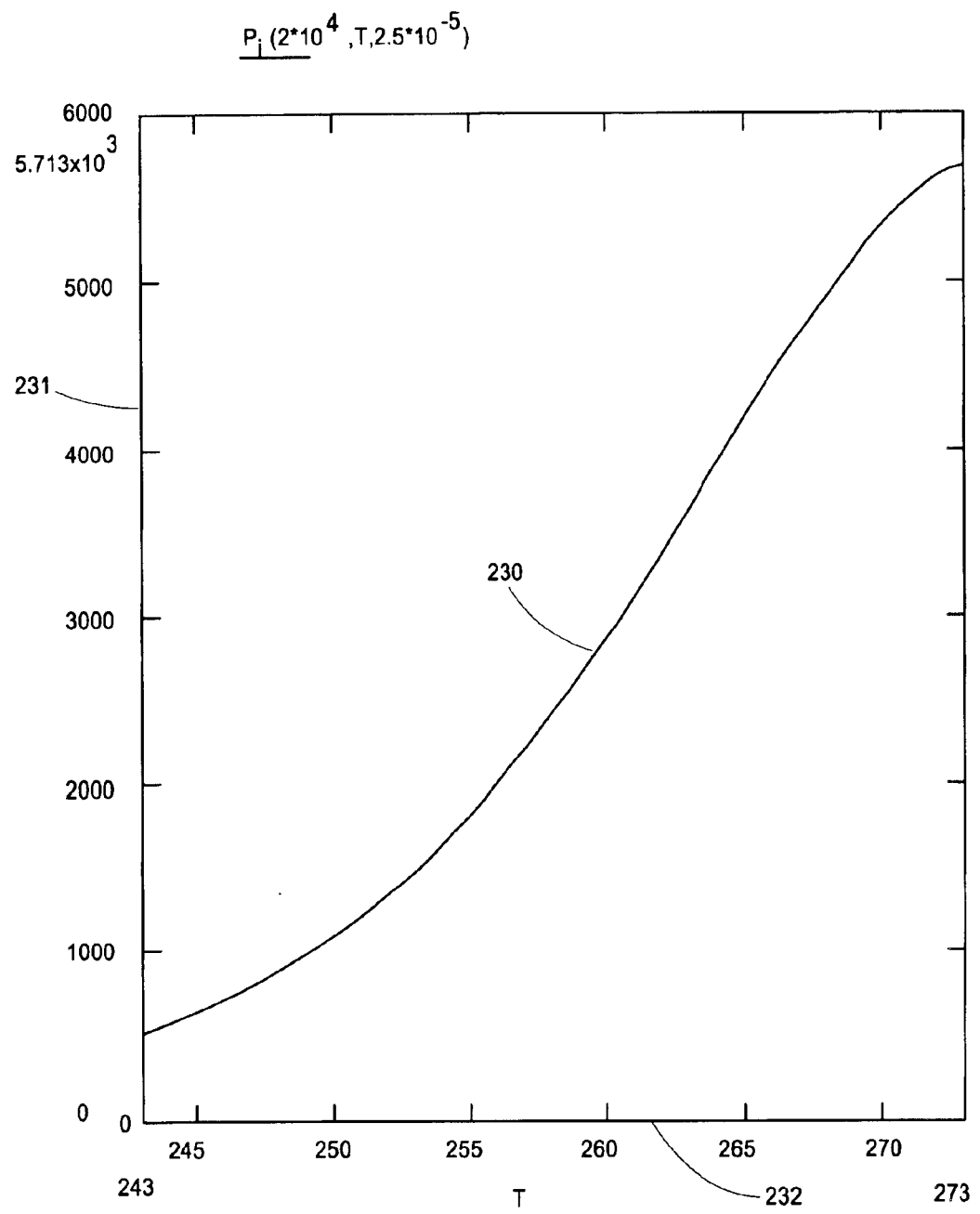

FIG. 21 illustrates the dependence of heating power generated in ice (e.g., plot 230) on temperature. In FIG. 21, Y-axis 231 represents heating power in watt/m² and X-axis 232 represents temperature in K. Accordingly, a dielectric coating on the electrodes of an HF deicer may be used to tune of de-icer performance.

Figure 22:
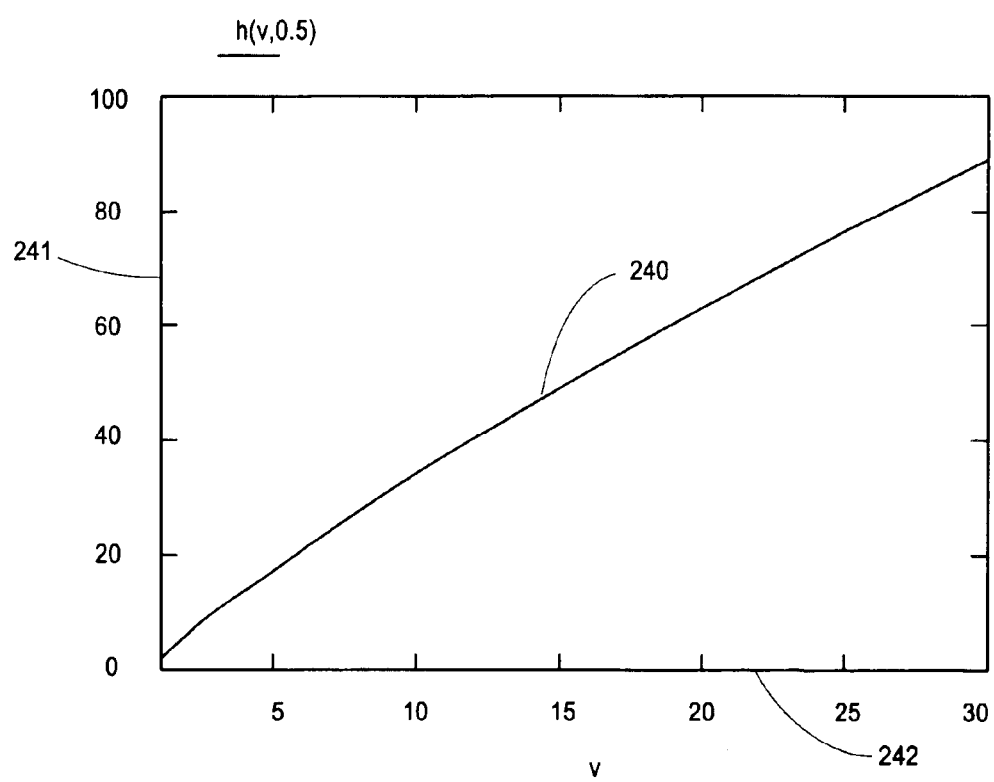

FIG. 22 illustrates the dependence of a heat transfer coefficient (watt/m² K) on air velocity (m/s) (i.e., plot 240). In FIG. 22, Y-axis 241 represents heat transfer coefficient h and X-axis 242 represents velocity v. FIG. 22 may assist in determining calculations of HF power for de-icing and/or anti-icing on a flat windshield. The size of a windshield used within FIG. 22 is 0.5 m. In the illustrated embodiment, circuit 200 operates as a HF de-icer with differing modes, such as a de-icing mode and an anti-icing mode, as applied to the windshield. Table 19-2 shows a MathCad file used to calculate the convective heat exchange coefficient for the car windshield:

TABLE 19-2 v := 1, 1.1 . . . 30
L := 0.1, 0.2 . . . 1
$Re_{tr} := 10^5$
v := 1.42 · 10$^{-5}$ $$Re_L(v, L) := \frac{v \cdot L}{v}$$

k := 0.0235
Pr := 0.69
$Re_L(20, 0.5) = 7.042 \times 10^5$ $$h(v, L) := \frac{k}{L} \cdot \left[0.664 Re_{tr}^{0.5} \cdot Pr^{\frac{1}{3}} + 0.036 Re_L(v, L)^{0.8} \cdot Pr^{0.43} \cdot \left[1 - \left(\frac{Re_{tr}}{Re_L(v, L)}\right)^{0.8}\right]\right]$$

where
v is air velocity, L is a length of the windshield surface, Re is a range of Reynolds number from $10^5$ to $10^7$, h(v, L) is a heat transfer coefficient (e.g., as a function of voltage and L), k is on air thermal conductivity, and Pr is air Prandtl number, and v is the air kinematic viscosity coefficient. In this embodiment, the heat transfer coefficient h(v, L) at about 30 m/s and a length of about 0.5 meters was 89.389 w/m²K. Accordingly, FIG. 22 graphically shows (in plot 240) the relationship of the heat transfer coefficient h(v, L) to air velocity.

Figure 23:
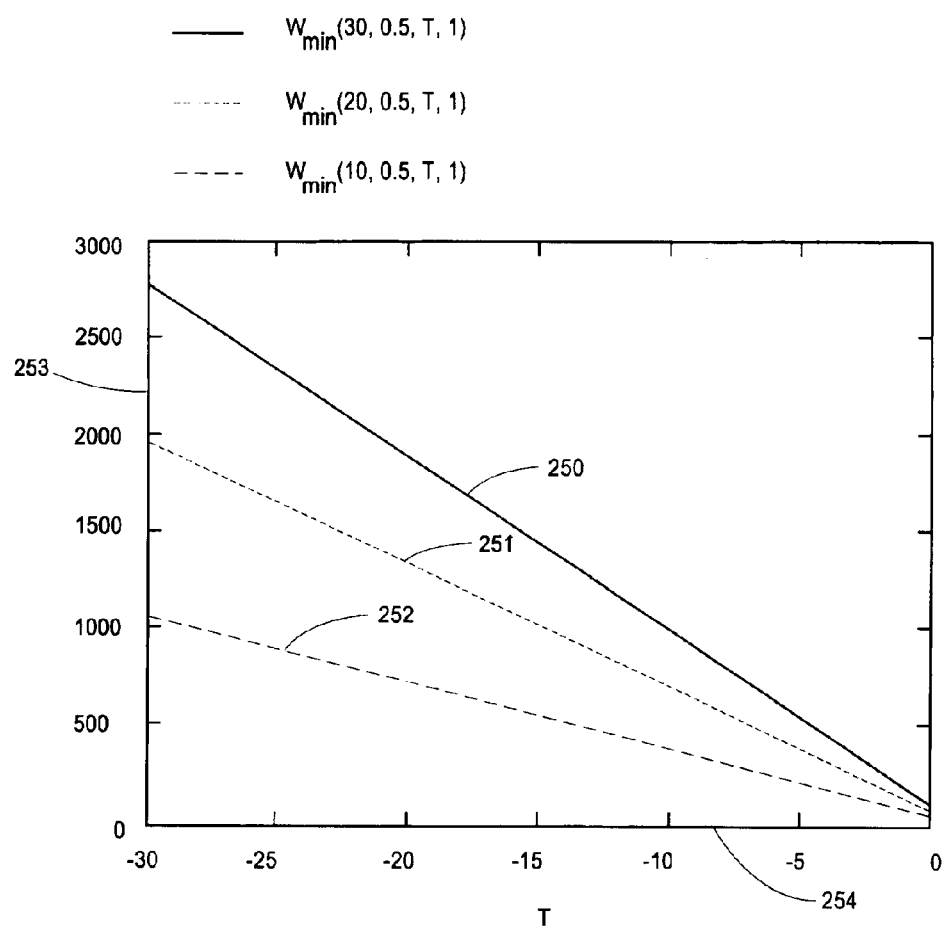

FIG. 23 illustrates one dependence of minimum HF power $W_{min}$ of circuit 200 on outside temperature T (in °) for vehicle velocities of 10 m/s (plot 252), 20 m/s (plot 251), and 30 m/s (plot 250). In FIG. 23, Y-axis 253 represents minimum HF power $W_{min}$ (watt/m²) and X-axis 254 represents temperature T. The minimum heating power $W_{min}$ to maintain the outer surface of the windshield at about 1° C. is shown in the following Table 19-3 (MathCad file):

TABLE 19-3

S:=0,0.1 . . . 2
T:=0,−1 . . . −30
$W_{min}(v,L,T,S):=h(v,L)\cdot S\cdot(1-T)$, where
S is the windshield area Accordingly, plots 250, 251, and 252 may assist in making decisions with respect to applying power according to the velocity v of a vehicle using circuit 200.

Figure 24:
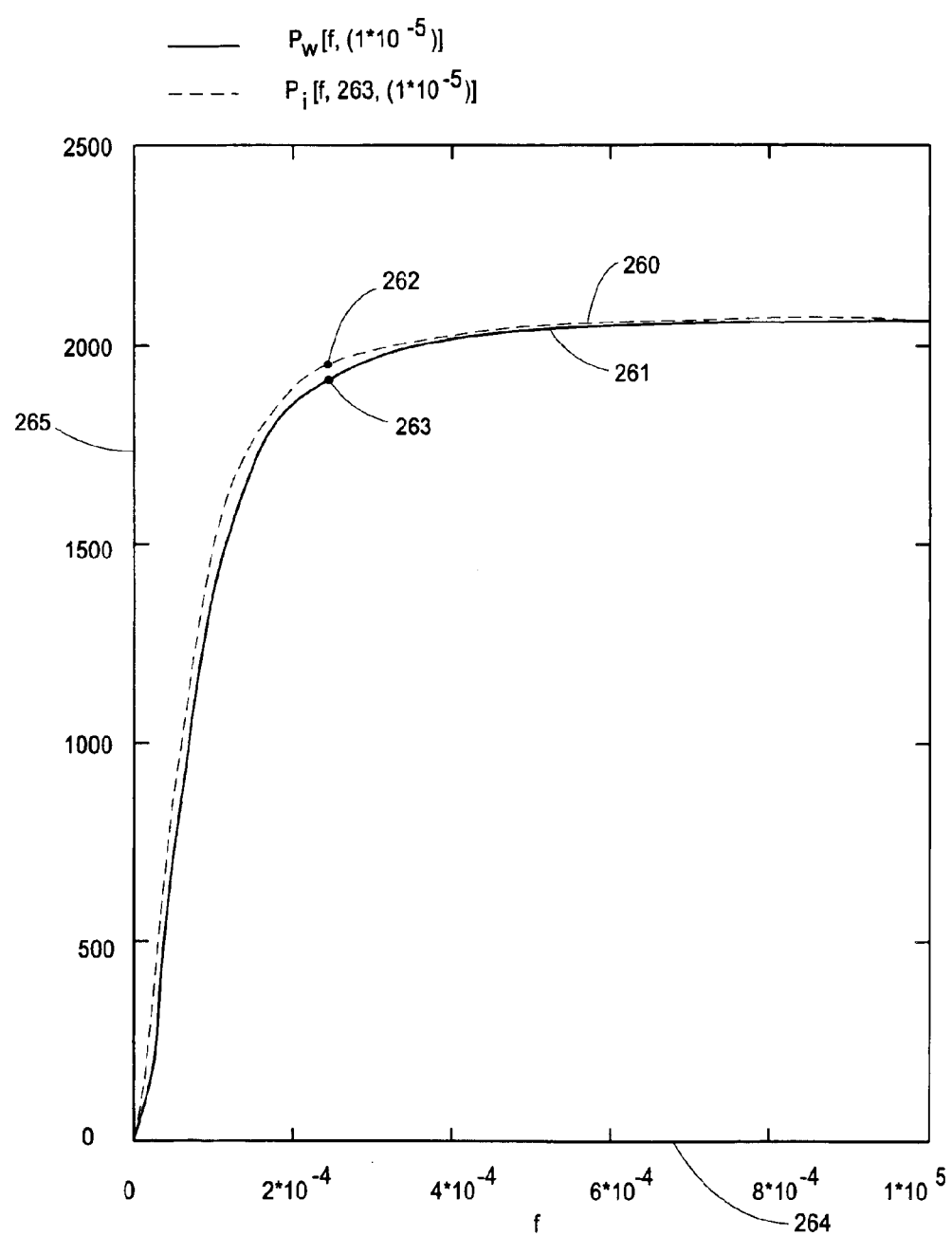
Figure 25:
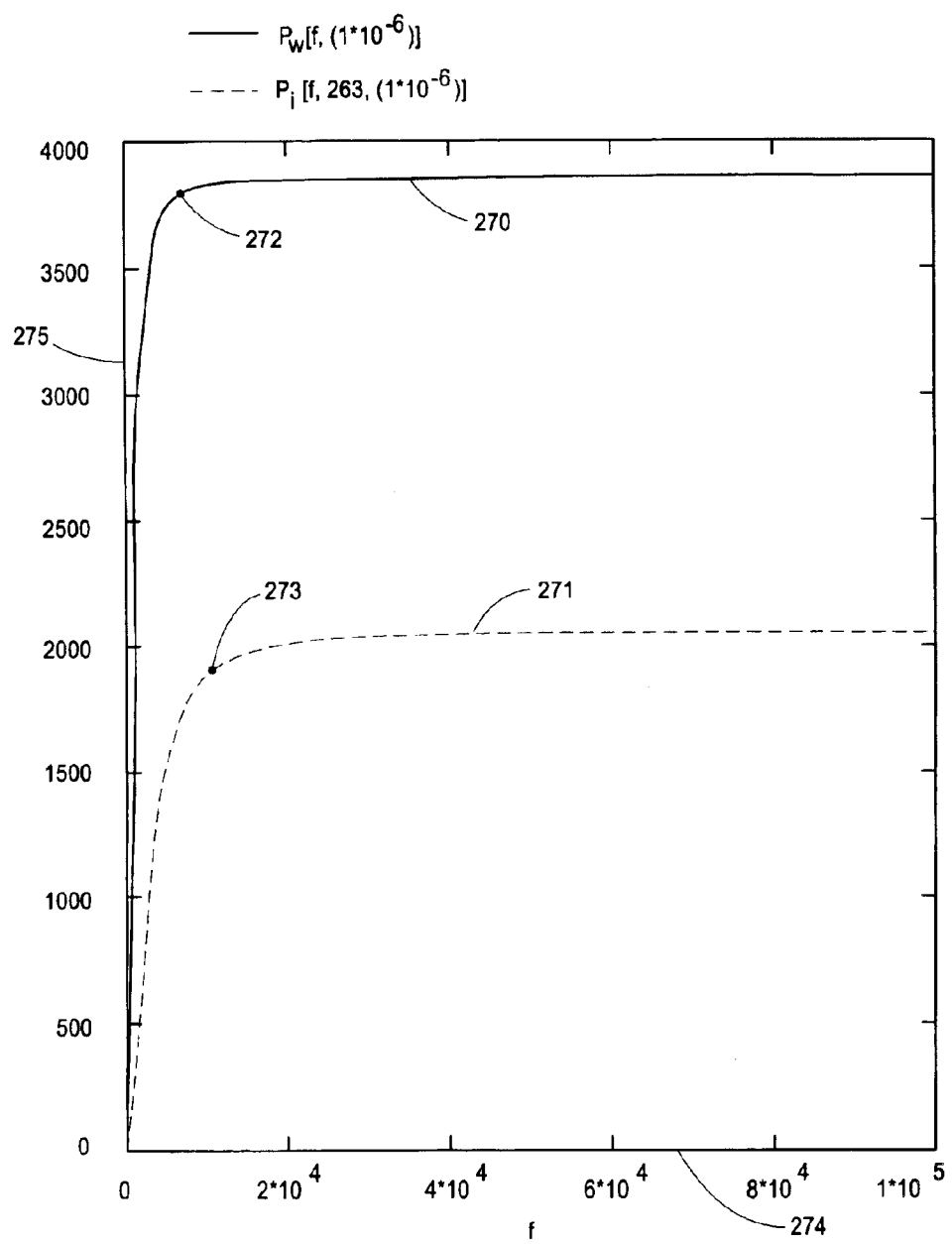
Figure 26:
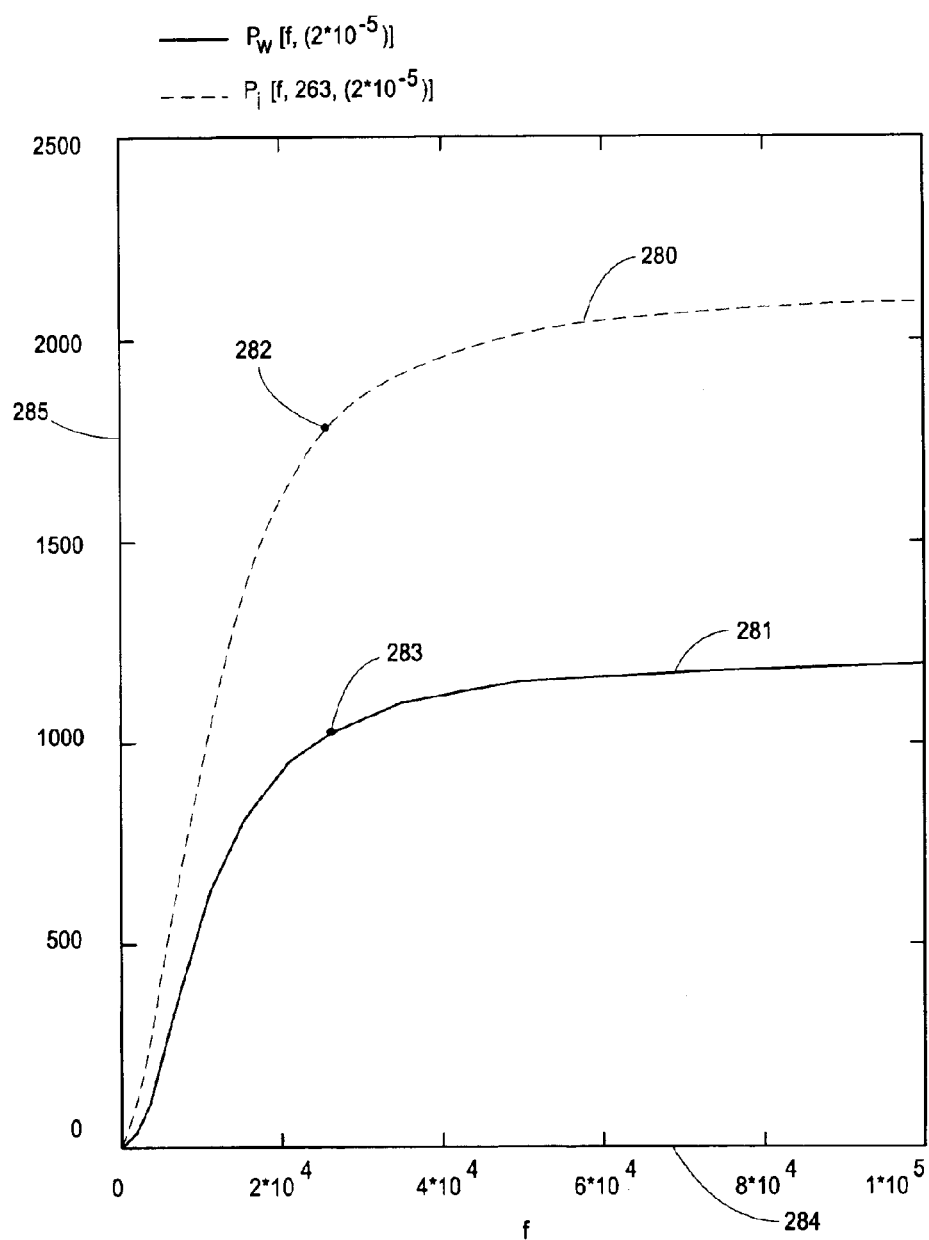

FIGS. 24–26 graphically illustrate another analysis of circuit 200, FIG. 18, in which circuit 200 has a dielectric layer that envelops electrodes (e.g., a circuit such as inter-digitated circuit 180, FIG. 16 with a dielectric layer enveloping the electrodes). In this embodiment, circuit 200 may be characterized by the following Table 24-1 (MathCad file):

TABLE 24-1

$\epsilon_0 := 8.85 \cdot 10^{-12}$
$f := 10, 100 \ldots 1 \cdot 10^5$
$\omega(f) := 2 \cdot \pi \cdot f$
$T := 243, 244 \ldots 273$ $\tau_D(T) := 1.5 \cdot 10^{-4} \cdot \exp\left[6670\left(\frac{1}{T} - \frac{1}{253}\right)\right]$ $\varepsilon_s(T) := \frac{25047}{T}$ $\epsilon_{\inf} := 3.2$ $\sigma_{\inf}(T) := 1.8 \cdot 10^{-5} \cdot \exp\left[6670\left(\frac{1}{253} - \frac{1}{T}\right)\right]$ $\sigma_0 := 10^{-8}$ $\varepsilon(f, T) := \varepsilon_{\inf} + \frac{(\varepsilon_s(T) - \varepsilon_{\inf})}{1 + (\tau_D(T) \cdot \omega(f))^2}$ $\sigma(f, T) := \left[\frac{[(\sigma_{\inf}(T) - \sigma_0) \cdot (\tau_D(T) \cdot \omega(f))^2]}{1 + (\tau_D(T) \cdot \omega(f))^2}\right] + \sigma_0$ $d := 10^{-7}, 2 \cdot 10^{-7} \ldots 3 \cdot 10^{-5}$
$\epsilon_d := 9.9$ $C_d(d) := \frac{\varepsilon_0 \cdot \varepsilon_d}{8d}$ $l := 2.5 \cdot 10^{-4}$
$V = 500$
$R_S := 0$ $R_i(f, T, d) := \frac{4\left(\frac{3}{2}l - 2 \cdot d\right)}{\sigma(f, T)}$ $C_i(f, T, d) := \frac{\varepsilon_0 \cdot \varepsilon(f, T)}{4\left(\frac{3}{2}l - 2 \cdot d\right)}$ $Z_i(f, T, d) := \frac{R_i(f, T, d)}{2\pi \cdot f \cdot i \cdot C_i(f, T, d) \cdot \left(R_i(f, T, d) + \frac{1}{2 \cdot \pi \cdot f \cdot i \cdot C_i(f, T, d)}\right)}$ $Z(f, T, d) := Z_i(f, T, d) + \frac{1}{2 \cdot \pi \cdot f \cdot i \cdot C_d(d)}$ $I(f, T, d) := \frac{V}{R_S + Z(f, T, d)}\pi$ $P_i(f, T, d) := V \cdot \text{Re}(I(f, T, d))$
$\epsilon_w := 80$
$\sigma_w = 5 \cdot 10^{-4}$ $R_w(d) := \frac{4\left(\frac{3}{2}l - 2 \cdot d\right)}{\sigma_w}$ $C_w(d) := \frac{\varepsilon_0 \cdot \varepsilon_w}{4\left(\frac{3}{2}l - 2 \cdot d\right)}$ $Z(f, d) := \frac{R_w(d)}{2\pi \cdot f \cdot i \cdot C_w(d) \cdot \left(R_w(d) + \frac{1}{2 \cdot \pi \cdot f \cdot i \cdot C_w(d)}\right)}$ TABLE 24-1-continued $Z_w(f, d) := Z(f, d) + \frac{1}{2 \cdot \pi \cdot f \cdot i \cdot C_d(d)}$ $I_w(f, d) := \frac{V}{R_S + Z_w(f, d)}$ $P_w(f, d) := V \cdot \text{Re}(I_w(f, d))$, where the variables are the same as those found in Table 19-1, but with different values. For example, $\sigma_w$ is the conductivity for water with the same value of $5 \times 10^{-4}$ S/m FIGS. 24–26 graphically illustrate a dependence of heating power generated in distilled water (plots 261, 270, 281 of respective FIGS. 24, 25 and 26) at 20° C. and in ice (plots 260, 271, 280 of respective FIGS. 24, 25 and 26) at −10° C., which differ in the thickness of the dielectric layer: $10^{-5}$ m (FIG. 24), $10^{-6}$ m (FIG. 25), $2 \cdot 10^{-5}$ m (FIG. 26). The heating power as shown in FIGS. 24, 25 and 26 depends on a frequency of the AC power. As frequency increases, the amount of applied power used to melt an interfacial layer of ice levels off. The AC voltage was about 500 v. At a coating thickness of about 10 μm ($10^{-5}$ m), the respective heating power for water and ice are substantially equal, as is shown from FIG. 24.

Figure 27:
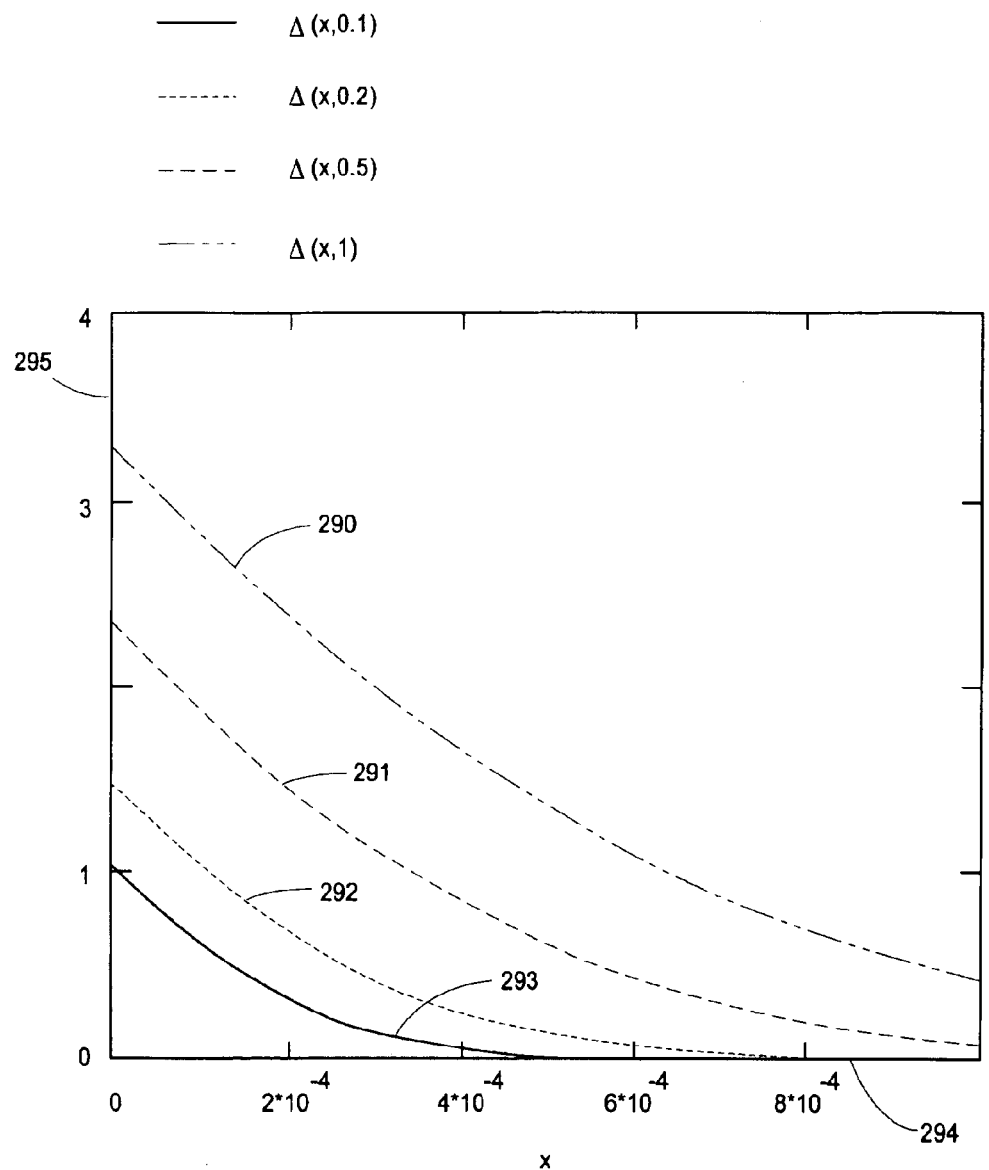
Figure 28:
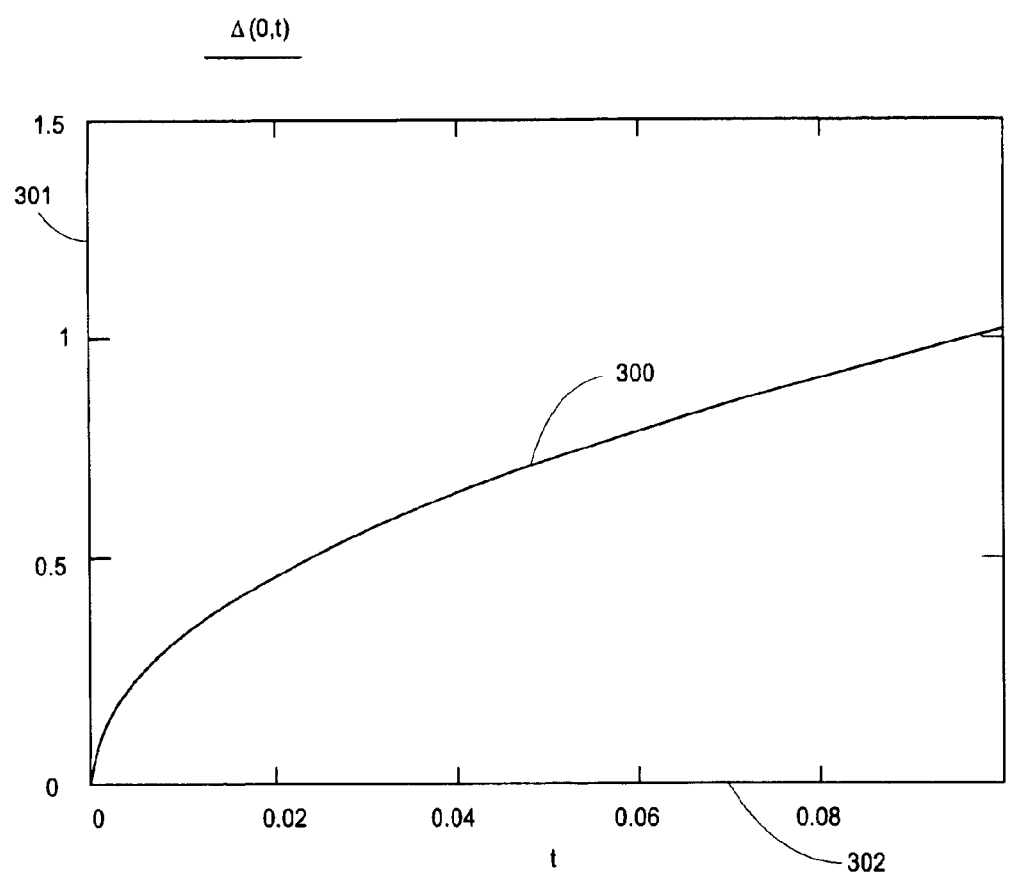
Figure 29:
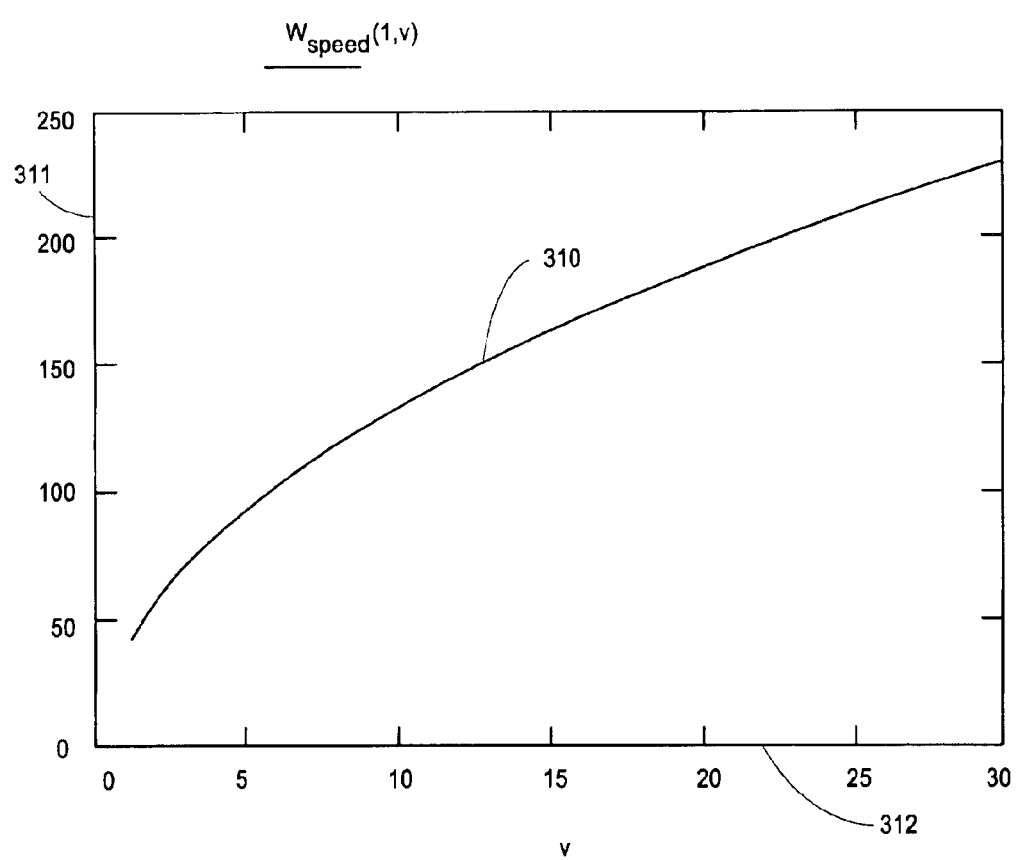

FIGS. 27–29 graphically illustrate certain test analyses of circuit 200 in which circuit 200 is applied to a slider, such as those described in more detail below. In this embodiment, a change in snow temperature under the slider is taken into consideration. Circuit 200 may be characterized by the following Table 26-1 (MathCad file):

TABLE 27-1

$\rho := 300 \frac{\text{kg}}{\text{m}^3}$ $x := 0, 0.0001 \ldots 0.1$ m
$C := 2 \cdot 10^3$ J/kg K $\lambda := 0.2 \frac{2}{\text{mk}}$ $W := 1 \cdot 10^3 \frac{\text{w}}{\text{m}^2}$ $D := \frac{\lambda}{C \cdot \rho}$ $D = 3.333 \times 10^{-7}$ $y(x, t) := \frac{x}{\sqrt{4 \cdot D \cdot t}}$ $\Delta(x, t) := \frac{W}{\lambda} \cdot \sqrt{4 \cdot D \cdot t} \cdot \int_{y(x,t)}^{\infty} (1 - \text{erf}(z)) dz$ $t := 0, 0.001 \ldots 1$ s
$a := 0.1$ m
$L := 1.5$ m
$v := 1, 2 \ldots 30$ $W_{\text{speed}}(\Delta, v) := a \cdot \Delta \cdot \sqrt{v \cdot \lambda \cdot C \cdot L \cdot \rho}$ $W_{\text{speed}}(1, 10) = 134.164$ watt, where
ρ is the snow density, x is the distance inside the snow from the slider, C is the heat capacitance of the snow, λ is a thermal conductivity coefficient of the snow, W is the heating power, D is the thermal diffusivity of snow, t is a duration in which power is applied, a is a slider width, L is a length of the slider, V is a slider velocity, y is an integration variable, $W_{speed}$ is the heating power with respect to speed of the slider, and $\Delta$ is overheating temperature $\Delta$.

FIG. 27 illustrates dependence of snow overheating temperature $\Delta$ (e.g., degrees C.) with respect to the distance from a slider. In FIG. 27, Y-axis 295 represents overheating temperature $\Delta$ (° C.) and X-axis 294 represents distance from the slider (in meters). With a heating power W of about 1 kwatt/m², plots 290, 291, 292, and 293 illustrate temperature dependences for heating pulses having approximate durations of t=0.1 s, 0.2 s, 0.5 s, and 1 s, respectively. FIG. 28 illustrates the snow-slider interface-temperature dependency with respect to time (plot 300) when HF-power of density 1000 watt/m² was applied. In FIG. 28, Y-axis 301 represents overheating temperature $\Delta$ (° C.) and X-axis 302 represents time (in seconds).

FIG. 29 illustrates the heating power required to increase the interface temperature by 1° C. when the slider is traveling at velocity v of about 30 m/s. In FIG. 29, Y-axis 311 represents heating power $W_{speed}$ and X-axis 312 represents velocity v. In the example, as the slider travels at about 5 m/s, the heating power is about 100 watts. The heating power $W_{speed}$ is plotted with respect to velocity v (plot 310).

Figure 30:
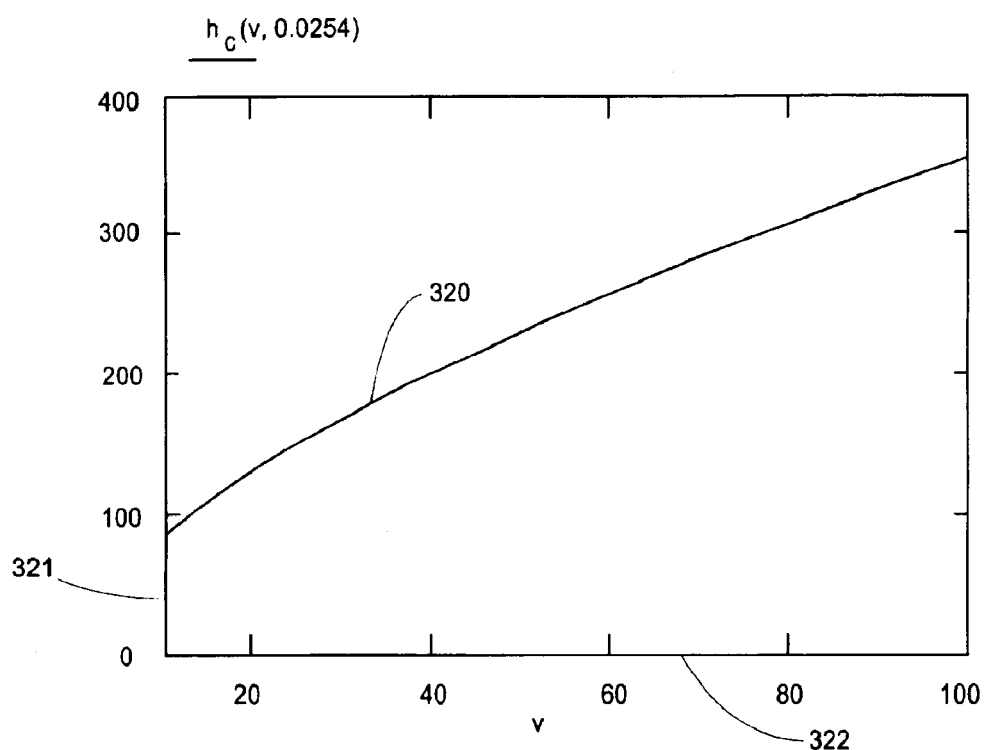
FIGS. 30–35 show graphs illustrating one analysis of heat transfer through convection of one HF de-icer system and heat transfer through a substrate of the HF de-icer system.

FIGS. 30–35 show graphs illustrating one analysis of heat transfer through convection of one de-icer system and heat transfer through a substrate of one HF de-icer system. In the example, a stationary solution (e.g., constant power) is exemplarily characterized. FIG. 30 shows a dependence of a heat transfer coefficient $h_c$ on air velocity (plot 320) assuming a cylindrical aerofoil (the leading edge of an aircraft wing). In FIG. 30, Y-axis 321 represents heat transfer coefficient $h_c$ and X-axis 322 represents velocity v. The heat transfer coefficient $h_c$ for the aerofoil may be calculated according to the following Table 30-1:

TABLE 30-1

(MathCad file)

$v := 89$
$D := 0.03$
$v := 10, 11 \ldots 100$ $$h_c(v, D) := \frac{v^{0.63}}{D^{0.37}} \cdot \frac{0.190 \cdot 0.024 \cdot 0.69^{0.36}}{(1.2 \cdot 10^{-5})^{0.63}} \text{ watt/m}^2\text{K}$$

$h_c(89, 0.254) = 141.057$ watt/m² K
$h_c(89, 0.0254) = 330.669$ watt/m² K, where v is air velocity and D is an aerofoil diameter. Approximately half of the heat transfer coefficient $h_c$ may be attributed to a front section of the aerofoil when using a Reynolds number of about $1.9 \times 10^5$.

In one example, a heat transfer coefficient $h_c$ of about 165 watt/m² K used in an HF de-icer generates a power W of about 4.5 kwatts per square meter. The de-icer includes a polymer layer of thickness d with a thermal conductivity coefficient of $\lambda_d$. Ice is grown on the de-icer with a thickness L. The ice thermal conductivity coefficient is $\lambda$ and the thickness of the heated interfacial layer of ice is about one inter electrode spacing, or about 0.25 mm. A steady-state overheating temperature of the interfacial layer of ice $\Delta = T_i - T_a$, where $T_i$ is the interface temperature and $T_a$ is the ambient temperature, may be calculated according to the following Table 30-2 (Math Cad file):

TABLE 30-2

$W := 4500 \frac{w}{m^2}$ $d := 0.002$ m $h := 165 \frac{w}{m^2 K}$ $L := 0, 0.0001 \ldots 0.01$ m
$l := 0.00001, 0.00002 \ldots 0.001$ m $\lambda := 2.22 \frac{m}{mK}$ $\lambda_d := 0.35 \frac{w}{mK}$ $$\Delta(L, l, \lambda_d) := W \cdot d \cdot \left[ \frac{h \cdot L + (\lambda - l \cdot h) \cdot \left(1 - \exp\left(\frac{-L}{l}\right)\right)}{h \cdot (\lambda \cdot d + L \cdot \lambda_d) + \lambda \cdot \lambda_d} \right]$$

Figure 31:
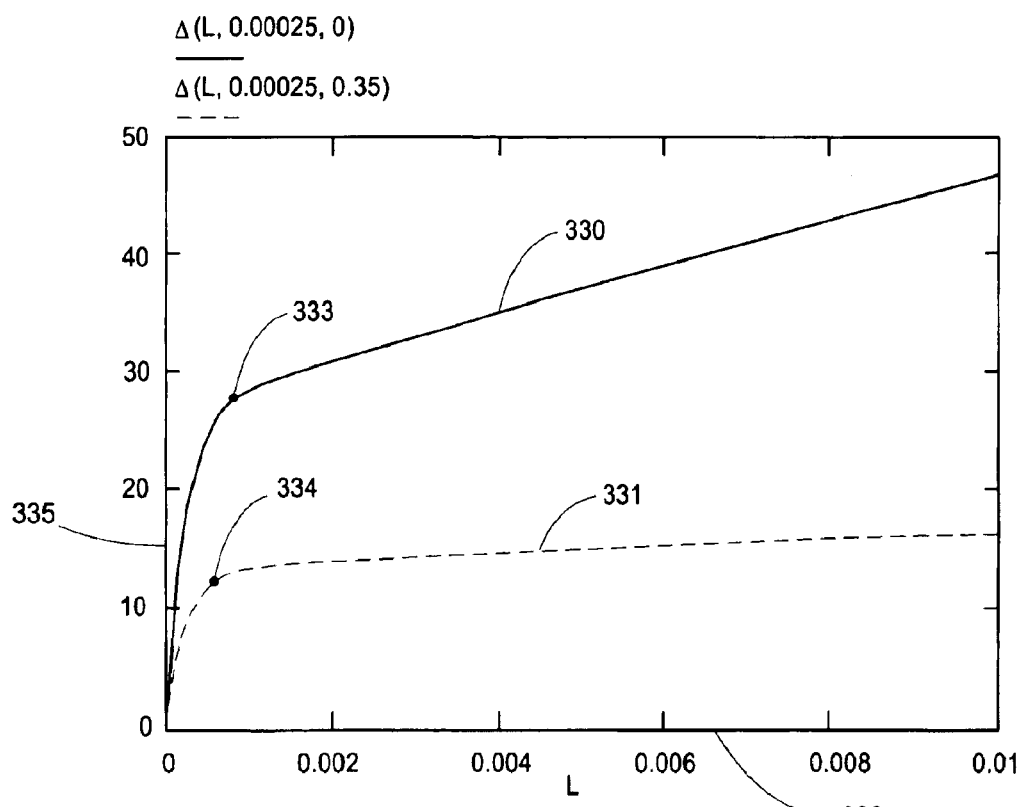

FIG. 31 shows a dependence of the steady-state (stationary solution) overheating $\Delta$ in ° C. on ice thickness in meters. In FIG. 31, Y-axis 335 represents overheating $\Delta$ and X-axis 336 represents thickness L. Plot 330 shows a dependence of steady-state overheating in ° C. on ice thickness in meters assuming a theoretically perfect insulating layer between the de-icer and the aerofoil, while plot 331 shows the dependence for a 2 mm thick Teflon film between the de-icer and the aerofoil. De-icing performance is maximized when ice thickness exceeds approximately 1 mm (point 333 for the theoretically perfect insulating layer, and point 334 for the 2 mm thick Teflon film).

Figure 32:
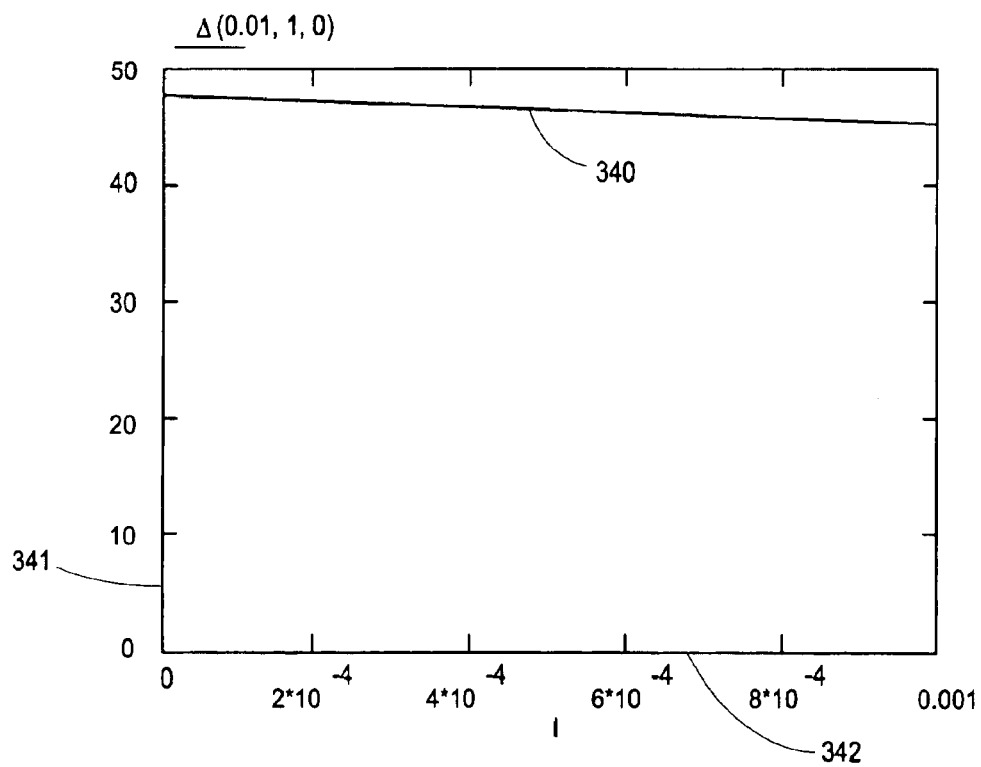

FIG. 32 shows a dependence of the steady-state overheating $\Delta$ in ° C. on electrode size in meters (plot 340), assuming a perfect insulating layer and a 1 cm thickness of ice. In FIG. 32, Y-axis 341 represents overheating $\Delta$ and X-axis 342 represents electrode size l. In the example, bubbling on the interfacial layer of ice may be seen. Bubbling is the result of ice evaporation (e.g., steam) and is evidence of overheating by more than 110° C.

When used in operational environments, the de-icer may have a performance that is better than performances achieved in laboratory environments. For example, atmospheric ice growing on an aerofoil has physical properties that differ from those of solid ice. Atmospheric ice can include unfrozen water and/or gas bubbles. These additions to atmospheric ice may reduce ice thermal conductivity and density. To illustrate, the thermal conductivity of water is approximately 0.56 w/mK as opposed to the thermal conductivity of solid ice at approximately 2.22 w/mK. An interfacial layer of ice (e.g., a layer of ice adjacent to the de-icer) is warmer than remaining ice and may contain water.

A heat exchange de-icer used in operational environmental conditions may be modeled by approximating ice thermal conductivity coefficient $\lambda$ as a number between about 0.5 w/mK and 2.22 w/mK. An example is calculated according to the following Table 30-3:

TABLE 30-3

$W := 4500 \frac{w}{m^2}$ $d := 0.002$ m

Figure 33:
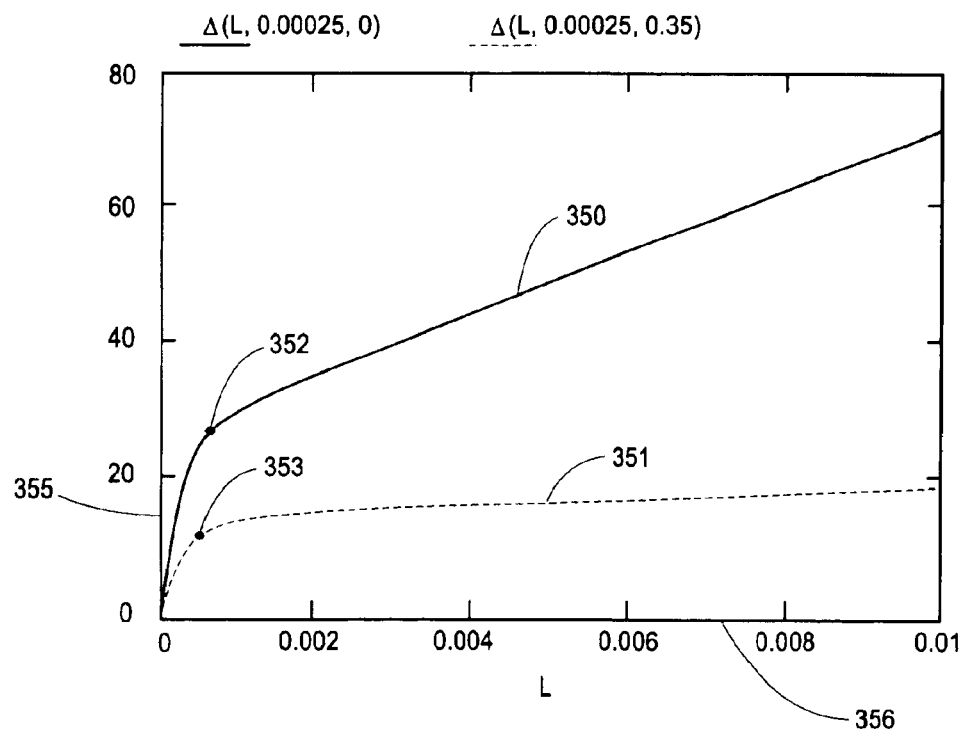

TABLE 30-3-continued $h := 165 \frac{W}{m^2 K}$ $L := 0, 0.0001 \ldots 0.01 \, m$ $l := 0.00001, 0.00002 \ldots 0.001 \, m$ $\lambda := 1 \frac{m}{mK}$ $\lambda_d := 0.35 \frac{W}{mK}$ $\Delta(L, l, \lambda_d) := W \cdot d \cdot \left[ \frac{h \cdot L + (\lambda - l \cdot h) \cdot \left(1 - \exp\left(\frac{-L}{l}\right)\right)}{h \cdot (\lambda \cdot d + L \cdot \lambda_d) + \lambda \cdot \lambda_d} \right]$ FIG. 33 shows a dependence of the steady-state (stationary solution) overheating Δ in ° C. on ice thickness in meters. In FIG. 33, Y-axis 355 represents overheating Δ and X-axis 356 represents thickness L. Plot 350 shows a dependence of steady-state overheating in ° C. on ice thickness in meters assuming a theoretically perfect insulating layer between the de-icer and the aerofoil, while plot 351 shows the dependence for a 2 mm thick Teflon film between the de-icer and the aerofoil. De-icing performance is maximized when ice thickness exceeds approximately 1 mm (point 352 for the theoretically perfect insulating layer and point 353 for the 2 mm thick Teflon film).

Inhomogeneous electric power distribution near de-icing electrodes may also cause bubbling of the interfacial layer of ice. For example, an electrode's surface local density of power can exceed the mean power by about one order of magnitude due to variations in electric field strength. As such, at locations of where power exceeds the mean power, the electrode may heat the interfacial layer of ice more rapidly than at other locations to generate steam.

Results of a time dependent solution may vary from those of the steady-state solutions. For example, since ice is a material with low thermal diffusivity coefficient, as HF power is applied to an interfacial layer of ice, a "heat wave" propagates through the ice. Accordingly, a thin layer of ice may be considered to be a thermally isolated layer of ice. As such, the de-icer may predominantly apply power to only that layer. Time dependent temperature curves Δ(x,t) (plots 360, 361, 362 and 363 of FIG. 34) may be calculated according to the following Table 30-4:

TABLE 30-4

(MathCad file)

$\rho := 920 \frac{kg}{m^3}$ $C := 2 \cdot 10^3 \frac{J}{kg \cdot K}$ $x := 0, 0.0001 \ldots 0.1 \, m$ $\lambda := 1 \frac{W}{mK}$ TABLE 30-4-continued (MathCad file)

Figure 34:
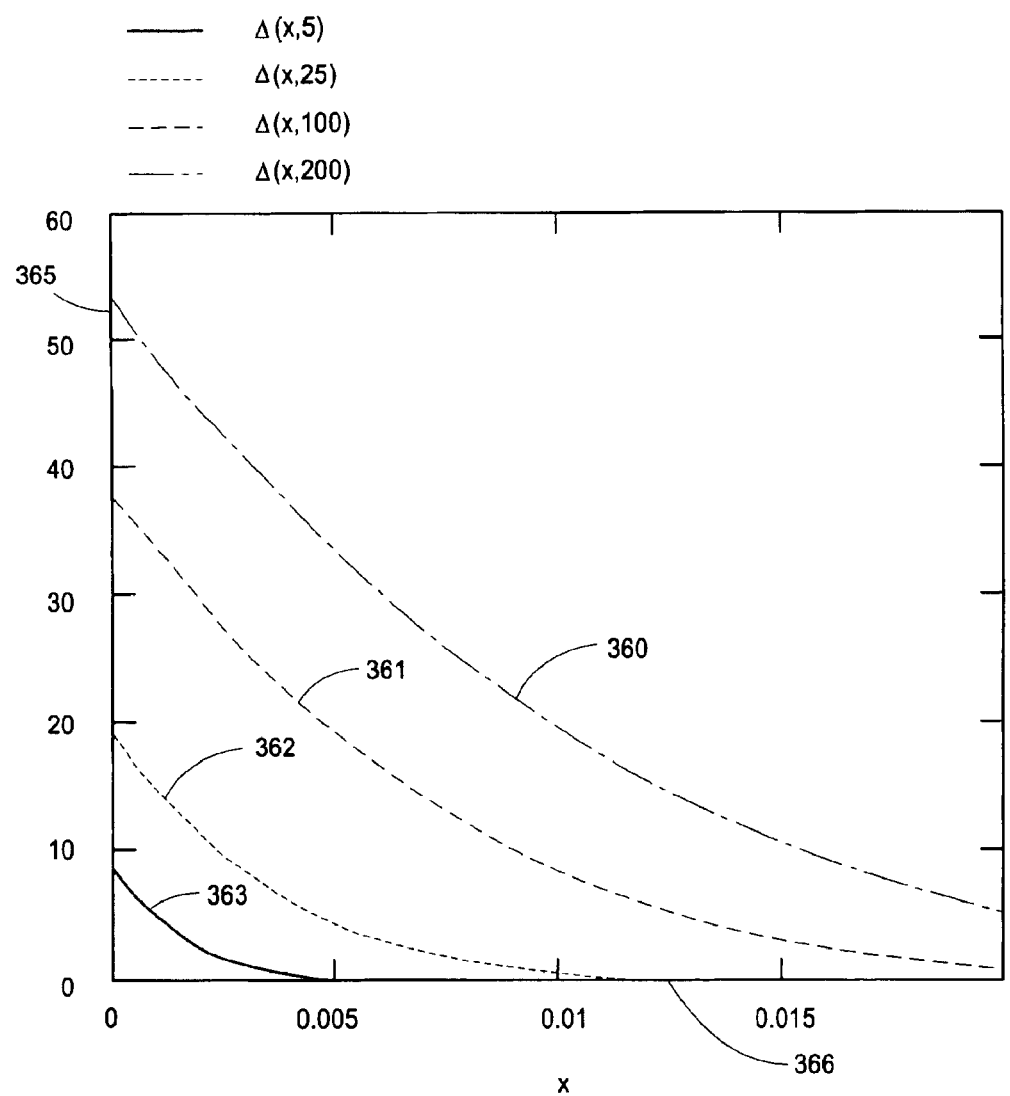

$W := 4.5 \cdot 10^3 \frac{W}{m^2}$ $D := \frac{\lambda}{\rho \cdot C}$ $y(x, t) := \frac{x}{\sqrt{4 \cdot D \cdot t}}$ $\Delta(x, t) := \frac{W}{\lambda} \cdot \sqrt{4 \cdot D \cdot t} \cdot \int_{y(x,t)}^{\infty} (1 - \text{erf}(z)) dz$ $t := 0, 0.1 \ldots 1000 \, s$ $D = 5.435 \times 10^{-7}$, where ρ is ice density, C is ice heat capacity of the ice, λ is a thermal conductivity coefficient of the ice, x is a distance from the heater, W is an applied power per square meter, D is a coefficient of heat diffusivity, and t is the duration in which power is applied (e.g., as a heat pulse). FIG. 34 illustrates plots 360, 361, 362 and 363 for respective time values of 200 s, 100 s, 25 s and 5 s as the power W of about 4.5 kwatt/m² is applied to an atmospheric ice mixture of solid ice, unfrozen water and gas bubbles with a thermal conductivity coefficient λ of 1 W/m □K. In FIG. 34, Y-axis 365 represents overheating Δ and X-axis 366 represents distance from the heater x.

Interface temperature (i.e., the temperature of an interfacial layer of ice) has a typical diffusion time τ as calculated according to the following Table 30-5:

TABLE 30-5

(MathCad file)

$L := 10^{-2}$ $\tau := \frac{L^2}{D}$ $\tau = 184 \, s$

Figure 35:
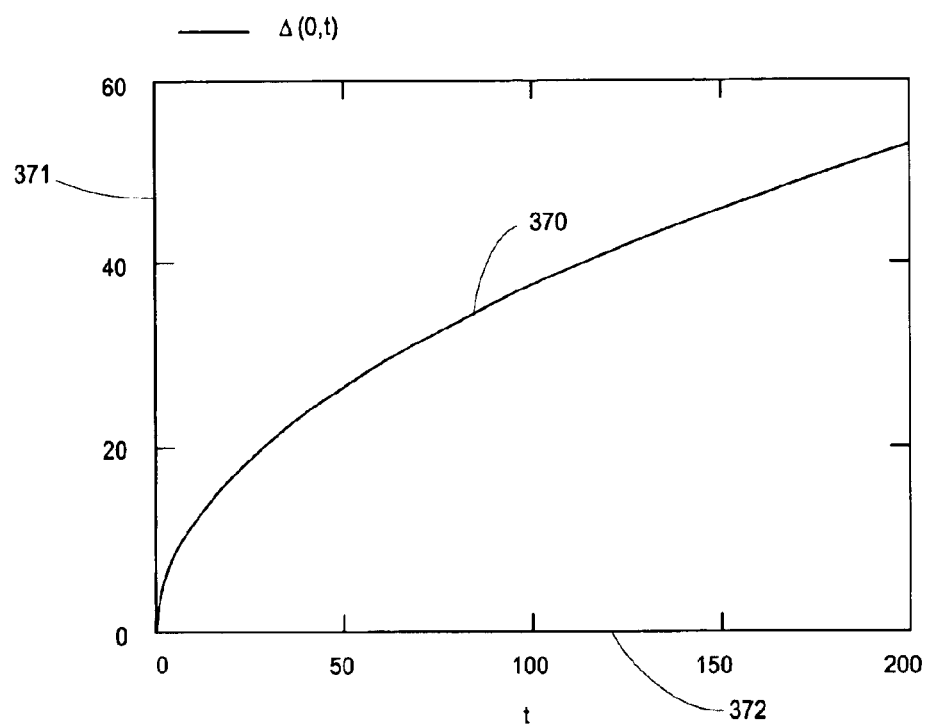

FIG. 35 illustrates how the interface temperature depends on time by showing a dependence of interfacial overheating temperature Δ in ° C. on time. In FIG. 35, Y-axis 371 represents overheating Δ and X-axis 372 represents time. When a short pulse of heating is applied, thermal energy can be minimized and still melt the interfacial layer of ice. For example, thermal energy may be calculated according to the following Table 30-6:

TABLE 30-6

(MathCad file)

$\Delta(x, t) := \frac{W}{\lambda} \cdot \sqrt{4 \cdot D \cdot t} \cdot \int_0^{\infty} (1 - \text{erf}(z)) dz$ $\Delta(t) := 2 \cdot \frac{W}{\lambda} \cdot \sqrt{\frac{D \cdot t}{\pi}}$ $t(\Delta) := \left(\frac{\Delta \cdot \lambda}{2 \cdot W}\right)^2 \cdot \frac{\pi}{D}$ TABLE 30-6-continued (MathCad file)

$$Q(W) := \left(\frac{\Delta \cdot \lambda}{2}\right)^2 \cdot \frac{\pi}{D \cdot W}$$

where t is the time it takes to reach a desired overheating temperature Δ of the interfacial layer of ice, and Q is the total thermal energy needed to reach that temperature. As in FIG. 1, total thermal energy Q may be substantially inversely proportional to applied power W, to employ a de-icer with a higher power output that conserves overall electric power.

Thermal Transfer De-icer Systems

In the following embodiments, thermal transfer de-icer systems are described. The thermal transfer de-icer systems may be used to remove ice from a surface of an object. In some embodiments, the following systems may also be used to melt an interfacial layer of ice and modify a coefficient of friction of an object's surface to ice interface. In one example, such thermal transfer de-icer systems store thermal energy and intermittently transfer the thermal energy from a heating source (or heating supply) to a heating element.

Figure 36:
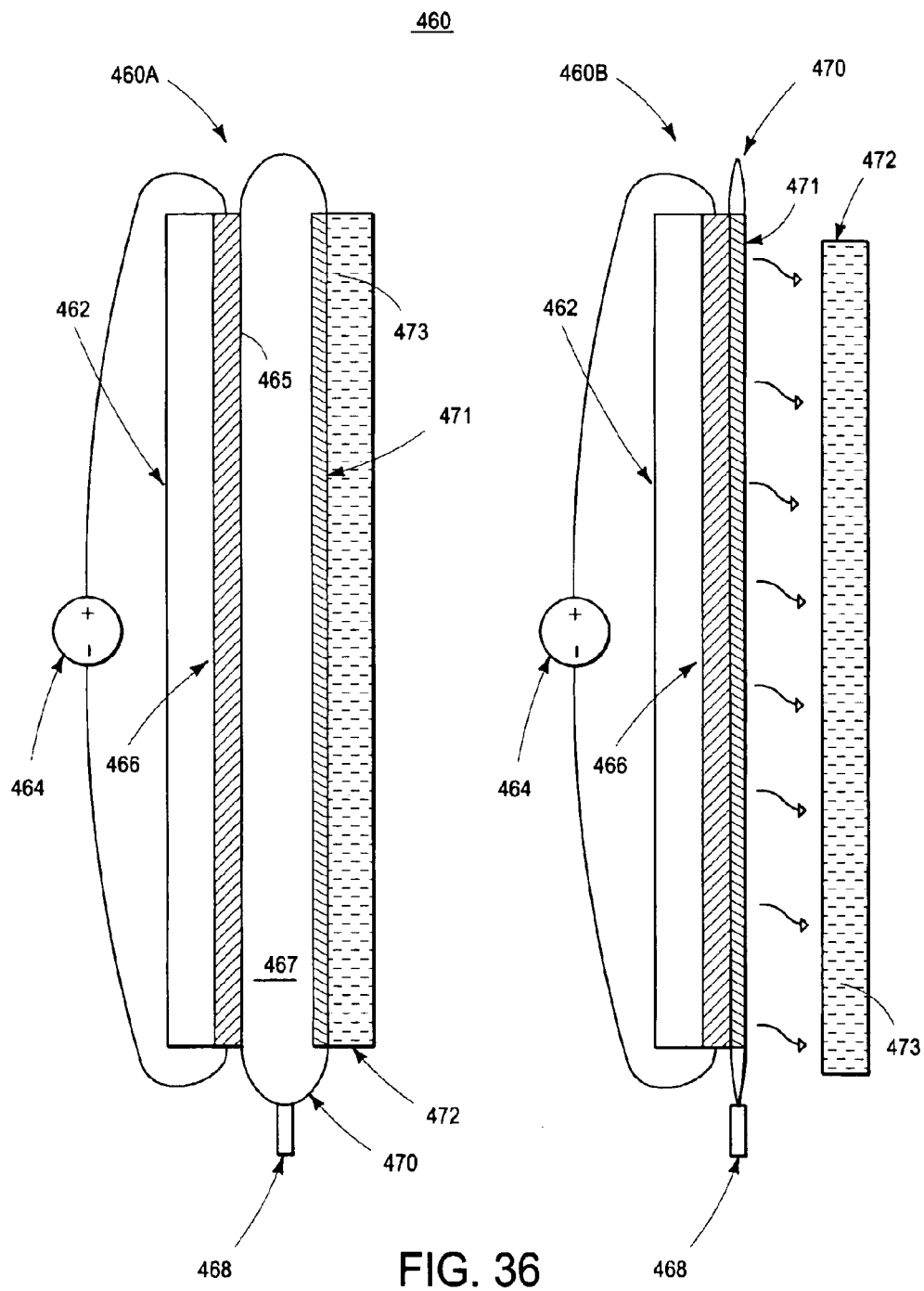
FIG. 36 shows one thermal transfer de-icer system for modifying an object-to-ice interface.

FIG. 36 shows one thermal transfer de-icer system 460, in accord with one embodiment. Thermal transfer de-icer system 460 is illustrated in two states, 460A and 460B. Thermal transfer de-icer system 460 includes power supply 464, thermal insulator 462, heating element 466, membrane 470, and membrane valve 468. Thermal transfer de-icer system 460 is configured for removing ice 472 from a surface (e.g., including outer surface 471 of membrane 470) of an object such as an aircraft, an aircraft wing, a tire, an automobile windshield, a boat, an aircraft, a road, a bridge, a sidewalk, a freezer, a refrigerator, building, a runway, and a window. Thermal transfer de-icer system 460 may provide heat storage such that once the heat is stored it is applied as heat pulses to the ice-object interface, as desired. Power supply 464 may include a switching power supply, battery, a capacitor, a flywheel, and/or a high-voltage power supply. The capacitor may be a super capacitor or an ultracapacitor.

In state 460A, membrane 470 is inflated with gas through membrane valve 468. A typical gas may include air or other gases with thermal insulating properties. The application of the power to heating element 466 converts the power into a magnitude of thermal energy that is stored in heating element 466. Thermal energy stored in heating element 466 is transferred to interfacial layer 473 by deflating membrane 470, as shown in state 460B. When membrane 470 is deflated, the thermal energy is transferred from heating element 466 to interfacial layer 473 to melt interfacial layer 473, so that ice 472 is removed. In one embodiment, state 460B is maintained just long enough to melt the interfacial layer of ice 472

Figure 37:
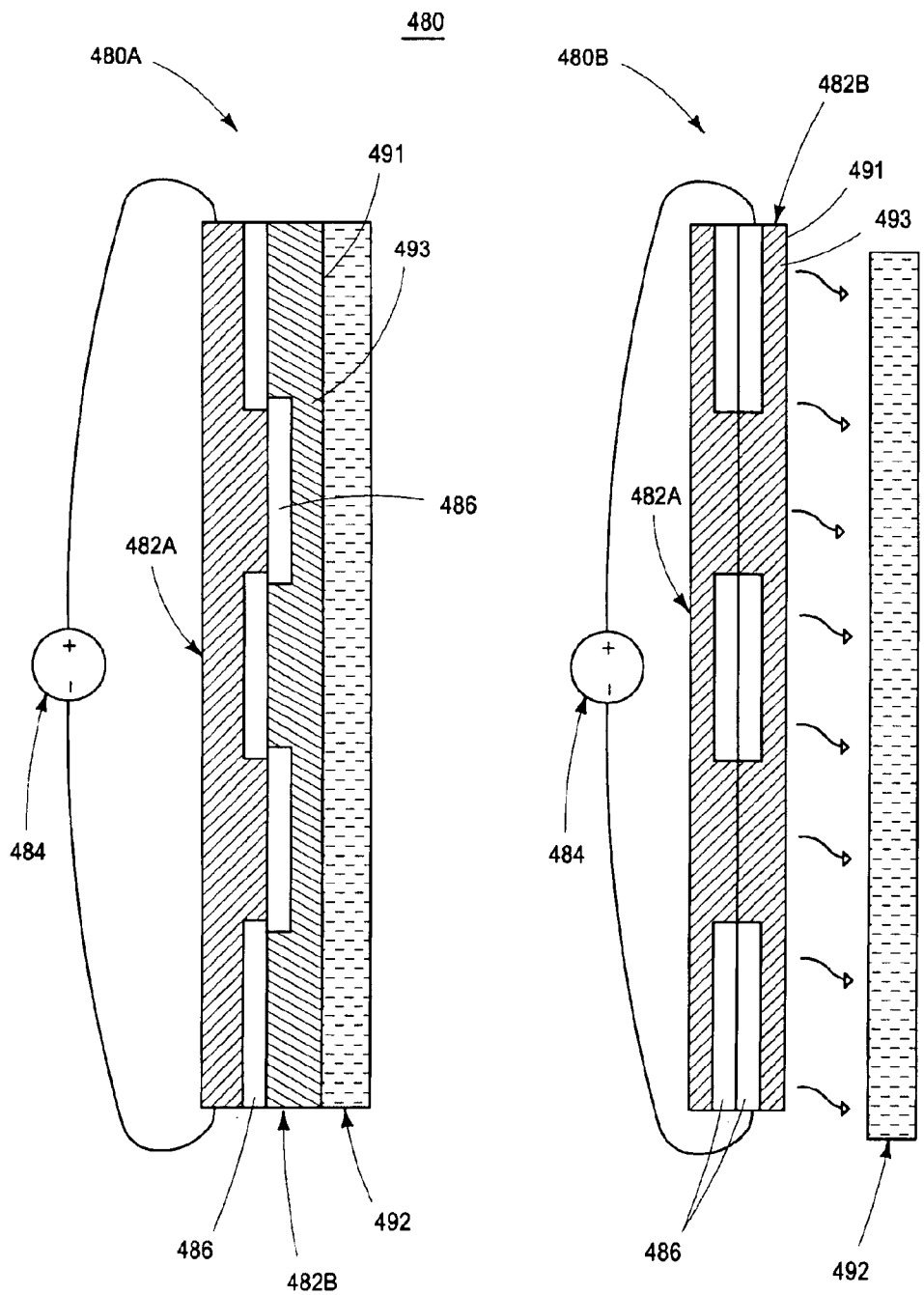
FIG. 37 shows one thermal transfer de-icer system.

FIG. 37 shows one thermal transfer de-icer system 480 in accord with one embodiment. Thermal transfer de-icer system 480 is illustrated in two states, 480A and 480B. Thermal transfer de-icer system 480 includes power supply 484, thermal insulator 486, and heating element 482. Thermal transfer de-icer system 480 is configured for removing ice 492 from surface 491 of an object 493. Object 493 may be of the class of objects discussed herein. Thermal transfer de-icer system 480 may provide heat storage such that once the heat is stored it can be applied as heat pulses to the ice-object interface at surface 491, as desired, to melt interfacial ice.

In state 480A, heating element 482 is shown as two layers, 482A and 482B, that "sandwich" thermal insulator 486. Thermal insulator 486 is moveably attached between heating element layers 482A and 482B such that both layers slide into contact with one another as shown in state 480B. Power supply 484 applies a magnitude of power to heating element 482. Power supply 484 may be one or more of power supplies described in FIG. 36. The application of the power to heating element 482 converts the power into thermal energy. When layer 482A is in contact with layer 482B, the thermal energy transfers from heating element 482 to an interfacial layer of ice 492 in an amount sufficient to melt that interfacial layer. In one embodiment, heating element layers 482A and 482B are frequently moved across one another such that thermal insulator 486 periodically thermally isolates layers 482A and 482B and causes a periodic transfer of thermal energy to the interfacial layer of ice at surface 491. The periodic transfer of thermal energy provides an average energy to the interfacial layer to keep the object free of ice.

Heating element 482 may be formed of a conductive material such as metal, a metal alloy foil, a thin metal layer on a dielectric substrate, a thin metal oxide layer on a substrate, a conductive polymer film, a conductive paint, a conductive adhesive, a wire mesh and conductive fibers. Examples of transparent conductors include SnO2, ITO, TiN, and ZnO. Examples of conductive fibers include carbon fibers.

Figure 38:
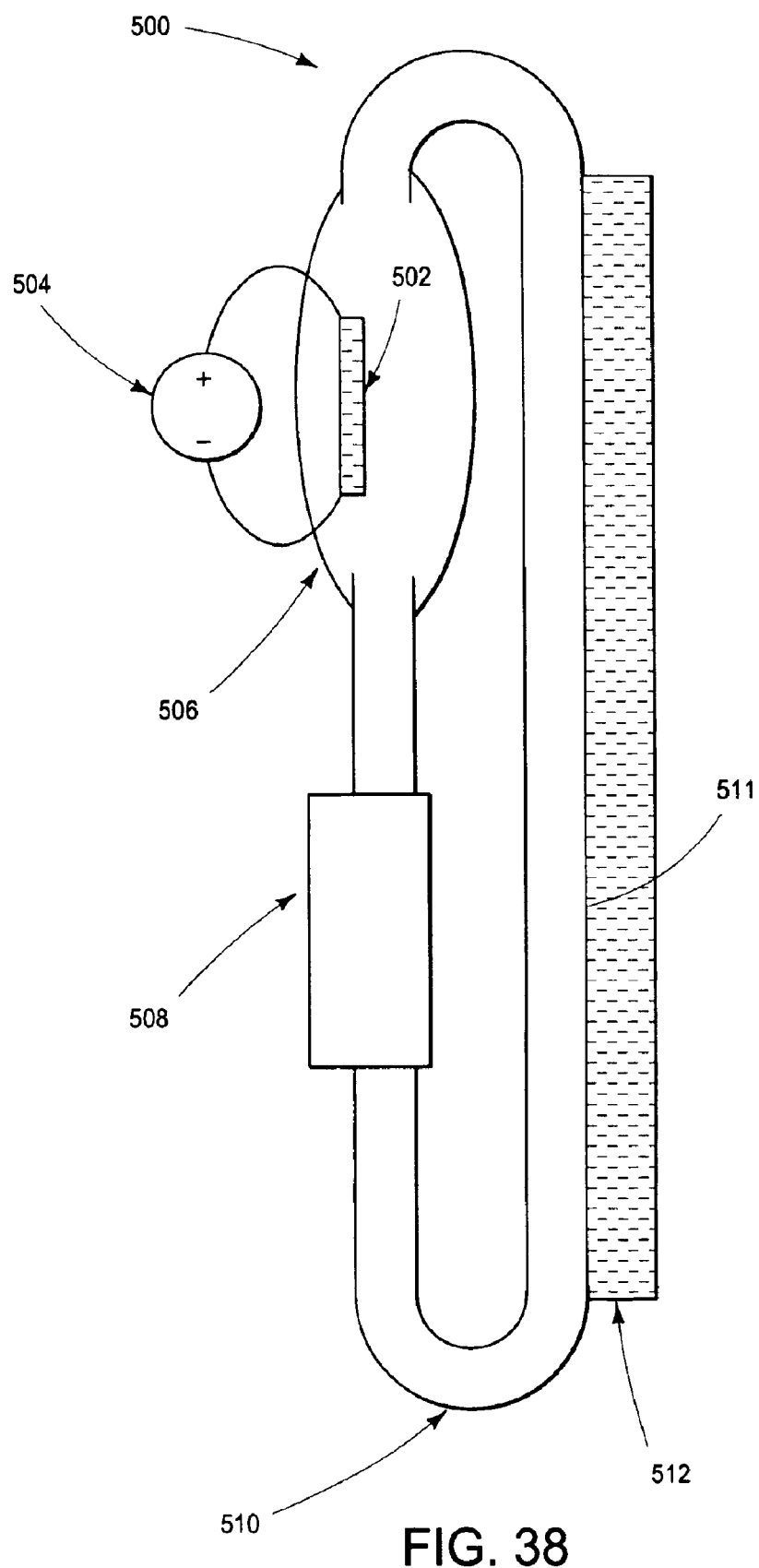
FIG. 38 shows one thermal transfer de-icer system.

FIG. 38 shows one thermal transfer de-icer system 500 in accord with one embodiment. Thermal energy transfer de-icer 500 includes power supply 504, heating element 502, water pump 508, tank 506, and tube 510. Thermal transfer de-icer system 500 is configured for removing ice 512 from a surface 511 of an object. Thermal transfer de-icer system 500 may operate as a heat storage such that once the heat is stored it can be applied as a heat pulse to the ice-object interface at surface 511.

Power supply 504 applies power to heating element 502. Power supply 504 may be one or more of power supplies described in FIG. 36. The application of the power to heating element 502 converts the power into thermal energy. Heating element 502 raises a temperature of a thermally conductive liquid in tank 506. The thermally conductive liquid may include water or some other thermally conductive liquid. The thermally conductive liquid is pumped through tube 510 with pump 508. The thermal energy is transferred to an interfacial layer of ice 512 at surface 511 as the thermally conductive liquid is pumped into tube 510. As the thermal energy is transferred to the interfacial layer, the adhesion of ice 512 is disrupted from surface 511. In one embodiment, the thermally conductive liquid is frequently pumped through tube 510 with pump 508 to cause a substantially periodic transfer of thermal energy to the interfacial layer, to provide and average thermal energy to the interface to keep the object free of ice.

Figure 39:
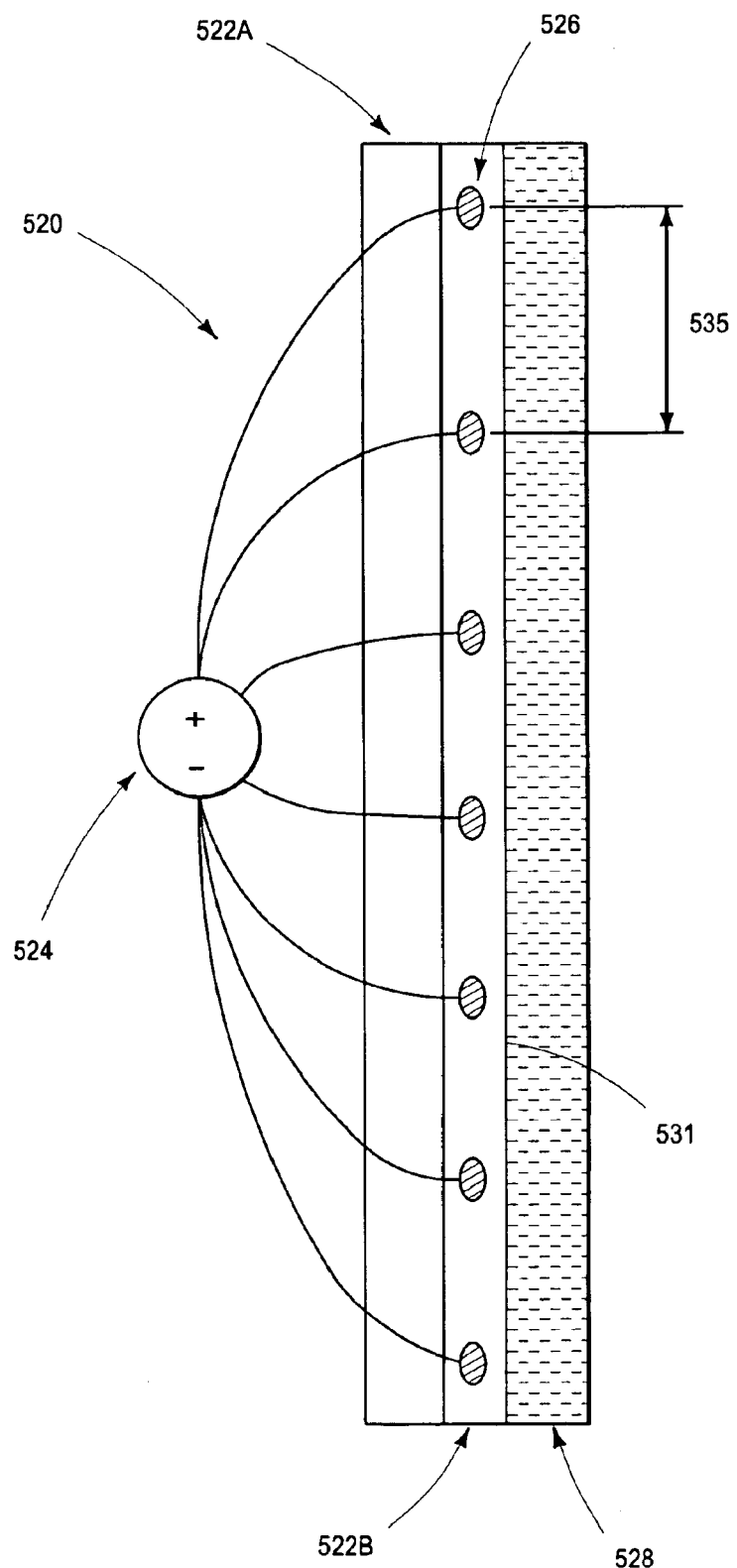
FIG. 39 shows one pulse de-icer system, illustrating comparison with a thermal de-icer transfer system.

FIG. 39 shows pulse de-icer system 520; system 520 is shown to contrast differences between thermal transfer de-icer systems of in FIGS. 37 and 38 with previously described systems (e.g., system 10 of FIG. 1). In this embodiment, ice 528 illustratively adheres to a surface 531 at the object-ice interface adjacent surface 531. Pulse de-icer system 520 includes power supply 524, one or more heating elements 526, and layers 522A and 522B. Pulse de-icer system 520 is configured for removing ice 528 from a surface 531 of layer 522B. For example, layer 522B is an object, such as windshield, to be de-iced.

Heating elements 526 are embedded in layer 522B and electrically connected to power supply 524, to receive power therefrom. In one example, layers 522A and 522B are formed of a substantially transparent material for use in or as a windshield. As power supply 524 applies power to heating elements 526 (which may also be transparent), thermal energy radiates from heating elements 526 and disrupts an adhesion of ice 528 to surface 531 of layer 522B. In one embodiment, power supply 524 applies power to heating elements 526 according to the equations of FIG. 1. Power supply 524 may be one or more of power supplies described in FIG. 36, for example.

The application of power to heating elements 526 thus converts the power into a magnitude of thermal energy. The thermal energy is transferred to an interfacial layer of ice 528 at surface 531 to disrupt the adhesion of ice 528 onto surface 531. In one embodiment, the power is frequently pulsed to heating elements 526 to cause a substantially periodic transfer of thermal energy to the interfacial layer for a periodic duration such as described in Eq. 1-1.

In comparison, a power supply of a thermal transfer de-icer system (e.g., power supplies 484 and 504 of FIGS. 37 and 38, respectively) delivers power to heating elements which in turn produce thermal energy. The thermal transfer de-icer sytsem then stores the thermal energy until applied as thermal energy to the ice-to-object interface.

Heating elements 526 of pulse de-icer system 520 may be made of a metal, metal alloy foil, a thin metal layer on a dielectric substrate, a thin metal oxide layer on a substrate, a substantially transparent conductor, a conductive polymer film, a conductive paint, a conductive adhesive, a wire mesh and/or conductive fibers, for example. Examples of transparent conductors include SnO2, ITO, TiN, and ZnO. Examples of conductive fibers include carbon fibers. Heating elements 526 may also include semiconductor devices configured for converting the power into thermal energy. By using multiple heating elements 526, total energy requirements can be segmented or discretely determined. For example, a segment 535 of surface 531 requires substantially less energy to melt an interfacial layer of ice in that region as compared to melting an interfacial layer of ice for all of surface 531. Accordingly, instantaneous power requirements for disrupting the adhesion of ice 528 are decreased as sequential pulsing across the segments or sections discretely disrupts ice 528 from all of surface 531, over time.

Figure 40:
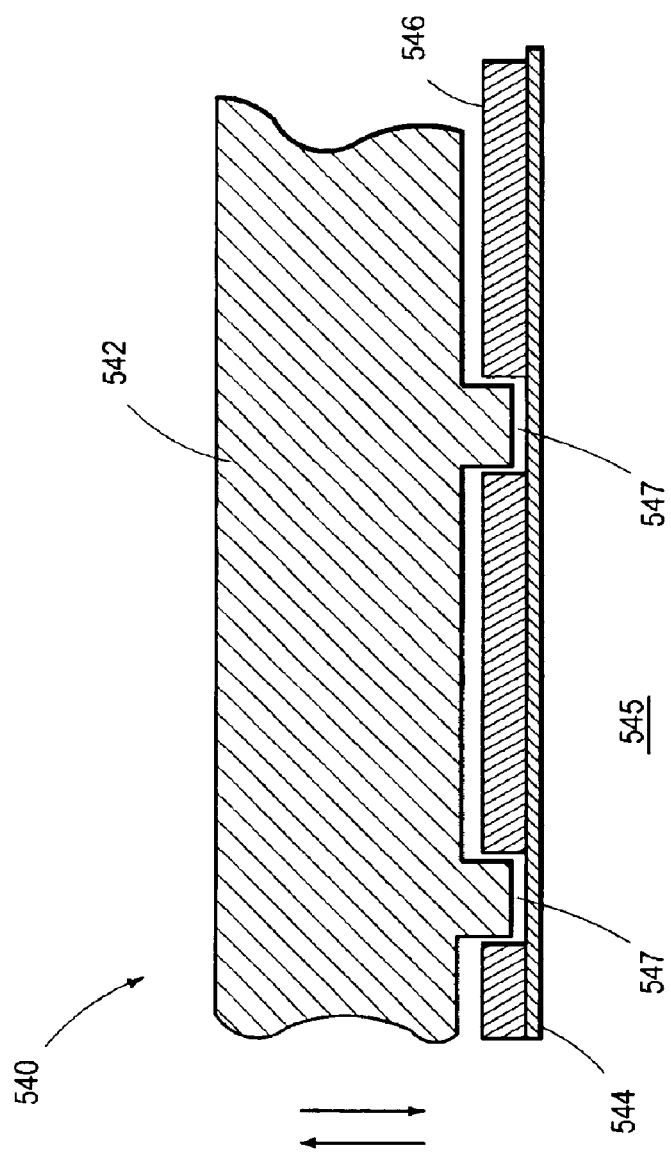
FIG. 40 shows one thermal transfer de-icer system.

FIG. 40 shows one thermal transfer de-icer system 540 in accord with one embodiment. Thermal transfer de-icer system 540 includes thermal conductor 542 (e.g., a "hot plate"), dielectric plate 546, and heated element 544 (e.g., thin metal foil). Thermal transfer de-icer system 540 is configured for melting an interfacial layer of ice 545 on an object by pulsating thermal energy to ice 545. For example, thermal transfer de-icer system 540 may be positioned with a surface of an object such that when heating power is applied to heated element 544, an interfacial layer of the ice 545 is melted.

In one embodiment, thermal conductor 542 converts power into thermal energy. The thermal energy is transferred from thermal conductor 542 to heating element 544 through holes 547 in dielectric plate 546. In one example, thermal conductor 542 vibrates such that when thermal conductor 542 contacts heating element 544, thermal conductor 542 transfers thermal energy to heating element 544, which in turn melts an interfacial layer of ice. Depending on the application of thermal transfer de-icer system 540, melting the interfacial layer of the ice may be useful to remove ice from a surface of an object, to prevent its formation on the surface, or to modify its adhesion strength and change a coefficient of friction between the ice and the object.

In one embodiment, thermal transfer de-icer system 540 is used as a "pulse brake" in which a heating pulse is transferred from thermal conductor 542 to heating element 544 when thermal conductor 542 touches heating element 544 affixed to a base of a slider, which interfaces the ice. When braking is needed, thermal conductor 542 touches the heating element 544 for few milliseconds, through holes 547 in dielectric plate 546, creating "hot spots" where ice melts. After thermal conductor 542 is withdrawn, the melted spots typically freeze within a few milliseconds, providing bonds between the slider base and the ice.

One parameter of a pulse brake is the time it takes for ice/snow to melt and then refreeze. When interfacial cooling occurs between ice or snow and the slider base, that time, $t_{cool}$, may be estimated as:

$$t_{cool} \approx \left[ \frac{Q}{S} \cdot \frac{1}{(T_m - T)(\sqrt{\lambda_{snow} \cdot \rho_{snow} \cdot c_{snow}} + \sqrt{\lambda_{ski} \cdot \rho_{ski} \cdot c_{ski}})} \right]^2, \quad \text{(Eq. 40-1)}$$

where
$T_m$ is an ice melting temperature, T is an ambient temperature, $\lambda$ is a thermal conductivity coefficient, $\rho$ is the material density, and c is the material heat capacity (subscript "snow" denotes ice and/or snow and subscript "ski" denotes a material used as the slider base) W is a power per square meter, Q is the thermal energy to be dissipated, and S is the slider base area.

Figure 41:
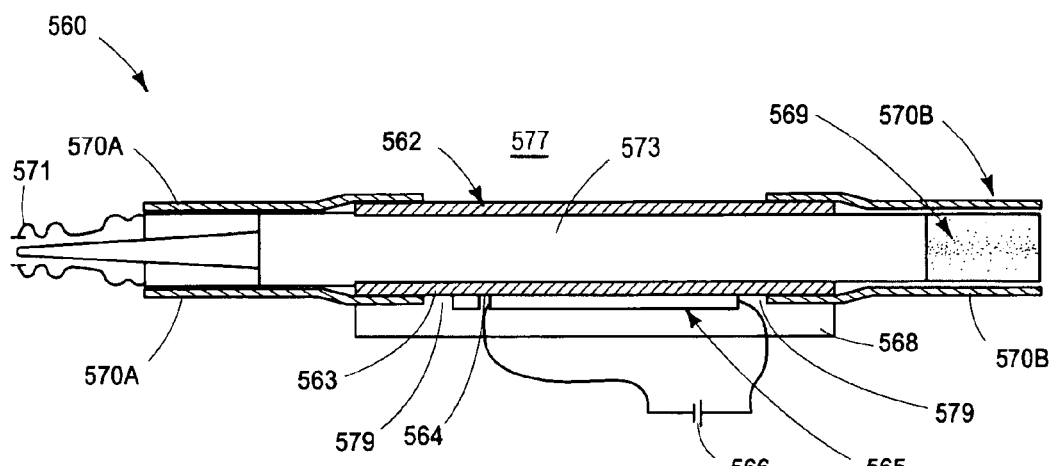
FIG. 41 shows one thermal transfer de-icer system.

FIG. 41 shows one thermal transfer system 560, which was built and tested, in accord with one embodiment of FIG. 36. In this embodiment, thermal transfer system 560 includes two aluminum discs 562 and 563 of about six inches in diameter and 1 mm thick. In one embodiment, interior surfaces of discs 562 and 563 are lapped and buffed to decrease optical emittance. Exterior surfaces of discs 562 and 563 are anodized in about a 15% sulfuric acid solution to achieve a thickness of about 10 $\mu$m to 12 $\mu$m of aluminum oxide film (hard anodizing). Discs 562 and 563 are attached to Plexiglas ring 569 by a rubber O-ring 570B. Discs 562 and 563 are further attached to Plexiglas ring 572, and thus valve 571, by rubber O-ring 570A.

Thermal transfer system 560 also includes heating element 565 affixed to disc 563 and configured to receive electrical power from power supply 566, to convert that power into thermal energy. Heating element 565 includes a carbon foil encapsulated into Kapton polyimid substrate 568. Thermocouple 564 may be affixed to disc 563 through a hole 579 in heating element 565 by means of thermoconductive glue. In this embodiment, thermocouple 564 is configured to control the temperature of disc 562 as heating element 565 transfers heat to disc 563. In one embodiment, power supply 566 is a DC power supply configured to supply about 20V.

A vacuum pump may physically couple to valve 571 to bring "cold" and "hot" discs into contact and to transfer thermal energy from a hot disc to a cold disc. For example, as power supply 566 supplies power to heating element 565, heating element 565 converts the power into thermal energy and transfers that energy to disc 563, thereby creating a hot disc. The vacuum pump withdraws air from chamber 573 to collapse chamber 573 and to bring disc 562 into contact with disc 563 (e.g., the cold disc). Once disc 562 contacts disc 563, thermal energy of disc 563 transfers to disc 562. When the transfer of thermal energy is no longer desired, the vacuum pump inflates chamber 573 with air to separate the discs 562 and 563.

At about −10° C., and with ice grown on disc 562 and thermal transfer system 560 in a vertical position, a power of approximately 10–25 watts heats disc 563 to about 20° C. when applied to heating element 565. When the vacuum pump withdraws air from chamber 573, such that discs 562 and 563 contact one another, ice 577 is removed from disc 562, e.g., by gravity. While air is typically used in chamber 573, other thermally insulating gases may alternatively be used in chamber 573.

Thermal Transfer De-icer System Analysis

In the following description, various thermal transfer de-icer systems are analyzed and their operative characteristics shown. For example, characteristics of various materials are analyzed, such as ice at certain temperature having a known capacitance (e.g., $C_i$ of FIG. 18). In these analyses, the component values illustrate various conditions, such as environmental conditions and/or heat transfer methods.

FIGS. 42–46 show graphs illustrating one exemplary analysis of a thermal transfer de-icer system. In the example, a thermal transfer de-icer system has a first and second thermal conductor and a heating element with equal heat capacities. The system is characterized with a natural convection heat exchange Nu across an air gap in which the heating element heats the first thermal conductor to cause the second thermal conductor to reach a temperature of about 275.5K when the two thermal conductors contact one another. Such a system can be characterized by the following Table 42-1 (calculating Nusselt number for natural convection of air between the discs 562, 563 of FIG. 41):

TABLE 42-1

(MathCad file)

$v := 1.57 \cdot 10^{-5}$
$L := 0.0125$
$g := 9.8$ $\beta := \frac{1}{273}$ $Pr := 0.69$
$T_m := 273$
$T_s := 243, 244 \ldots 273$
$T_h(T_s) := 2 \cdot T_m - T_s + 5$
$\Delta(T_s) := T_h(T_s) - T_s$
(i.e., the temperature difference between the heater and the environment)

$Ra_L(T_s) := \frac{g \cdot \beta \cdot L^3 \cdot Pr \cdot (\Delta(T_s))}{v^2}$ $Ra_L(243) = 1.276 \times 10^4$ $Nu_1(T_s) := 0.0605 \, Ra_L(T_s)^{\frac{1}{3}}$ $Nu_2(T_s) := \left[1 + \left[\frac{0.014 \, Ra_L(T_s)^{0.293}}{1 + \left(\frac{6310}{Ra_L(T_s)}\right)^{1.36}}\right]^3\right]^{\frac{1}{3}}$ where $T_s$ is the temperature of the substrate material (disc 562), $T_h$ is the temperature of the heating element (disc 563), v is air kinematic viscosity, L is a distance between discs 562 and 563, g is gravity acceleration, β is air thermal expansion coefficient, Pr is air Prandtl number, $T_m$ is ice melting temperature, $T_s$ is an incremental temperature of disc 562, Δ is temperature difference, Ra is air Rayleigh number, $Nu_1$ and $Nu_2$ are Nusselt number.

Figure 42:
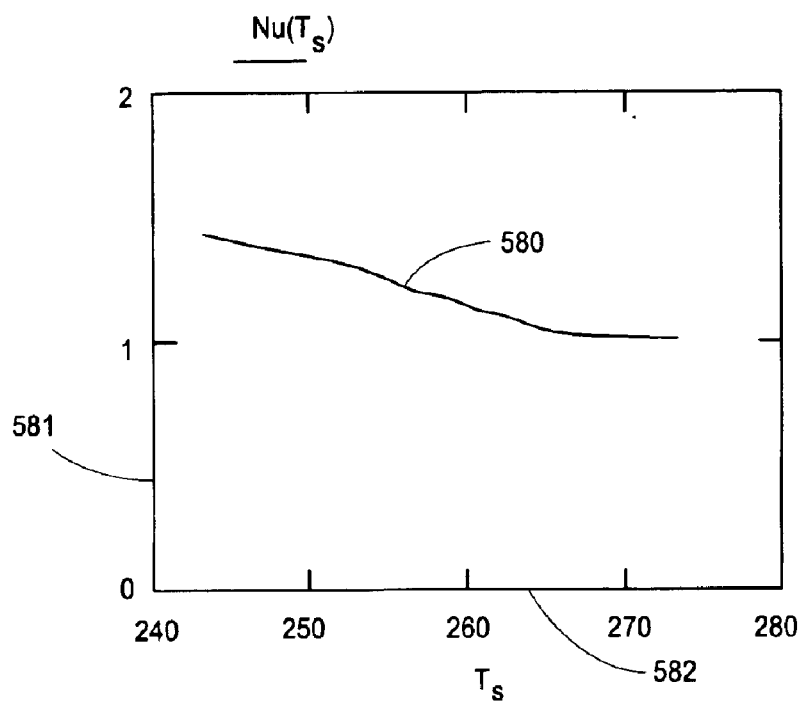
FIGS. 42–46 show graphs illustrating one analysis of a thermal transfer de-icer system.

Accordingly, FIG. 42 shows (in plot 580) a dependence of Nusselt number on outside temperature (cold disc 562). Table 42-2 calculates natural convection heat transfer rate between the discs 562, 563.:

TABLE 42-2

(MathCad file)

Figure 43:
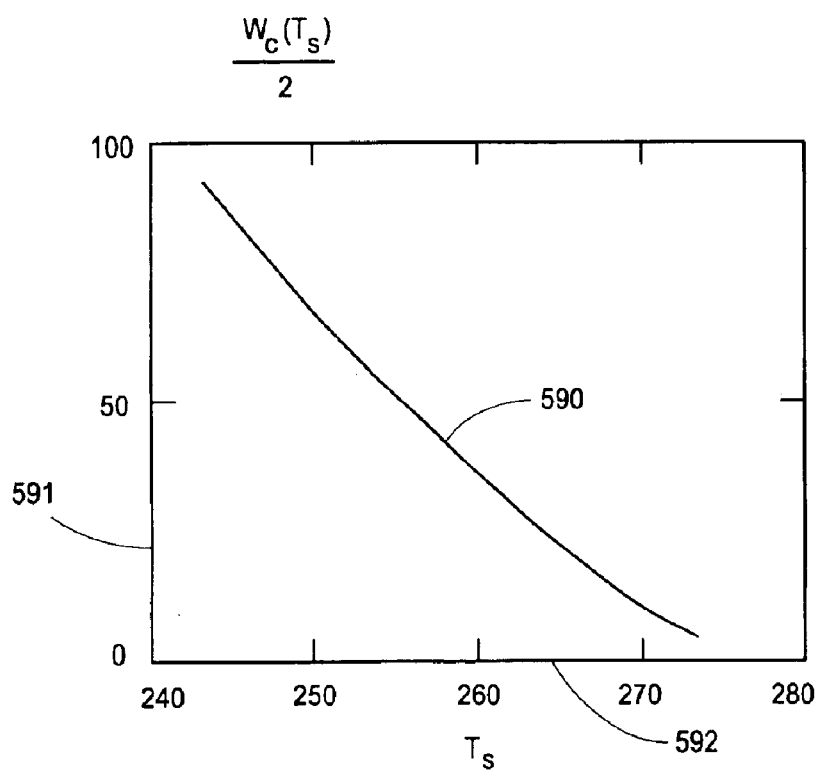

$\lambda_a := 0.025$ $W_c(T_s) := \frac{\lambda_a \cdot Nu(T_s) \cdot \Delta(T_s)}{L}$ $\frac{W_c(243)}{2} = 91.887 \, \frac{watt}{m^2}$ where $\lambda_a$ is a thermal conductivity coefficient of the air, and $W_c/2$ is a mean heat transfer rate when the heater heats disc 563 from $T_s$ to $T_h$. In FIG. 42, Y-axis 581 represents convection Nu and X-axis 582 represents temperature $T_s$ of the substrate material. A mean loss of heat $W_c$ through the air gap is shown in FIG. 43 (plot 590). In FIG. 43, Y-axis 591 represents convection heat transfer $W_c/2$ and X-axis 592 represents temperature $T_s$ of the substrate material.

Figure 44:
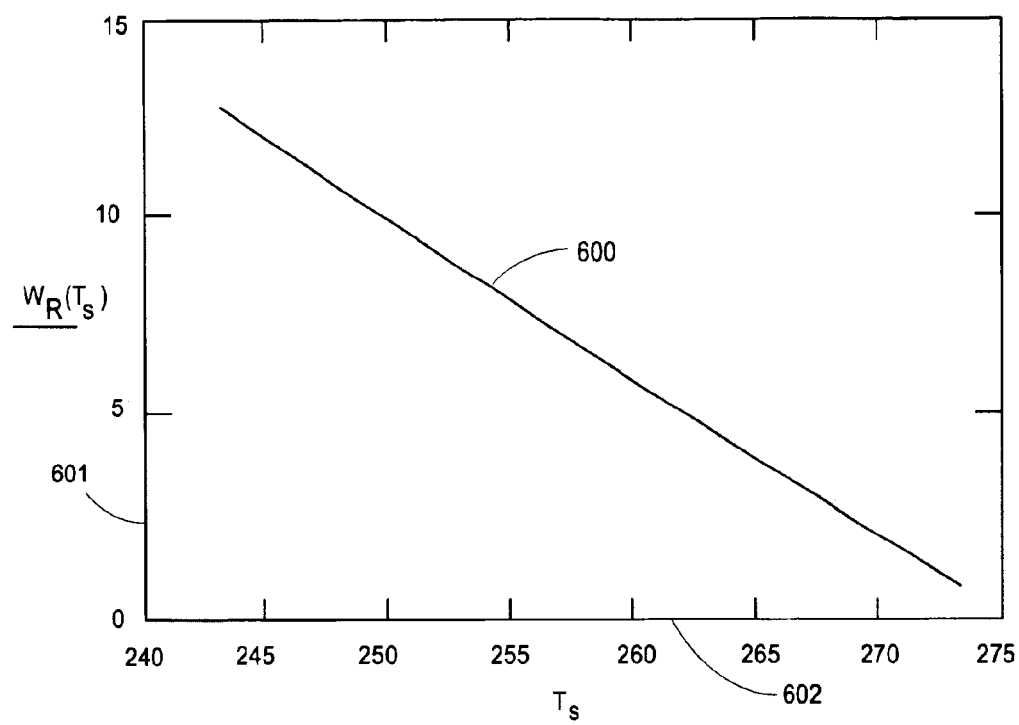

FIG. 44 illustrates heat transfer $W_{in}$, through back insulation (e.g., insulation backing the first thermal conductor, plot 600). In this embodiment, the insulation is a rigid polyurethane foam with a thickness l of about 0.025 m and a thermal conductivity coefficient $\lambda_a$ of about 0.026. The heating transfer $W_{in}$ can be calculated according to the following Table 42-3 (heat loss through the back insulating layer):

TABLE 42-3

(MathCad File)

$W_{in}(T_s) := \frac{\lambda_{in} \cdot \Delta(T_s)}{l}$ $\frac{W_{in}(243)}{2} = 33.8 \, \frac{watt}{m^2}$ Accordingly, radiative heat transfer $W_R$ through the air gap may be calculated according to the following Table 42-4 (heat loss through radiation):

TABLE 42-4

(MathCad File)

$\epsilon := 0.04$
$\sigma := 5.67 \cdot 10^{-8}$ $W_R(T_s) := \varepsilon \cdot \sigma \cdot (T_h(T_s)^4 - T_s^4)$ $W_R(243) = 12.502 \, \frac{watt}{m^2}$ where ε is the emittance of discs 562 and 563 emittance, and σ is the Stefan-Boltzmann constant. From Table 42-4, the radiative heat transfer $W_R$ can be plotted (plot 600) as a function of temperature $T_s$ in FIG. 44 ($T_s$ and $T_m$ being defined above). In FIG. 44, Y-axis 601 represents radiative heat transfer $W_R$ and X-axis 602 represents temperature $T_s$ of the substrate material.

Figure 45:
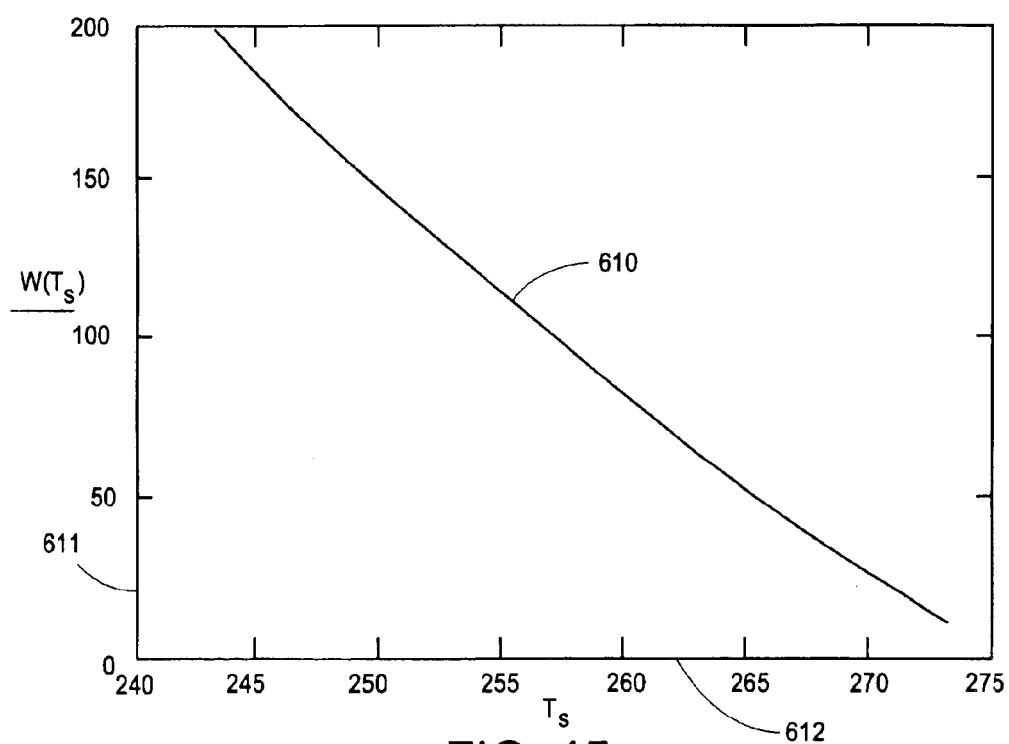

FIG. 45 illustrates a total mean heat loss W (plot 610) from the heating element. In FIG. 45, Y-axis 611 represents total mean heat loss W and X-axis 612 represents temperature $T_s$ of the substrate material. Because temperature of the heating element cycles between $T_m$ and $T_h$, a mean difference in the temperature between the heating element and the environment is approximately $(\frac{3}{4})*(T_h-T_s)$. The total mean heat loss W may be calculated according to the following Table 42-5 (total heat loss to the environment):

TABLE 42-5

(MathCad file)

$$W(T_s) := \frac{3}{4} \cdot ((W_c(T_s) + W_{in}(T_s) + W_R(T_s)))$$

$$W(243) = 197.907 \, \frac{watt}{m^2}$$

$$W(253) = 127.163 \, \frac{watt}{m^2}$$

$$W(263) = 63.602 \, \frac{watt}{m^2}$$

Figure 46:
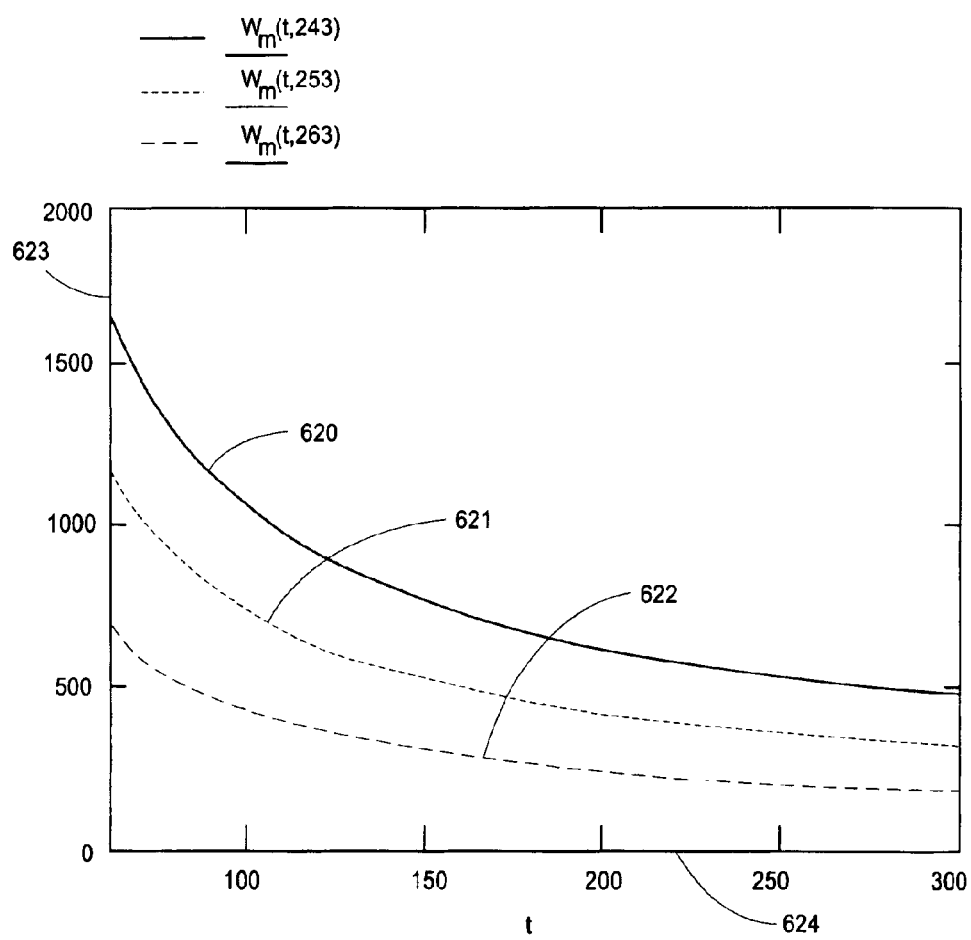

FIG. 46 illustrates a mean power $W_m$ from a power supply used in one thermal transfer de-icer system. In FIG. 46, Y-axis 623 represents mean power $W_m$ and X-axis 624 represents temperature. The mean power results are shown as a function of three ambient cold plate temperatures $T_s$ (plots 620, 621 and 622). The total amount of thermal energy Q that it takes to heat the heating element from the temperature $T_s$ of the substrate material to $T_h$ is calculated as two components, Q1 and Q2. Q1 is thermal energy due to heat capacity of the heating element and Q2 is thermal energy that is transferred from the heater to the environment (total energy loss from the system). The total amount of thermal energy Q may be calculated according to the following Table 42-6:

TABLE 42-6

(MathCad file)

$d := 0.001$
$t := 1, 2 \ldots 300$
$C_s := 900$
$\lambda_s := 170$
$\rho_s := 2700$
$C_i := 2000$
$\rho_i := 920$
$\lambda_i := 2$
$Q_1(T_s) := d \cdot C_s \cdot \rho_s \cdot (T_h(T_s) - T_m)$ $Q_1(243) = 8.505 \times 10^4 \, \frac{Joul}{m^2}$ $Q_2(T_s, t) := W(T_s) \cdot t,$ where d is the heating element thickness, t is the duration in which heat is exchanged (e.g., for a heat pulse), C is the material heat capacity, $\lambda$ is a thermal conductivity coefficient, $\rho$ is the material density (subscript "i" denotes ice and/or snow and subscript "s" denotes substrate material for most aluminum alloys), $T_s$ is the temperature of the substrate, $T_h$ is the temperature of the heating element, and $T_m$ is the ice temperature. The mean power from a power supply used in this example thermal transfer de-icer system (de-icing every three minutes (180 s)) may be calculated according to the following Table 42-7:

TABLE 42-7

(MathCad file)

$$W_m(t, T_s) := \frac{Q_1(T_s)}{t} + W(T_s)$$

$$W_m(180, 243) = 670.407 \, \frac{watt}{m^2} \, (e.g., plot\ 620)$$

$$W_m(180, 253) = 464.663 \, \frac{watt}{m^2} \, (e.g., plot\ 621)$$

$$W_m(180, 263) = 266.102 \, \frac{watt}{m^2} \, (e.g., plot\ 622)$$

In one example, the de-icer system with the above characteristics is useful with an aerofoil (e.g., aircraft wing) de-icer. Such a de-icer system can be made of 1 mm thick aluminum alloy and attached behind a leading edge of a small aerofoil (i.e., the forward exposed portion of an aircraft wing). In the example, the aerofoil has a span of about 20 cm and thickness of about 5 cm; the de-icer dimensions are about 20 cm×10 cm. At an air speed of about 142 km/h, and at approximately −10° C. with about 20 cm water droplets, atmospheric ice forms on the aerofoil. After ice growth of about 5 mm to 10 mm thickness, a computer system (e.g., controller 78 of FIG. 6) directs a power supply to apply power to the de-icer to melt an interfacial layer of ice on the aerofoil surface, such that the adhesion of the ice to the aerofoil surface is substantially modified and/or broken. The ice can then be removed from the aerofoil surface by air drag force. Such an example aerofoil system was built and tested, demonstrating a performance which was very close to theoretical predictions of Table 42-7.

Methods of Coefficient of Friction Manipulation

In the following embodiments, the coefficient of friction is modified between an object surface (e.g., as part of a slider) and ice or snow. In one example, a system such as system 40, FIG. 4, employs the equations of FIG. 1 to affect the coefficient of friction between a slider and snow (e.g., as described in connection with FIGS. 47 and 48). Such a system can assist in increasing or decreasing traction between the surface interface and the snow as determined by a particular application. For example, certain sliders described herein employ such a system as a pulse brake to brake the slider as it travels across snow.

Figure 47:
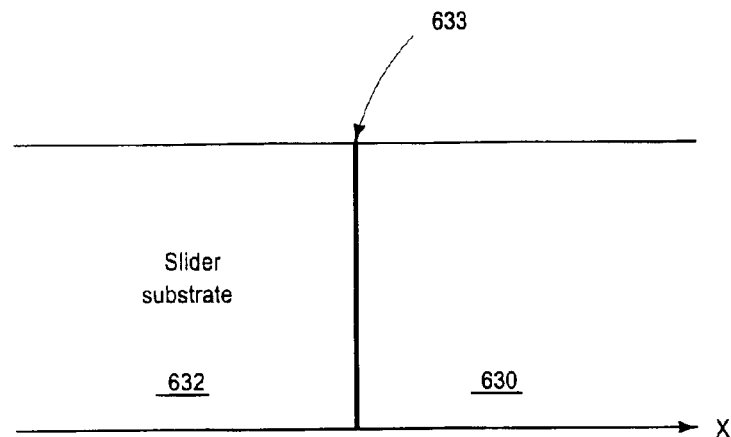
FIGS. 47 and 48 illustrate characteristics of one slider.
Figure 48:
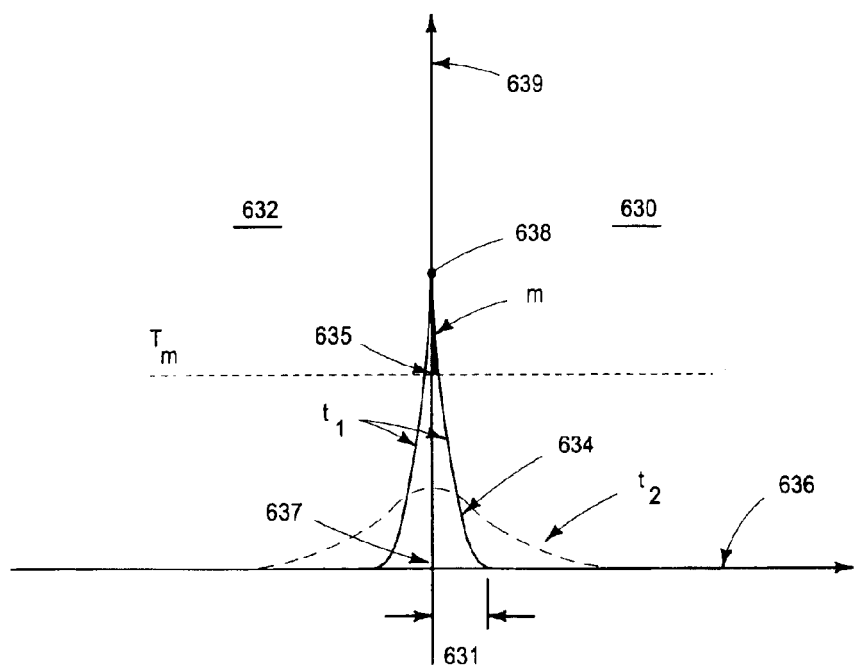

FIGS. 47 and 48 illustrate characteristics of a slider, such as a ski or an automobile tire, in accord with one embodiment, The slider includes slider substrate 632 and heating element 633. Heating element 633 is affixed to slider substrate 632 and may be in direct contact with ice and/or snow 630. Heating element 633 is configured for receiving power from a power source, for example in accordance with the equations of FIG. 1.

FIG. 48 illustrates temperature diffusion within slider substrate 632 and ice 630 when power is applied to heating element 633 in the form of a pulse. For example, FIG. 48 illustratively shows a heat diffusion distance along X-axis 636 over a given time t, through ice 630 and substrate 632, as a function of temperature change T along T-axis 639 at the ice-object interface. The curve $t_1$ represents temperature change caused by heat diffusion into ice 630 and into substrate 632 for a given pulse duration. As shown, the peak of curve $t_1$ is at a certain temperature 638 on T-axis 639; temperature 638 is sufficient to melt an interfacial layer of ice 630. The shaded area (m) under the curve $t_1$ represents a melted interfacial layer.

Prior to applying power to heating element 633, the ambient temperature is represented by point 637. Once a pulse of power is applied to heating element 633, temperature of element 633 begins to rise, and transfers into ice 630 for a distance 631 (the distance of an interfacial layer of ice 630) and into substrate 632. This temperature rises to point 635 where ice begins to melt and continues to rise for the duration in which pulse power is applied. Thermal energy melts a thin interfacial layer (m) of ice 630. Once the power is removed from heating element 633, the temperature begins to drop below the melting point 635, curve $t_2$. As the temperature of heating element 633 decreases, the adhesion of ice 630 to slider substrate 632 is modified due to refreezing. This refreezing increases the adhesion of the ice 630 to substrate 632 and assists in braking the slider at the interface of heating element 633.

In one embodiment, the characteristics of the slider conform to the equations of FIG. 10. For example, the diffusion time t over a length L coincident with X-axis 636 may be in the form:

$$t = \frac{L^2}{D}, \qquad (\text{Eq. 11-1})$$

where
D is a coefficient of heat diffusivity set forth by:

$$D = \frac{\lambda}{\rho c}, \qquad (\text{Eq. 11-2})$$

where
$\lambda$ is a thermal conductivity coefficient, $\rho$ is the material density, and c is the material heat capacity. Accordingly, equations. 11-1 and 11-2 illustrate that heat energy captured inside ice 630 and substrate 632 diffuses over a distance that is proportional to a square root of time t. The shorter the duration in which power is applied to heating element 633 thus affects thinner interfacial layers of ice. In one embodiment, the time t and energy Q applied to heating element 633—to heat an interfacial layer of ice 630 from an ambient temperature T to a melting point temperature $T_m$ (melting point 638)—follows the equations discussed FIG. 1.

Figure 49:
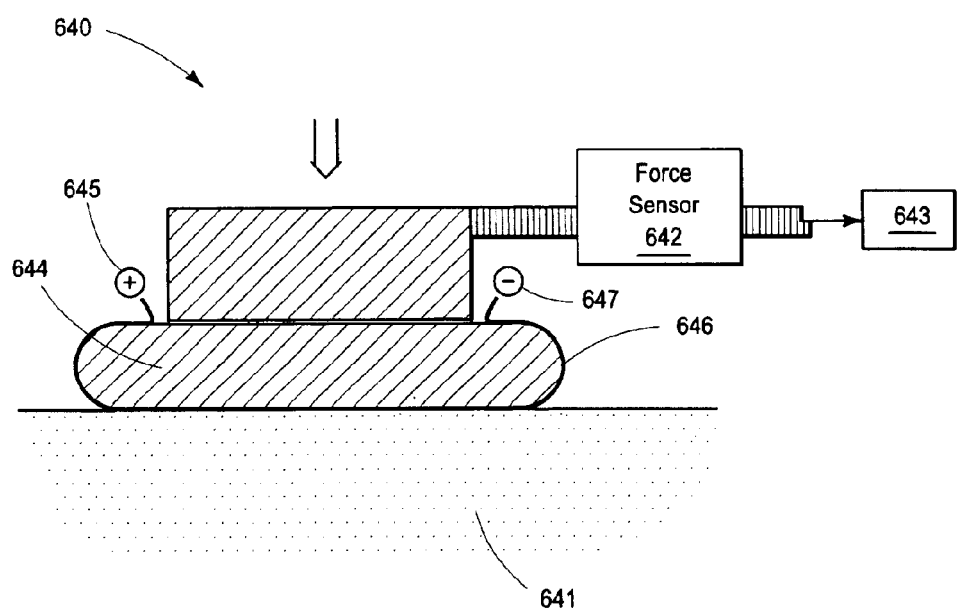
FIG. 49 shows one slider apparatus that illustrates testing of frictional changes at the ice-to-object interface.

FIG. 49 shows one slider 640 to illustrate testing of frictional changes at the ice-object interface. Slider 640 includes acrylic slider 644, force sensor 642, and heating element 646, such as Ti foil with a thickness in a range of about 12.5 $\mu$m to 25 $\mu$m. Slider 640 employs a heating element 646 that melts an interfacial layer of ice 641 adjacent slider 640 by pulsating thermal energy to the layer, for example in accordance with the equations of FIG. 1. Power may be applied to heating element 646 at terminals 645 and 647 such that heating element 646 melts the interfacial layer of ice 641. Once the interfacial layer of ice 641 is melted, the interfacial layer of ice is allowed to refreeze due to cooler ambient temperature, providing a bond between ice 641 and slider 644.

Force sensor 642 illustratively receives force information about the force applied from slider 644 towards ice 641. Force sensor 642 may relay such information to a controller 643 for a determination of how to apply power to heating element 646. A power supply, such as those described herein, may then supply power to heating element 646 to melt the interfacial layer of ice 641. Melting the interfacial layer of the ice 641 modifies adhesion strength of ice 641 to slider 640 and changes a coefficient of friction between ice 641 and slider 644.

Figure 50:
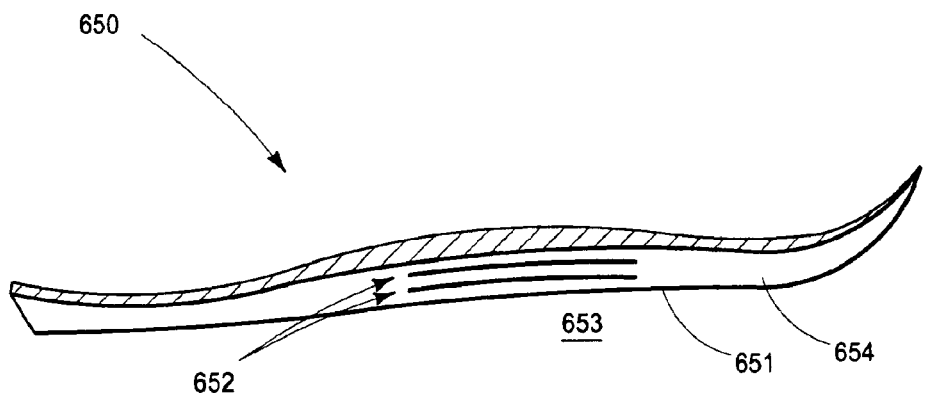
FIGS. 50 and 51 illustrate an application of one slider in the form of a ski.
Figure 51:
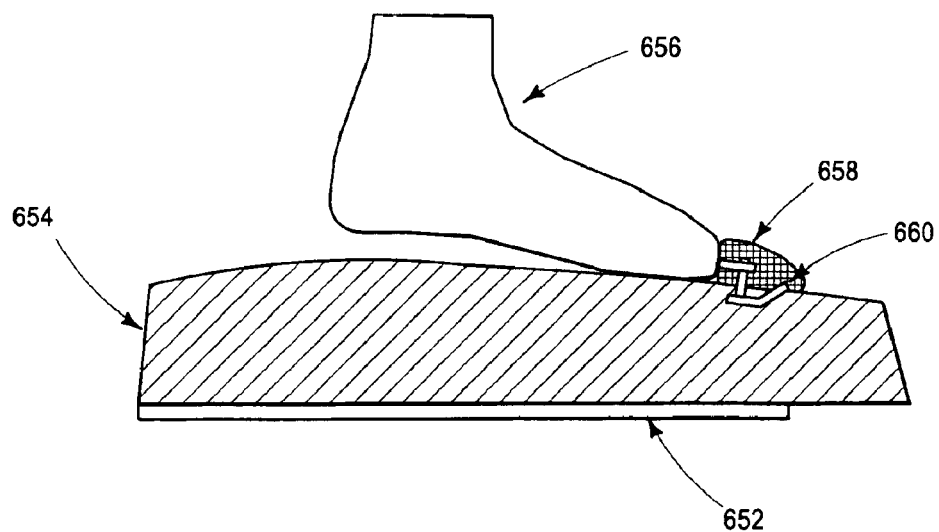

FIGS. 50 and 51 illustrate an application of one slider 650 in the form of ski 654, in accord with one embodiment. Slider 650 includes metal heating elements 652, such as Ti foil, coupled with a ski surface 651, which is in contact with snow 653. Heating elements 652 are configured for melting a layer of interfacial snow interfacing with surface 651 by pulsating energy to the layer of snow 653, such as in accordance with the equations of FIG. 1. Power is for example applied to heating elements 652 by one of several devices described herein. Once the interfacial layer of snow 653 is melted, it refreezes due to cooler ambient temperature and provides a bond between snow 653 and surface 651. The bond provides improved traction to snow 653 by modifying a coefficient of friction between the ice and slider 650.

Slider 650 may also include a binding 658, shown in FIG. 51. Switch 660 is located with binding 658 to control the manner in which power is delivered to heating elements 652. An example of switch 660 is a mechanical switch. Switch 660 may also include a manual switch, a ski motion switch, a pressure-activated switch, an accelerometer, remote control switch, and/or a motion sensor; each such switch may be used with slider 650 to activate heating and refreezing of the interfacial layer of ice to provide a desired coefficient of friction.

More particularly, FIG. 50 further shows the manner in which heating elements 652 may be affixed to ski 654. In FIG. 51, a ski boot 656 is inserted into binding 658. Ski boot 656 may be used to control switch 660, if desired, so that power is applied to heating elements 652. Power may be supplied by power sources described herein. In one example, when boot 656 triggers switch 660, switch 660 conducts power from a power supply to heating elements 652 to melt an interfacial layer of snow 653, thereby modifying a coefficient of friction between ski 654 and snow 653.

Figure 52:
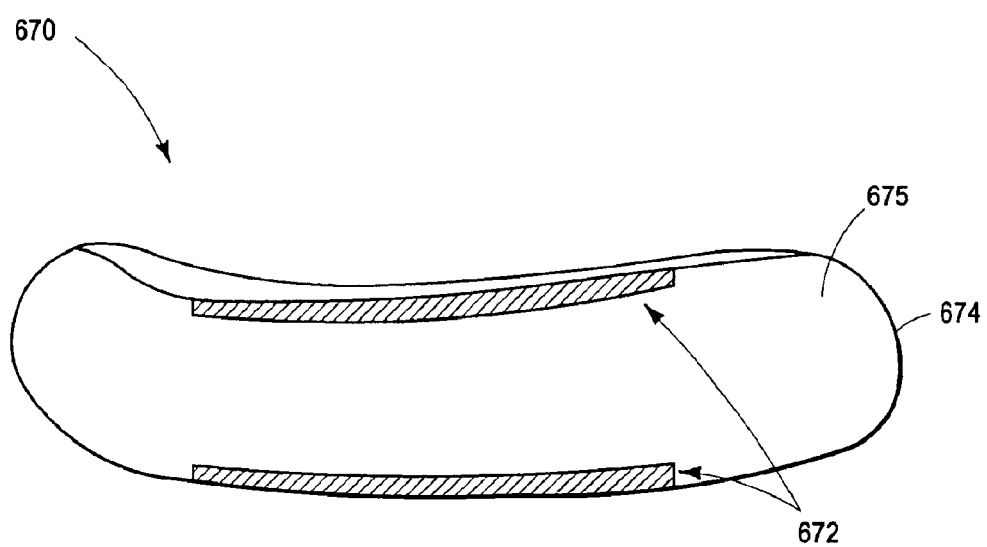
FIG. 52 illustrates one slider in the form of a snowboard.

FIG. 52 illustrates one slider 670 in the form of snowboard 674. Slider 670 includes heating elements 672 affixed to a bottom surface 675 of snowboard 674; surface 675 is in contact with snow during operation of snowboard 674. Operative characteristics of slider 670 may be similar to those ski 654 of FIGS. 50 and 51. Heating elements 672 may also be internal to snowboard 674, but in thermal communication with surface 675, in accord with one embodiment.

Figure 53:
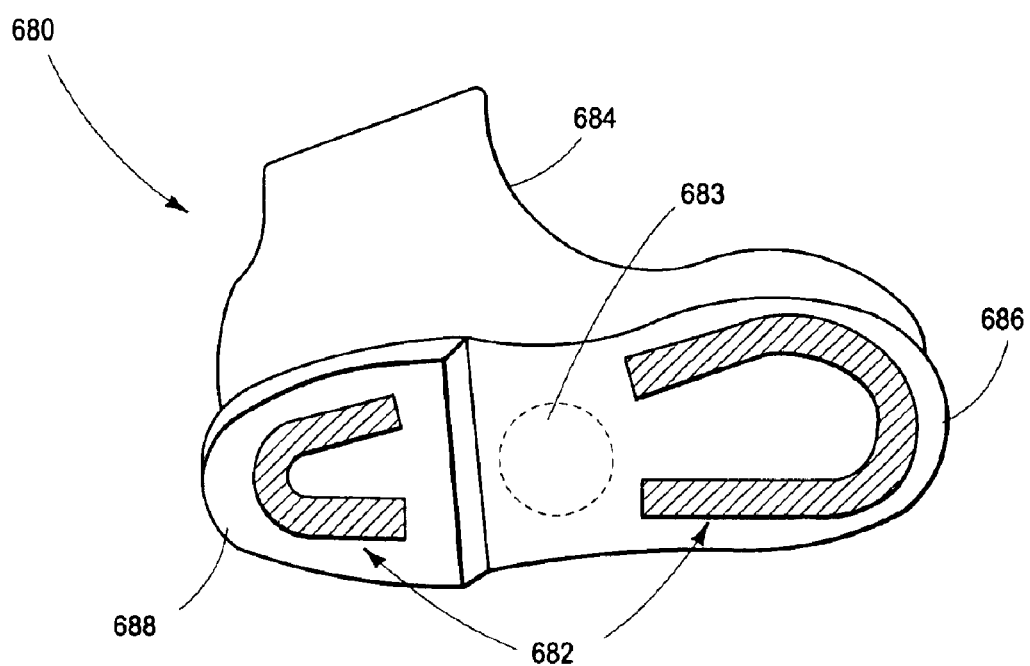
FIG. 53 illustrates one slider in the form of a shoe.

FIG. 53 illustrates one slider 680 in the form of shoe 684. Slider 680 includes metal heating elements 682, such as Ti foil, affixed to heel 688 and sole 686; heel 688 and sole 686 contact snow or ice when a person walks on snow or on ice. Heating elements 682 may also be internal to show 684 (or heel 686) so long as they are in thermal communication with the outer-most surface of heel 688. Heating elements 682 may be made of a thin conductive film (e.g. TiN film, Cr film) sputtered on either a polymer substrate (e.g. Kapton, ABS) or on a ceramic substrate (e.g. glass ceramic, zirconia ceramic). Power is applied to heating elements 682 such that heating elements 682 melt an interfacial layer of ice adjacent heel and/or sole 688, 686. Once the interfacial layer of ice or snow is melted, it is allowed to refreeze due to ambient temperature, thereby providing a bond of ice or snow to heel and/or sole 688, 686. Power is applied to heating elements 652, for example as described in connection with FIG. 1. In one embodiment, slider 680 employs a small battery 683 (e.g., a D-cell battery), as the power supply. A switch, such as switch 48 of FIG. 4, connects the power from the power supply to heating elements 682. In one example, when a user triggers the switch, the switch conducts power from battery 683 to heating elements 682, to melt an interfacial layer of the ice or snow and to modify a coefficient of friction between shoe 684 and the ice or snow, assisting with traction of shoe 684.

Figure 54:
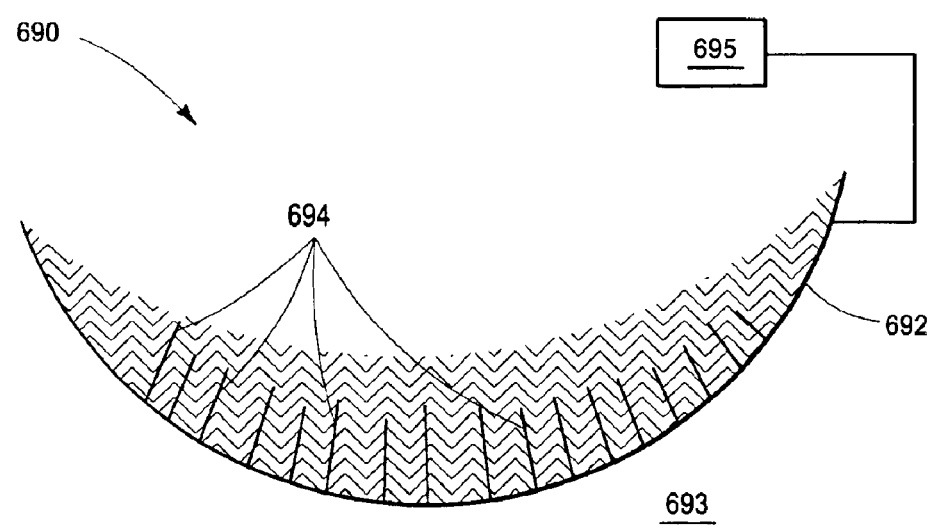
FIG. 54 illustrates one slider in the form of a tire.

FIG. 54 illustrates one slider 690 in the form of tire 692. Slider 690 includes metal heating elements 694 embedded in tire 692. Power is applied to heating elements 694 such that heating elements 694 melt an interfacial layer of ice or snow 693. Once the interfacial layer of ice 693 is melted, it refreezes due to ambient temperature and provides a bond between ice/snow 693 and tire 692. Power may be applied to heating elements 694 by one of several techniques discussed herein. In one embodiment, slider 690 employs a car battery as its power supply.

In one example, heating elements 694 include thin metal wires configured for receiving the power and converting that power into thermal energy, to melt the interfacial layer of ice/snow 693 in contact with tire 692. Additionally, slider 690 may include a controller, such as controller 78 of FIG. 6, to controllably apply that power according to the equations of FIG. 1. In one embodiment, a user activates a switch (e.g., similar to other embodiments described herein) so that the power is applied to heating elements 694 when needed for additional traction between tire 692 and a road surface covered with ice and snow 693. In one example, when a user triggers a switch by depressing a preconfigured button on a console in a car, the switch conducts power from the power supply to heating elements 694 to melt an interfacial layer of the ice and snow 693, thereby modifying a coefficient of friction between tire 692 and an ice and snow covering the road surface when the interfacial layer refreezes and increases traction of tire 692 on the snow/ice 693.

Heating elements 694 thus may operate as a "pulse brakes" by providing a heating pulse to the interface between tire 692 and snow/ice 693. For example, when braking is needed, an interfacial layer of ice is melted. When the pulse stops, melted spots on tire 692 typically re-freeze within a few milliseconds due to ambient temperature, providing strong bonds between tire 692 and ice/snow 693. These bonds assist in braking the motions of tire 692 relative to ice/snow 693. In one embodiment, a Peltier element 695 is used to more rapidly cool the melted interfacial layer of ice.

An example of Peltier element 695 is a thermoelectric module consisting of an array of Bismuth Telluride doped semiconductor pellets of one type of charge carrier (e.g., positive or negative) for carrying a majority of current. Pairs of positive and negative pellets are configured so that they electrically connect in series, but thermally connect in parallel. Metalicized ceramic substrates may provide a platform for the pellets. Thermoelectric modules may function singularly or in groups with either series, parallel, or series-parallel electrical connections.

When a DC voltage is applied to Peltier element 695, the positive and negative charge carriers in the pellet array absorb heat energy from one substrate surface and release it to an oppositely situated substrate. The surface where heat energy is absorbed may decrease temperature without moving parts, compressors, or gases. The oppositely situated substrate, where heat energy is released, resultantly increases in temperature.

Figure 55:
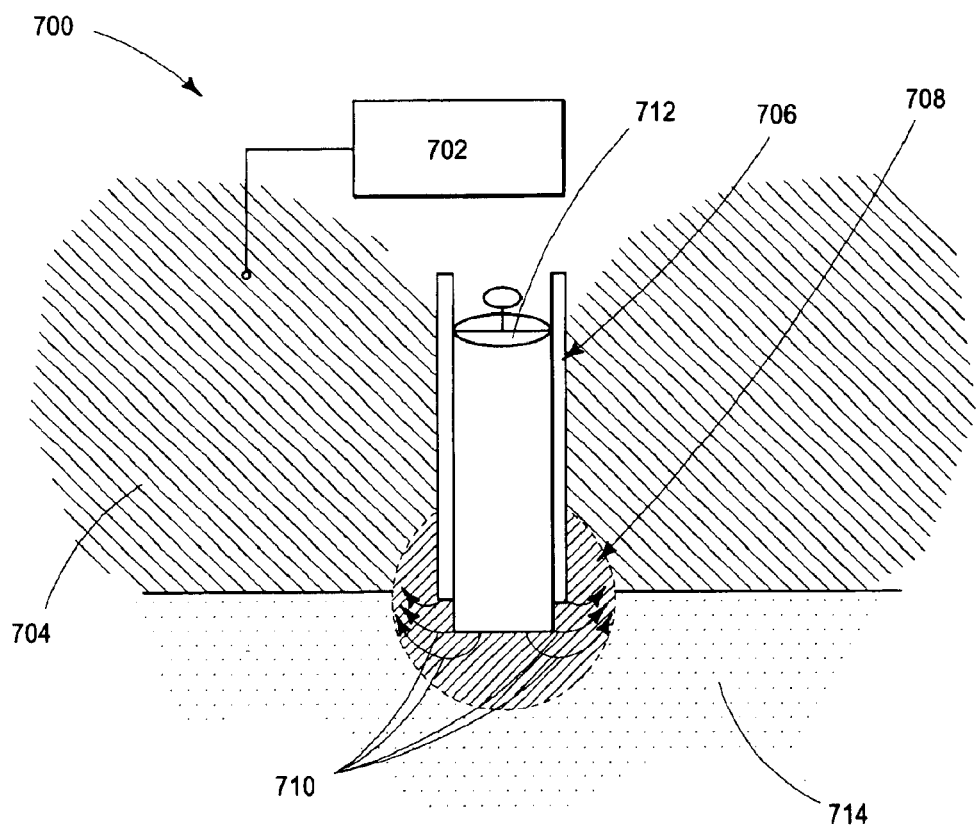
FIG. 55 illustrates a test configuration of one slider.

FIG. 55 illustrates a test configuration of one slider 700, to illustrate how a slider affects friction to adjacent snow or ice. Slider 700 includes a plurality of metal heating elements embedded in a region 704 illustrating electrically conductive rubber of a tire. Power is applied to heating elements 712 so as to melt an interfacial layer of ice 714. Once the interfacial layer of ice is melted, it refreezes due to ambient temperature and provides a bond between ice 714 and slider 700.

In one embodiment, heating element 712 is a thin metal wire configured for receiving the power and converting that power into thermal energy to melt the interfacial layer of ice 714 in contact with slider 700. A thin electrical insulator 706 about the heating element may surround heating element 712. As heating element 712 receives power from power supply 702, the heating elements 712 convert the power into thermal energy through resistivity. The thermal energy is conducted (thermal radiation lines 710) to ice 714 and into a heated region 708, in which the interfacial layer of ice 714 is melted. The melted interfacial ice changes a coefficient of friction between the slider 700 and ice 714 such that traction between slider 700 and ice 714 is increased. The coefficient of friction changes due to melting and refreezing as electrical power is respectively applied and removed to heating element 712. For example, a pulse of electrical power having a duration in accordance with Eq. 1.4 of FIG. 1 melts the interfacial layer of ice 714 as it is converted to thermal energy by heating element 712. As the pulse of electrical power subsides, region 708 is allowed to refreeze, due to cooler ambient temperature and non-melted ice 714. This melting and refreezing of ice 714 modifies the coefficient of friction and improves traction and braking when, for example, slider 700 is an object such as a tire or a ski.

Figure 56:
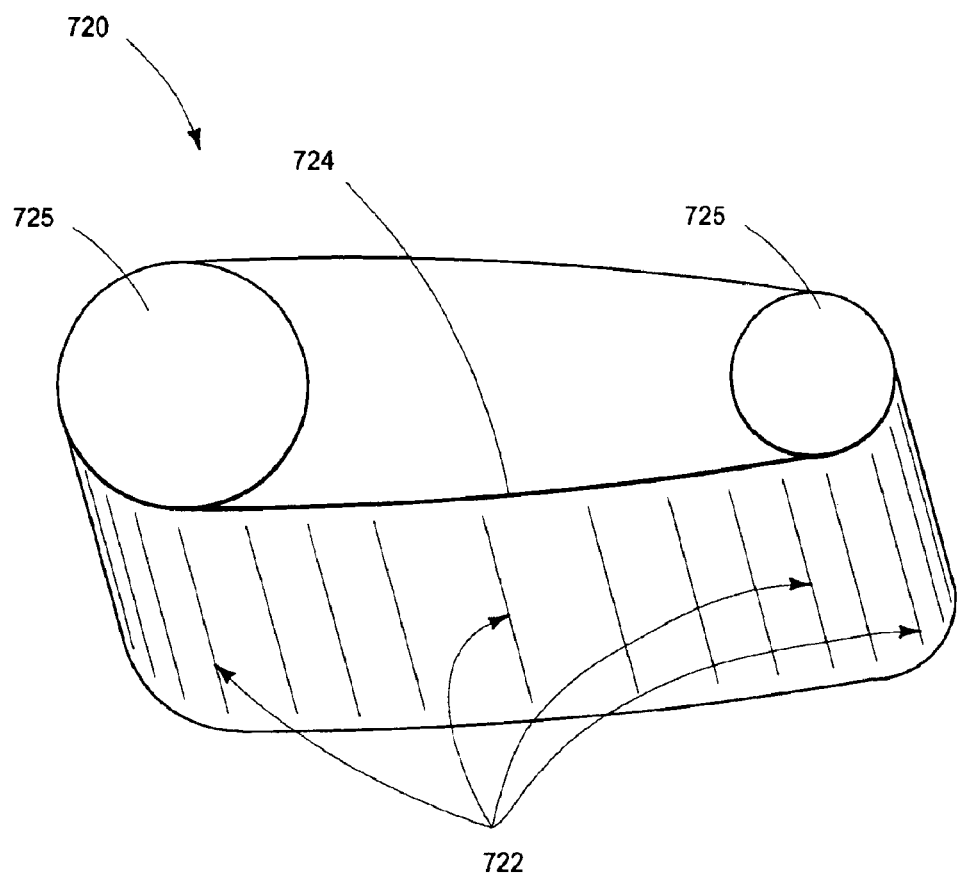
FIG. 56 illustrates one slider in the form of a track.

FIG. 56 illustrates one slider 720 in the form of track 724 such as used by a snowmobile. Slider 720 includes heating elements 722 embedded in track 724. Power is applied to heating elements 722 such that heating elements 722 melt an interfacial layer of ice adjacent track 724. Once the interfacial layer of ice is melted and power is no longer applied, the melted interfacial layer of water refreezes due to ambient temperature and provides a bond of ice to track 724. In one embodiment, slider 720 employs a battery as the power supply. Illustratively, track 724 is shown about track wheels 725. Heating elements 722 may be in the form of thin metal wires or in the form of thin metal foil that convert power into thermal energy to melt the interfacial layer of ice in contact with track 724. A user may activate a switch as desired to apply power to heating elements 722, such as when the user determines a need for additional traction between track 724 and a terrain covered with ice and snow. When a user triggers the switch, the switch conducts power from a power supply (e.g., a snowmobile battery) to heating elements 722 to melt the interfacial layer of ice/snow, thereby modifying a coefficient of friction between track 724 and the snow, increasing traction of track 724 on the snow due to subsequent refreezing.

Figure 57:
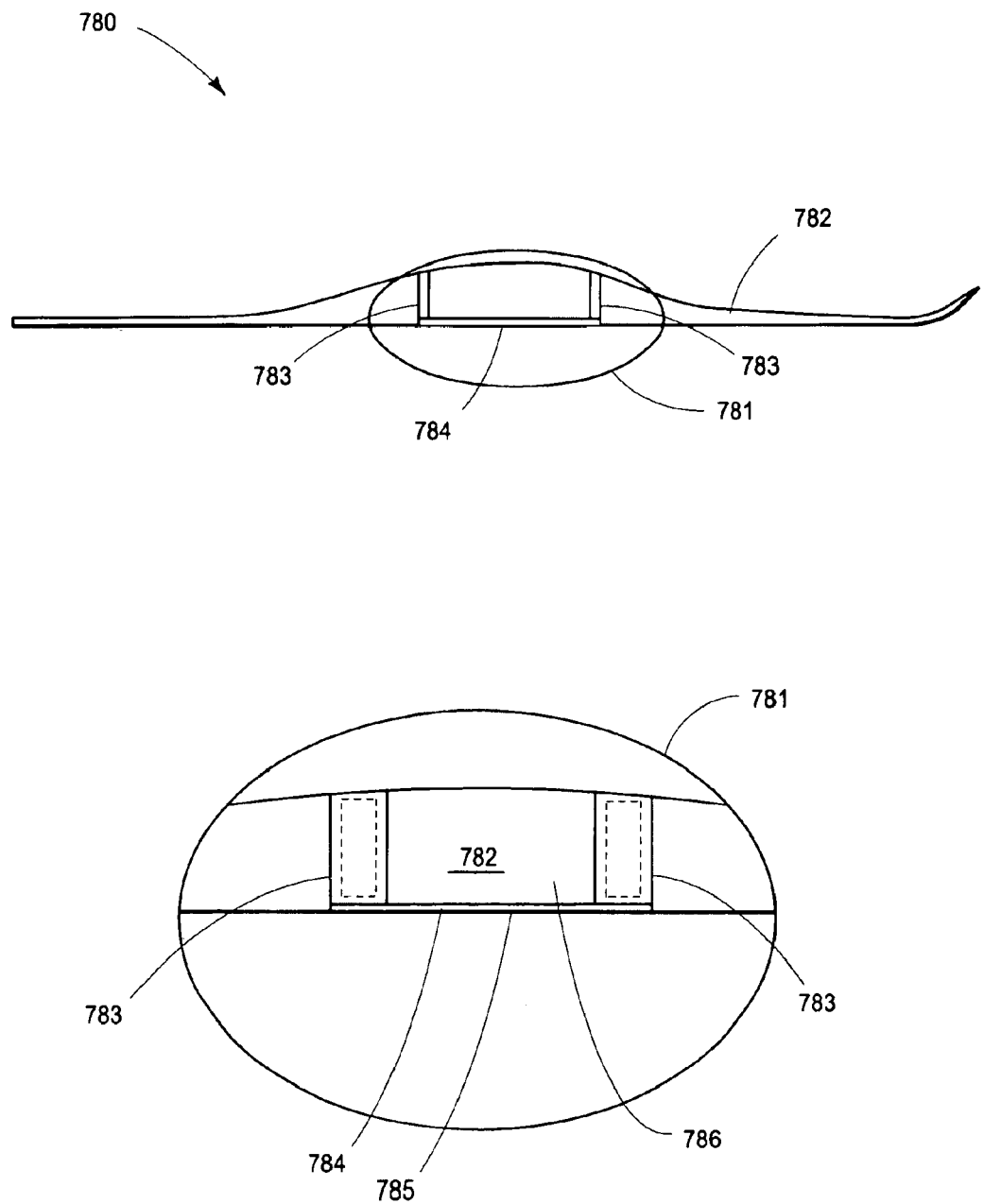
FIG. 57 illustrates one slider in the form of a ski.

FIG. 57 illustrates one slider 780 in the form of ski 782; ski 780 is shown in greater detail in view 781. In the exemplary embodiment, slider 780 includes heating element 784 and may have operative characteristics similar ski 654 of FIGS. 50 and 51. Heating element 784 (exaggerated in view 781 for purposes of illustration) may be formed from material such as Ti foil or abrasion-resistant conductive paints (e.g., nickel-based and silver-based paints), or a sputtered layer of TiN. Heating element 784 is affixed to a surface of ski 782 (or otherwise arranged to thermally communicate with the surface) to continually contact snow and melt interfacial snow or ice, such described in connection with FIG. 1.

View 781 shows one manner in which heating element 784 may affix to ski 782. For example, view 781 shows an exploded view in which heating element 784 is affixed to ski 782 via posts 783. Posts 783 are typically formed as a metallic conductor to serve as electric bus terminals, and also to shield heating element 784 from damage. Posts 783 may be used to conduct power from a power supply to heating element 784 to melt an interfacial layer of snow, thereby modifying a coefficient of friction between ski 782 and the snow.

In one embodiment, heating element 784 includes a protective coating 785 to guard against rock damage. Heating element 784, posts 783, and substrate 786 may be replaceable. When heating element 784 includes a conductive layer of paint, scratches may be repaired with a touch-up paint kit.

Figure 58:
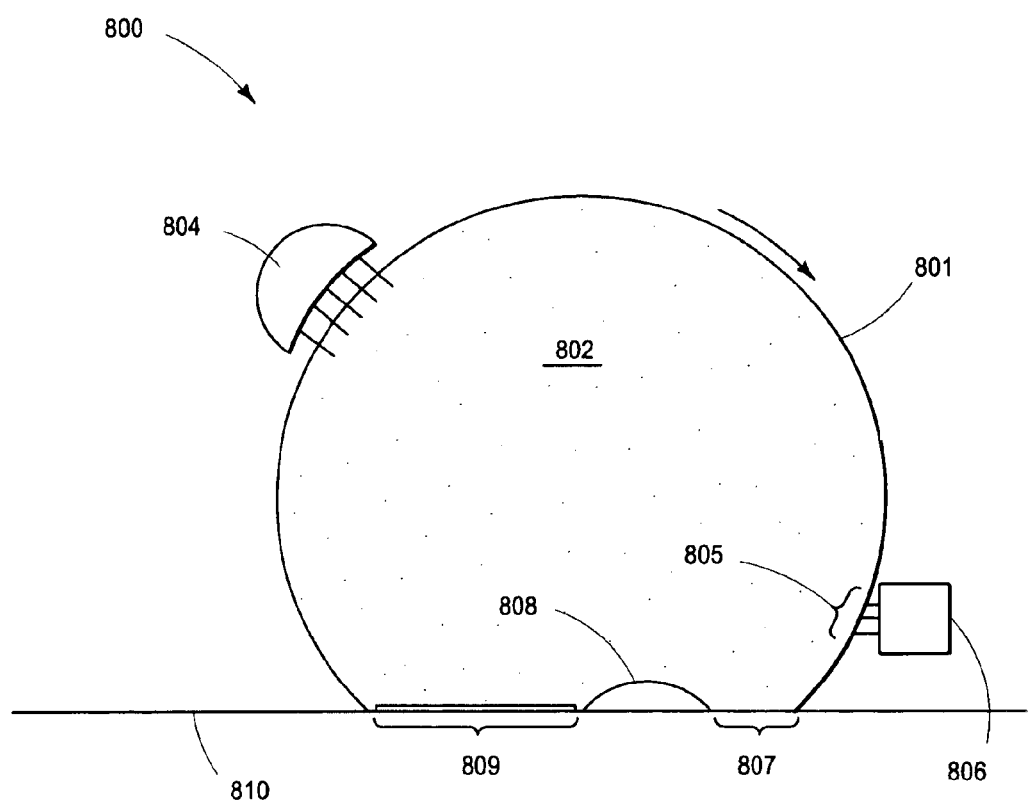
FIG. 58 illustrates one slider in the form of a tire.

FIG. 58 illustrates one slider 800 in the form of tire 802, in accord with one embodiment. Slider 800 includes heating unit 806 and an optional air exhaust sub-system 804. Air exhaust sub-system 804 may include a cold-air exhaust of an automobile air conditioner. Heating unit 806 may include a heat lamp or other heating device to heat region 805 of tire 802 with pulsed or continuous thermal energy. Slider 800 may employ a battery of a vehicle as the power supply.

In one embodiment, heating unit 806 includes or utilizes the exhaust of the cars's air conditioner or engine. In another embodiment, heating unit 806 includes or utilizes a water spray that generates fine water mist; the water mist covers a car tire with a thin water film, which freezes on contact with ice, thus providing strong bonds between the tire and ice.

In another embodiment, heating unit 806 includes a hot cylinder touching the tire; the cylinder may rotate with the tire. The hot rotating cylinder may be heated by a car electrical system, by a car's air conditioner, and/or by car exhaust gases.

In one operational example, heating unit 806 is configured to receive power and to convert that power into thermal energy, to melt an interfacial layer of ice 810 at region 807 in contact with tire 802. As heating unit 806 receives power from the power supply, it converts the power into thermal energy and forms heated region 805. Because of the short duration of exposure to heat, typically only a thin layer of the tire rubber is heated. As tire 802 rotates, heated region 805 melts an interfacial layer of ice 810 at region 807. As the tire continues to rotate, the melted layer of ice refreezes at region 808 and changes a coefficient of friction between tire 802 and ice 810, at zone 809, thereby creating a bond between tire 802 and ice 810 such that traction between tire 802 and ice 810 increases.

Because tire 802 has significant contact area with ice 810, the rubber of tire 802 is usually re-cooled before it is again heated by heating unit 806; thus, additional cooling is normally not necessary when the ambient temperature is below the melting point of ice. Nonetheless, additional cooling may be used; for example, cold air from the car's air conditioner may be used to cool the tire via exhaust sub-system 804.

Since heating unit 806 can pulse thermal energy, the coefficient of friction may discretely change as a result of interfacial ice 810 melting and refreezing as electrical power is respectively applied and removed (e.g., tire 802 incrementally heats and cools as it rotates). In one embodiment, heating unit 806 may include a heated metal brush pressed against rotating tire 802. The heat flux from the brush to the surface 801 of tire 802 heats a thin layer of tire rubber to cause subsequent melting of the interfacial ice.

The mean power used by heating unit 806 typically depends on ambient temperature and car velocity; but may be in a range of about 10 watts to 100 watts. In certain extreme cases, it may be in the range of about 1 watt to 1000 watts. Also depending on these temperature and velocity conditions, the duration in which the rubber of tire 802 is illuminated or heated by heating unit 806 is in a range of about 3 ms to 100 ms, but may be from about 1 ms to 1 s in more extreme cases. The refreezing time may be about the same as for a pulse deicer system, such as those described in FIGS. 1–6 (e.g., typically in a range from about 1 ms to 100 ms). These times may be adjusted so as to provide maximum traction when most of the road-to-tire contact region is refrozen.

Figure 59:
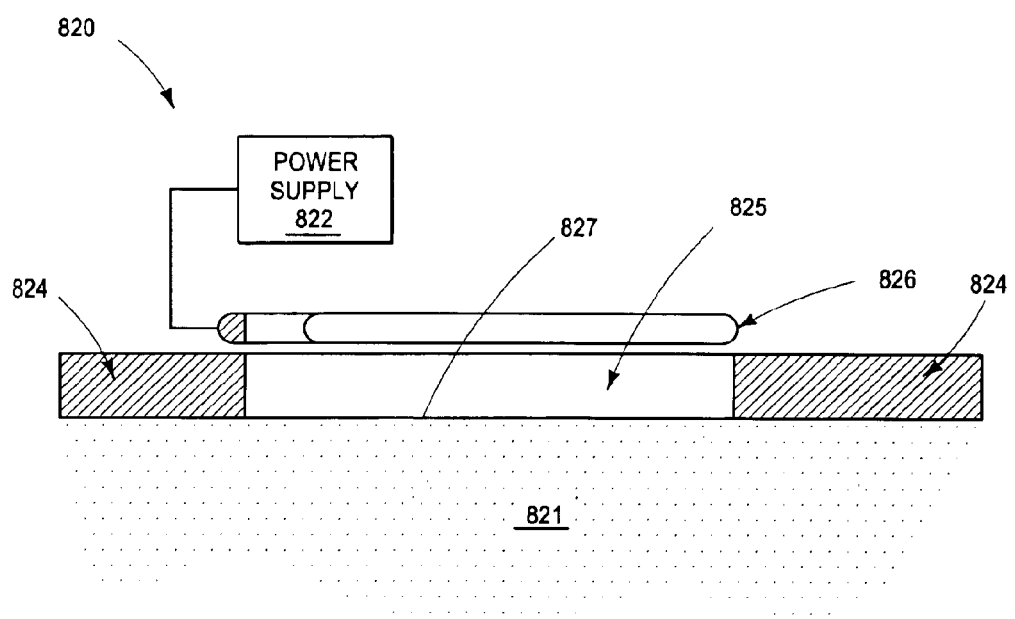
FIG. 59 illustrates a test configuration of one slider.

FIG. 59 illustrates a test configuration of one slider 820, in accord with one embodiment. Slider 820 includes slider interface 825 and photoflash lamp 826. Photoflash lamp 826 is configured to illuminate slider interface 825 with a pulse of light (e.g., a flash of light). Photoflash lamp 826 receives power from power supply 822 to melt an interfacial layer of ice 821. Photoflash lamp 826 pulses light to a thin blackened layer 827 interfacing ice 821. A typical duration and energy, per pulse, of lamp 826 is about 1 ms to 10 ms, generating an energy of about 1 J to 100 J.

In one embodiment, a single flash from photoflash lamp 826 melts the interfacial layer of ice 821 as photoflash lamp 826 illuminates slider interface 825. Slider interface 825 is typically transparent and converts energy from flash into thermal energy as light impinges blackened layer 827. For example, light from lamp 826 (e.g., visible light or infrared light) is absorbed by layer 827 and converted into thermal energy. The converted thermal energy is then absorbed in an interfacial layer of ice 821 adjacent slider 820. As the energy is absorbed by the interfacial layer of ice 821, the layer melts. The layer then refreezes due to ambient temperature to provide a bond between slider 824 and ice 821.

Coefficient of Friction Modification Analysis

Certain analyses are now described in which the coefficient of friction is modified at the ice-object interface or snow-object interface. These analyses may experimentally and graphically illustrate modification of a coefficient of friction.

Figure 60:
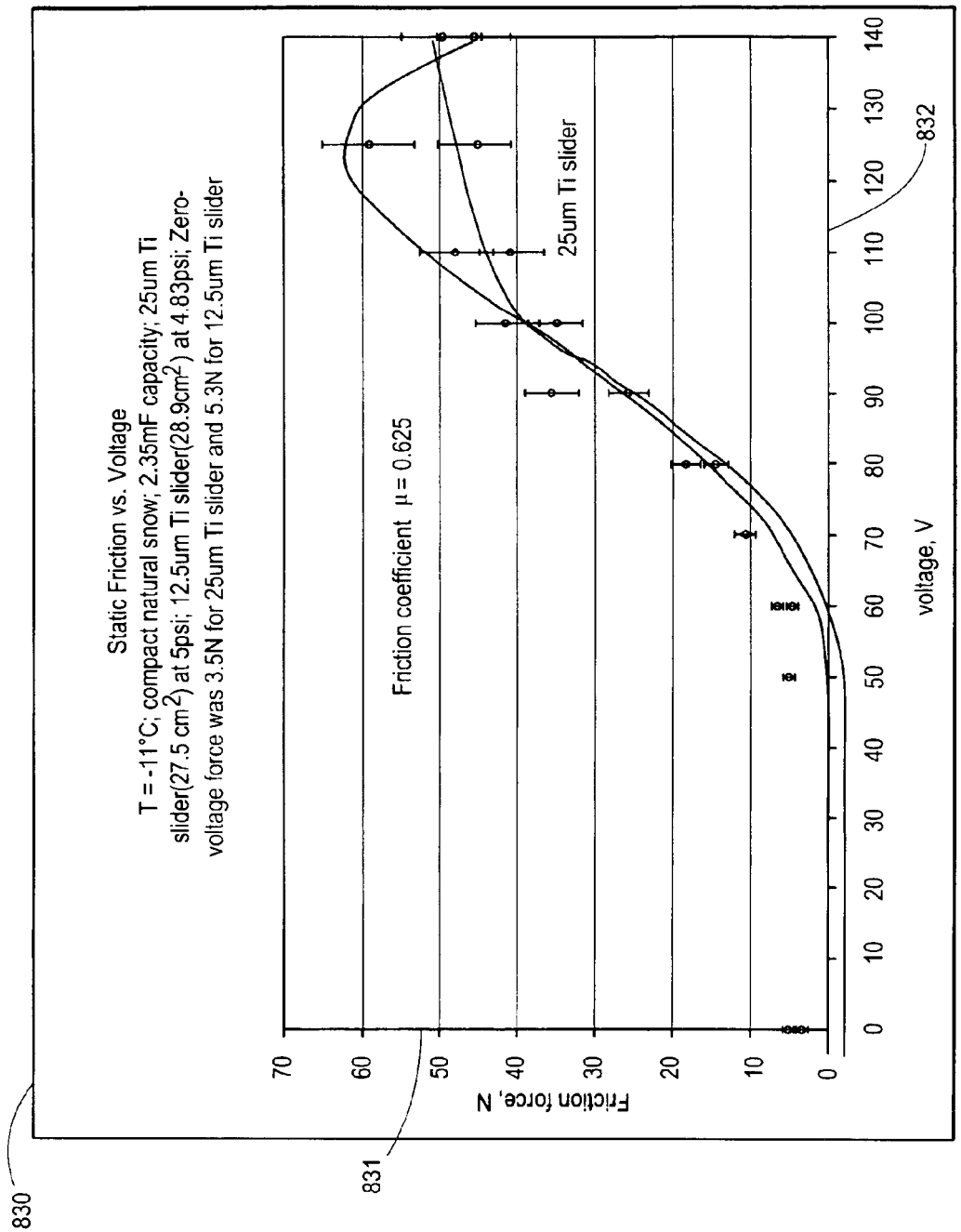
FIG. 60 shows a graph illustrating an exemplary relationship between coefficients of friction of certain sliders and voltage applied to heating elements affixed to the sliders.

FIG. 60 shows graph 830 illustrating an exemplary relationship between coefficients of friction of certain sliders and voltage applied to heating elements affixed to the sliders, in accord with one embodiment. An electric circuit such as shown in FIG. 2 was used to charge a 2.35 mF capacitor. The capacitor was then discharged through the heating element. In FIG. 60, Y-axis 831 represents frictional force and X-axis 832 represents voltage. Graph 830 distinguishes between two similar sliders, each with a heating element (one heating element includes Ti foil of about 12.5 $\mu$m thickness and the other heating element includes Ti foil of about 25 $\mu$m thickness). At about 50V of power applied to the heating elements, the coefficients of friction between the sliders and the snow changes, as shown. At about 100V, the coefficients of friction of the sliders to the snow begin to differentiate from one another. Accordingly, the thickness of the heating element material is substantially independent of voltage until about 100V, which may affect design considerations.

Figure 61:
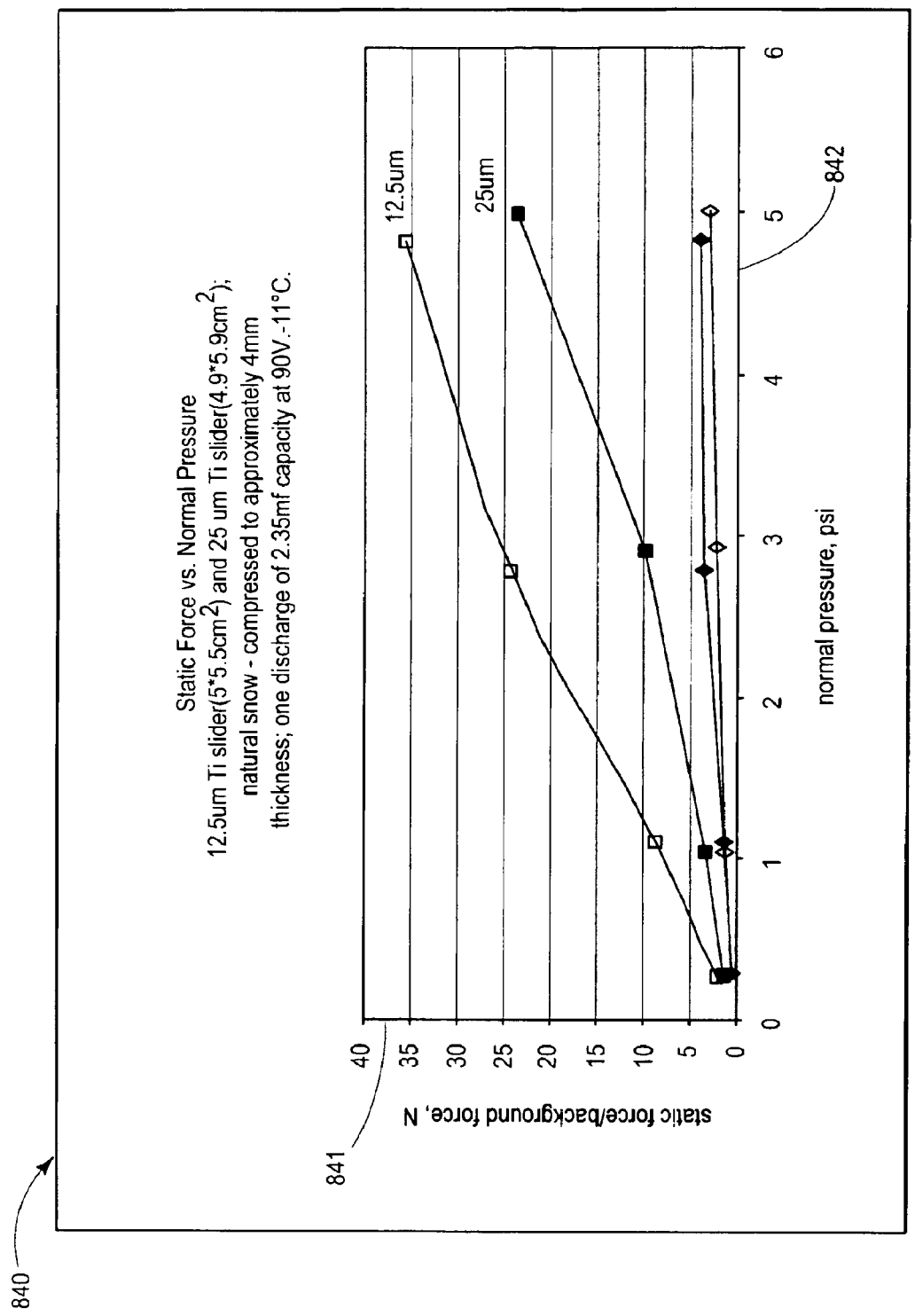
FIG. 61 shows a graph illustrating an exemplary relationship between static force of certain sliders and normal pressure of the sliders exerted on snow.

FIG. 61 shows graph 840 illustrating an exemplary relationship between static force of certain sliders and normal pressure of the sliders exerted on snow, in accord with one embodiment. In FIG. 61, Y-axis 841 represents static force and X-axis 842 represents normal pressure. Graph 840 distinguishes between two similar sliders, each with a heating element (one heating element includes Ti foil of about 12.5 $\mu$m thickness and the other heating element includes Ti foil of about 25 $\mu$m thickness). The two graphs below show static force of friction for the same sliders as measured without heating pulses applied. Other experimental details, such as DC voltage (90 V), temperature (−11° C.), and the capacitor used in the circuit of FIG. 2, are shown in the graph insert.

Figure 62:
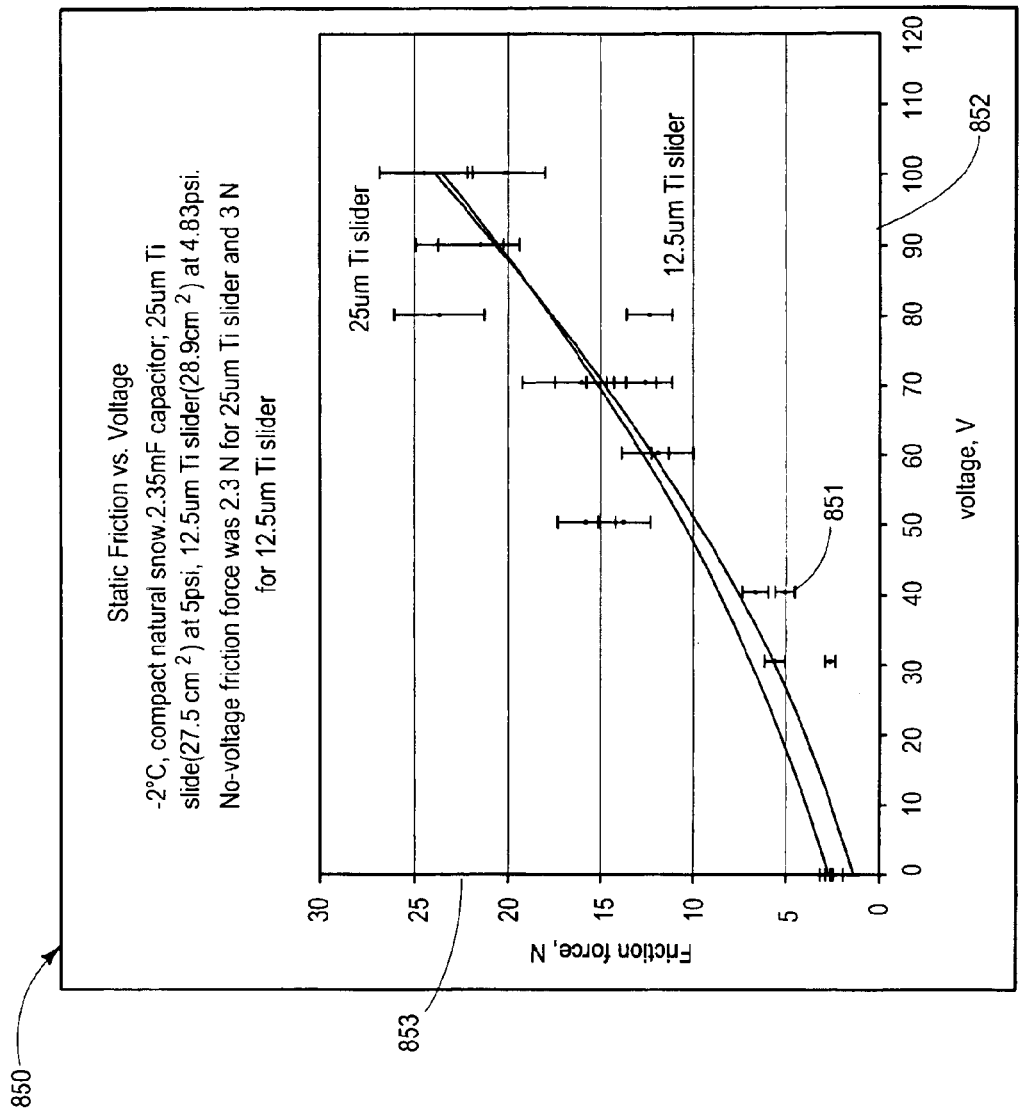
FIG. 62 shows a graph illustrating an exemplary relationship between coefficients of friction of certain sliders and the voltage applied to an affixed heating element.

FIG. 62 shows graph 850 illustrating an exemplary relationship between coefficients of friction of certain sliders and the voltage applied to an affixed heating element, in accord with one embodiment. In FIG. 62, Y-axis 853 represents frictional force and X-axis 852 represents voltage. Graph 850 distinguishes between two similar sliders, each with a heating element (one heating element includes Ti foil of about 12.5 µm thickness and the other heating element includes Ti foil of about 25 µm thickness). Each slider has an average curve as determined by a range of coefficients of friction associated with a particular applied voltage. For example, a slider with a heating element having Ti foil with a 25 µm thickness has a coefficient of friction that varies in a range of about 4.9N to 6N (point 851). FIG. 62 demonstrates that the pulse brake works well even when ambient temperature is very close to the melting point (−2° C.); good braking force is achieved even at −0.5° C.

Figure 63:
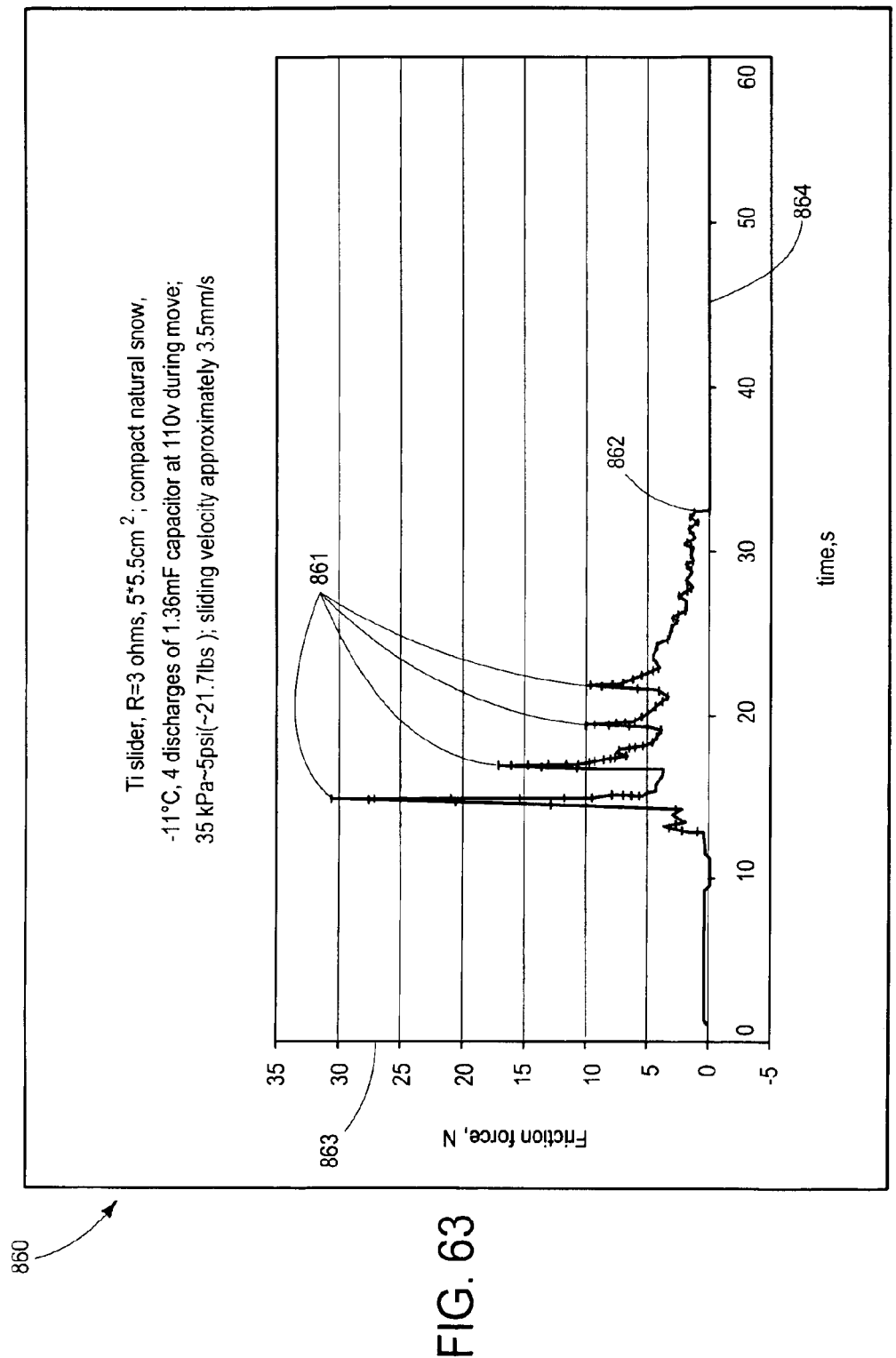
FIG. 63 shows a graph illustrating an exemplary relationship between coefficients of friction of one slider and the time required to stop the slider.

FIG. 63 shows graph 860 illustrating an exemplary relationship between coefficients of friction of one slider and the time during sliding at constant velocity of 3.5 mm/s. In FIG. 63, Y-axis 863 represents frictional force and X-axis 864 represents time. Four short pulses of heating power were applied during the experiment, during which the slider moved at a velocity of about 3.5 mm/s. A 1.36 mF capacitor discharged current to the heating element at about 110V in four pulses 861. The duration of the heating pulses were about 2.5 ms. A heating element affixed to the slider received power from the power supply for a limited duration (as a pulse of power), for example in accord with the equations of FIG. 1. The heating element converted that power into thermal energy and applied the thermal energy to the surface-to-ice interface. The heating element melted an interfacial layer of snow or ice adjacent to the slider. Melting the interfacial layer modifies the adhesion of the snow at the slider's surface and changes the coefficient of friction between the slider and the snow or ice. During each pulse 861, the coefficient of friction changes. The changing coefficient of friction between the slider and the snow causes the slider to resist sliding, thus increasing the friction force. That can be seen in FIG. 63 as the sharp peaks in the friction force. Changing the pulse energy and intervals between pulses, one can adjust an average friction force to a desirable magnitude. Those skilled in the art understand that such an adjustable brake may couple with a velocity-measuring system to facilitate making the ski a "cruise-control" system: a skier can preset a desirable maximum speed for himself or his children to have safe skiing.

Figure 64:
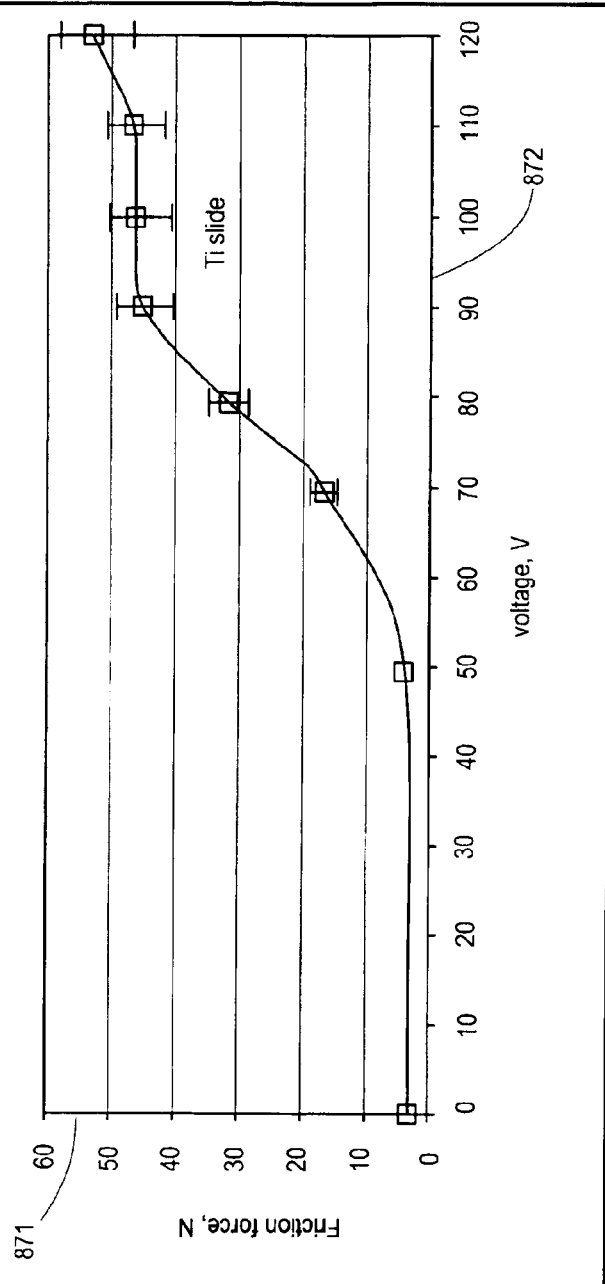
FIG. 64 shows a graph illustrating another exemplary relationship between coefficients of friction of one slider and voltage applied to an affixed heating element.

FIG. 64 shows graph 870 illustrating another exemplary relationship between coefficients of friction of one slider and voltage applied to an affixed heating element, in accord with one embodiment. In FIG. 64, Y-axis 871 represents frictional force and X-axis 872 represents voltage. In this embodiment, the voltage was varied to determine coefficients of friction as dependent upon power. At about 50V of power applied to the heating elements, the coefficient of friction changed. At about 90V, the coefficient of friction of the slider to the snow saturates and then remains almost constant until about 110V. Accordingly, a voltage between 90V and 110V may provide an increase in the coefficient of friction that is substantially independent of voltage between the 90V and 110V. This information is useful when choosing a power supply for a slider design.

Figure 65:
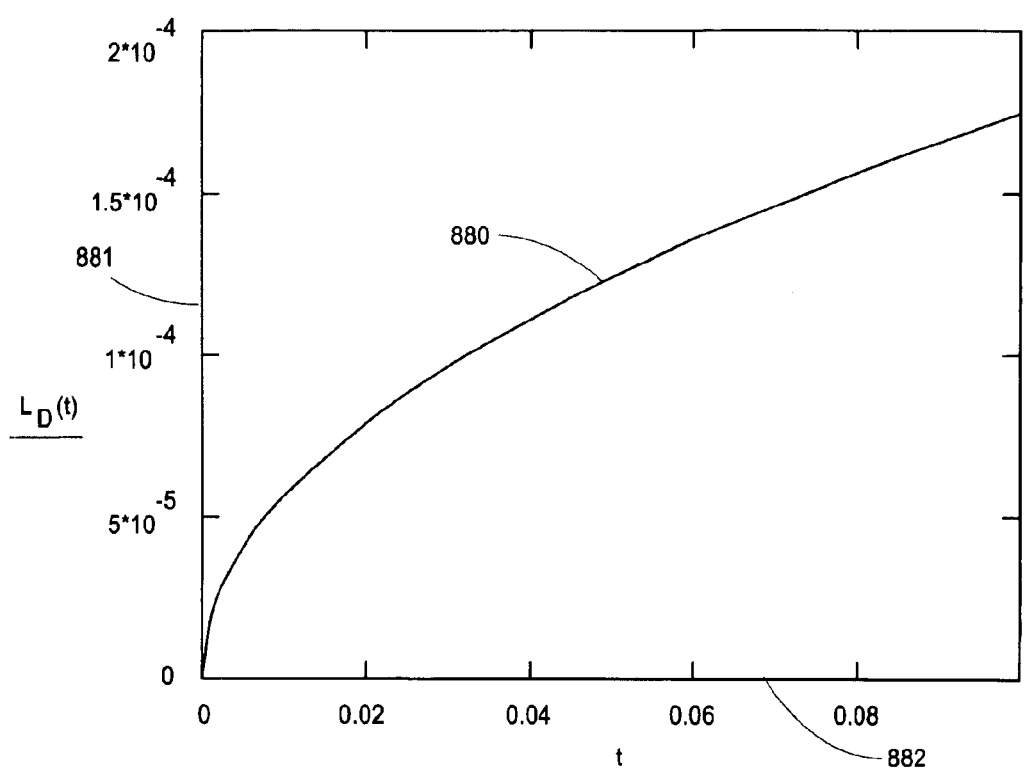
FIGS. 65 and 66 show graphs illustrating thermal energy and cooling time of one slider.
Figure 66:
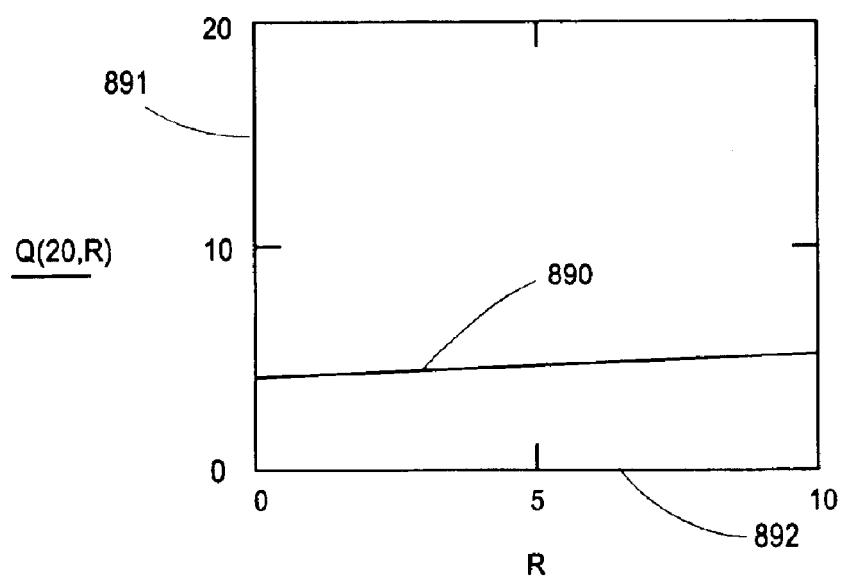

FIGS. 65 and 66 show graphs illustrating thermal energy Q and cooling time $t_{cool}$ of one slider. In FIG. 65, Y-axis 881 represents heat diffusion length in snow $L_D$ and X-axis 882 represents time. In FIG. 66, Y-axis 891 represents thermal energy and X-axis 892 represents resistance of a heater. In the example, during a first 10 milliseconds of heating the heat penetrates snow only to depth of thirty-six microns. Such a thin snow layer has a small heat capacity, requiring little energy to heat it to the melting point (i.e. 273K). Table 65-1 below calculates a total energy $Q(\Delta,R)$ used to melt a ten-micron thick layer of ice and to heat the interfacial snow and ski material by $\Delta$ degrees C. When heating power does not depend on T, the result is shown in Table 65-1:

TABLE 65-1

$W := 10^4, 2 \cdot 10^4 \ldots 10^6$
$\lambda_{ski} := 0.2$
$\rho_{ski} := 1000$
$C_{ski} := 1.54 \times 10^3$
$\rho_{snow} := 300$
$C_{snow} := 2.2 \cdot 10^3$
$\lambda_{snow} := 0.2$ $$D_{snow} := \frac{\lambda_{snow}}{\rho_{snow} \cdot C_{snow}}$$

s
$R := 0.1, 0.2 \ldots 10$
ohm
$C := 10^{-4}, 2 \cdot 10^{-4} \ldots 2 \cdot 10^{-2}$
F
$t(R, C) := R \cdot C$ $$D_{ski} := \frac{\lambda_{ski}}{\rho_{ski} \cdot C_{ski}}$$

$\Delta := 0.01, 0.02 \ldots 10$
$t := 0, 10^{-4} \ldots 10^{-1}$

As illustrated in FIGS. 65 and 66, the heat diffusion length $L_D$ (e.g., plot 880, FIG. 65), is:

$$L_D(t) := \sqrt{D_{snow} \cdot t}$$

$L_D(10^{-2}) = 5.505 \times 10^{-5}$ $L_D(1) = 5.505 \times 10^{-4}$ $L_D(0.1) = 1.741 \times 10^{-4}$ $L_D(0.01) = 5.505 \times 10^{-5}$ $V := 100$ $S := 0.0025$ $$W(R) := \frac{V^2}{2 \cdot R \cdot S}$$

$d_{heater} := 1.25 \cdot 10^{-5}$ $C_{heater} := 523$ $\rho_{heater} := 4.5 \cdot 10^3$ $l_{melt} := 1 \times 10^{-5}$ $q_{latent} := 3.33 \cdot 10^5$ $$Q = \frac{\pi \Delta^2 S}{4W(R)} \left[ \sqrt{\rho_{snow} c_{snow} \lambda_{snow}} + \sqrt{\rho_{ski} c_{ski} \lambda_{ski}} \right]^2 +$$
$$d_i \cdot q_i \cdot \rho_i + d_{heater} C_{heater} \rho_{heater}$$

$$C(\Delta, R) := \frac{2 \cdot Q(\Delta, R)}{V^2}$$

$$C(20, 2.5) = 8.464 \times 10^{-4}$$

$$\Delta := 20$$

$$d_{heater} \cdot S \cdot \rho_{heater} \cdot \Delta \cdot C_{heater} = 1.471$$

$$l_{melt} \cdot \rho_{snow} \cdot S \cdot q_{latent} = 2.498$$

where S is heater area, $T_m$ is melting temperature, T is ambient temperature, $\lambda$ is a thermal conductivity coefficient, $\rho$ is the material density, and C is the material heat capacity (subscript "ice" denotes ice and/or snow, subscript "ski" denotes substrate material, such as a ski or a snowboard, subscript "heater" denotes a heating element), Q is thermal energy, D is a heat diffusivity coefficient, $\Delta$ denotes temperature change, t is time, V is voltage, d is thickness, R is resistance, W is a power per square meter, $l_{melt}$ is thickness of melted layer, and q is latent heat of melting. Accordingly, for very short pulses, nearly all thermal energy Q is used to melt a thin layer of snow (plot 890, FIG. 66); snow and ski heat capacitance contributes little to Q. A calculation of refreezing time for the melted layer is shown by the following Table 65-2:

TABLE 65-2

$$\lambda_{ski} := 0.5$$
$$\lambda_{snow} := 0.5$$

$$t_{cool}(\Delta, R) := \left[ \frac{2Q(\Delta, R)}{\Delta \cdot S \cdot \left( \sqrt{\lambda_{snow} \cdot \rho_{snow} \cdot C_{snow}} + \sqrt{\lambda_{ski} \cdot \rho_{ski} \cdot C_{ski}} \right)} \right]^2$$

$$t_{cool}(20, 1) = 0.013 \text{"s"}$$

Table 65-3 illustrates typical capacities of common batteries used as power supplies in pulse brake applications. For example, a pair of small AA batteries may be used in a pulse brake application by a cross-country skier for about a one-hour run.

TABLE 65-3

| | Battery size | Type | Voltage | A · h | watt · hour |
|---|---|---|---|---|---|
| 1. | AA, Duracell | ordinary | 1.5 | 2.85 | 4.275 |
| | two of them | | 3 | 5.7 | 8.55 |
| 2. | C, Duracell | ordinary | 1.5 | 7.8 | 11.7 |
| | two of them | | 3 | 15.6 | 23.4 |
| 3. | D, Duracell | ordinary | 1.5 | 15 | 22.5 |
| | two of them | | 3 | 30 | 45 |
| 4. | D, Varta | ordinary | 1.5 | 16.5 | 24.75 |
| | two of them | | 3 | 33 | 49.5 |
| 5. | 9v, Duracell | ordinary | 9 | 0.58 | 5.22 |
| | two of them | | 18 | 1.16 | 10.44 |
| | 4 of them no converter is needed | | 36 | | 20.88 |
| 6. | D-Type TL2300/S D, Li two of them | Li-ion rechargeable | 3.6 7.2 | 16.5 33 | 59.4 ($20.65) 118.4 ($41.30) |

TABLE 65-3-continued

| | Battery size | Type | Voltage | A · h | watt · hour |
|---|---|---|---|---|---|
| 7. | DD TL5137/TDD, Li | Li-ion rechargeable | 3.6 | 35 | 126 ($48.93) |
| 8. | AA TL5104/PT2 AA, Li | Li-ion rechargeable | 3.6 | 2.1 | 7.56 |
| 9. | C TL2200/SC, Li, 7200 mAh two of them | Li-ion rechargeable | 3.6 7.2 | 7.2 14.4 | 25.92 ($16.73) 52 |

Figure 67:
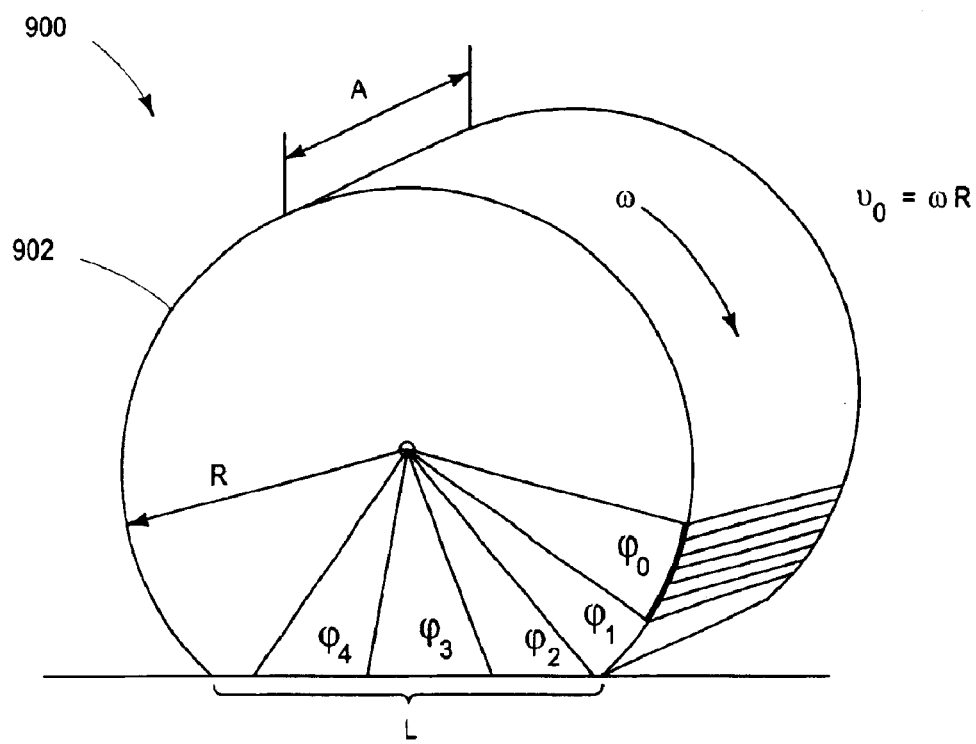
FIG. 67 shows one analysis of one slider illustrating friction-enhancement for an embodiment wherein the slider forms a tire.

FIG. 67 shows one analysis of one slider 900 illustrating friction-enhancement for an embodiment wherein the slider forms a tire 902. Slider 900 shows tire 902 with differing thermal zones in support of this analysis: $\phi_0$ is a heated zone; $\phi_1$ is an air-cooled zone; $\phi_2$ is a melting zone; $\phi_3$ is a refreezing zone; $\phi_4$ is a bonding zone; $\omega_0$ is angular velocity of the tire; $v_0$ is linear velocity of the car; R is the radius of tire 902; and A is the width of tire 902. Assuming that heated zone $\phi_0$ is uniformly heated with total power w', then the power density per square meter may conform to the following:

$$w = \frac{w'}{R \cdot \varphi_0 \cdot A}. \quad \text{(Eq. 67-1)}$$

Each point inside the heated zone $\phi_0$ may be "surface-heated" for time t as follows:

$$t = \frac{\varphi_0}{\omega} = \frac{\varphi_0 R}{v}. \quad \text{(Eq. 67-2)}$$

For example, at $$v_0 = 30 \frac{m}{s} \left( 108 \frac{km}{h} \right) \text{ and } \varphi_0 R = 0.1 \text{ m},$$

$$t \approx \frac{0.1 \text{ m} \cdot \text{s}}{3 \cdot 10^1 \text{ m}} \approx 3.3 \cdot 10^{-3} \text{ s}$$

and the heated zone $\phi_0$ acquires an energy density of:

$$Q = t \cdot w = \frac{w' \cdot \varphi_0 \cdot R}{R \cdot \varphi_0 A \cdot v_0} = \frac{w'}{A \cdot v_0}. \quad \text{(Eq. 67-3)}$$

Estimating a minimum Q and assuming 10 $\mu$m thickness of melted ice yields the following:

$$Q = d \cdot q \cdot \rho_i, \text{ where} \quad \text{(Eq. 67-4)}$$

d is melted layer thickness in $\phi_2$-zone, $\rho_i$ is ice density, and q is the ice latent heat of fusion. Accordingly, $$d \cdot q \cdot \rho_i = \frac{w'}{A \cdot v_0}, \quad \text{(Eq. 67-5)}$$

and, therefore, $$w' = A \cdot v_0 \cdot d \cdot q \cdot \rho_i. \quad \text{(Eq. 67-6)}$$

An estimate of the re-freeze area which would increase the friction coefficient to $\mu = 0.5$ is now determined. For example, at a normal pressure of $2 \cdot 10^5$ Pa, the friction force per square meter corresponding to $\mu=0.5$ is $10^5$ Pa. For an ice/rubber interface, adhesion shear strength is about 1 Mpa; thus only about 10% of the ice/tire contact area may need refreezing (e.g., refreezing zone $\phi_3$) to provide $\mu=0.5$. When a melted layer of ice has a thickness of about 3.3 $\mu$m, the power requirement is about 500 watts for a velocity $v_0$ equal to about $$108\frac{km}{h}.$$

For a velocity $v_0$ of about $$7.2\frac{km}{h}$$

at the same thickness, the power requirement is only about 33 watts.

At a velocity $v_0$ of 20 km/h, every point on the tire surface may be in contact with the ice for about $$t = \frac{2 \cdot 10^{-1} m}{6 \text{ m/s}} = 30 \text{ m sec.}$$

This time is available for melting and refreezing actions, and is long enough to accomplish such actions.

Figure 68:
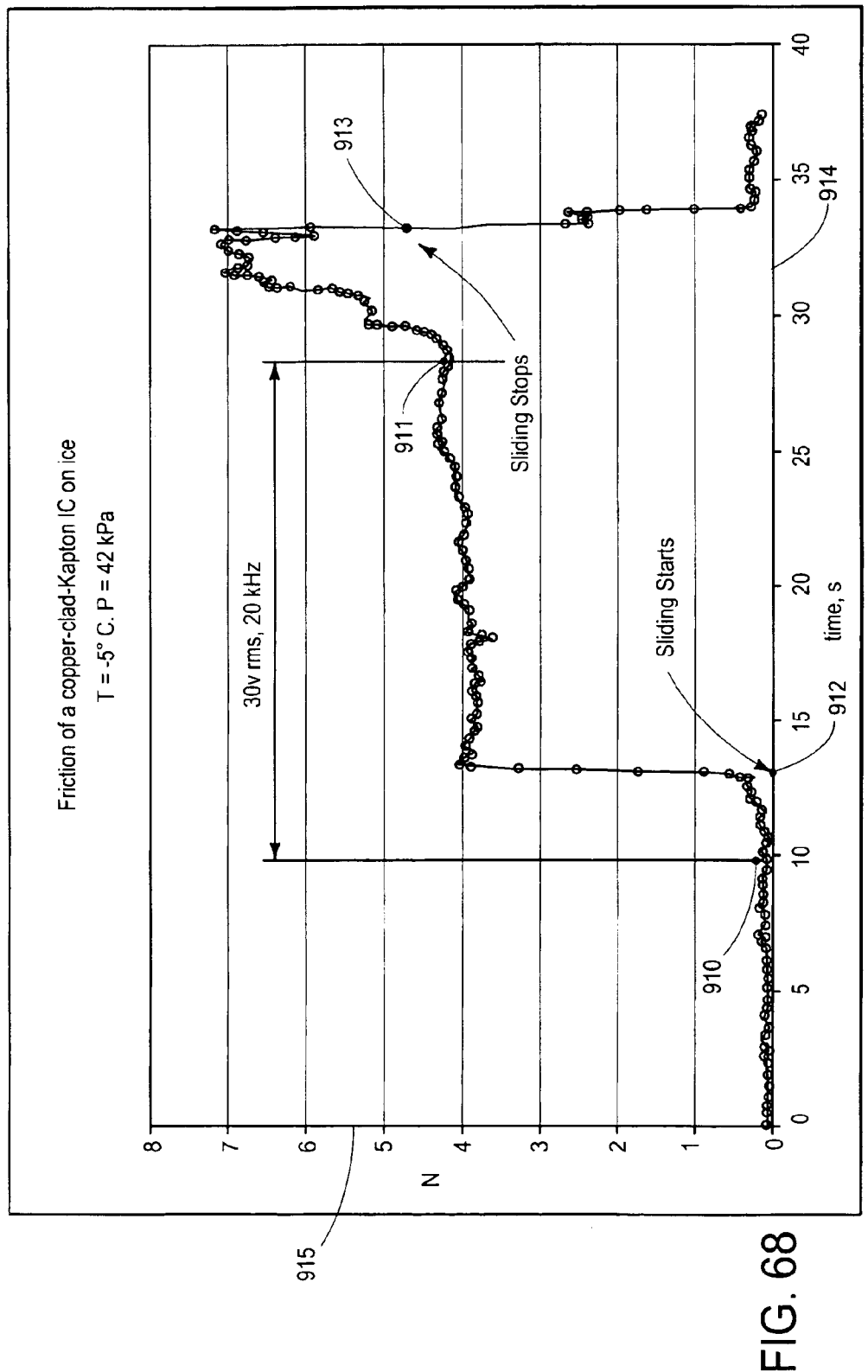
FIGS. 68 and 69 illustrate one frictional analysis between a slider and snow.
Figure 69:
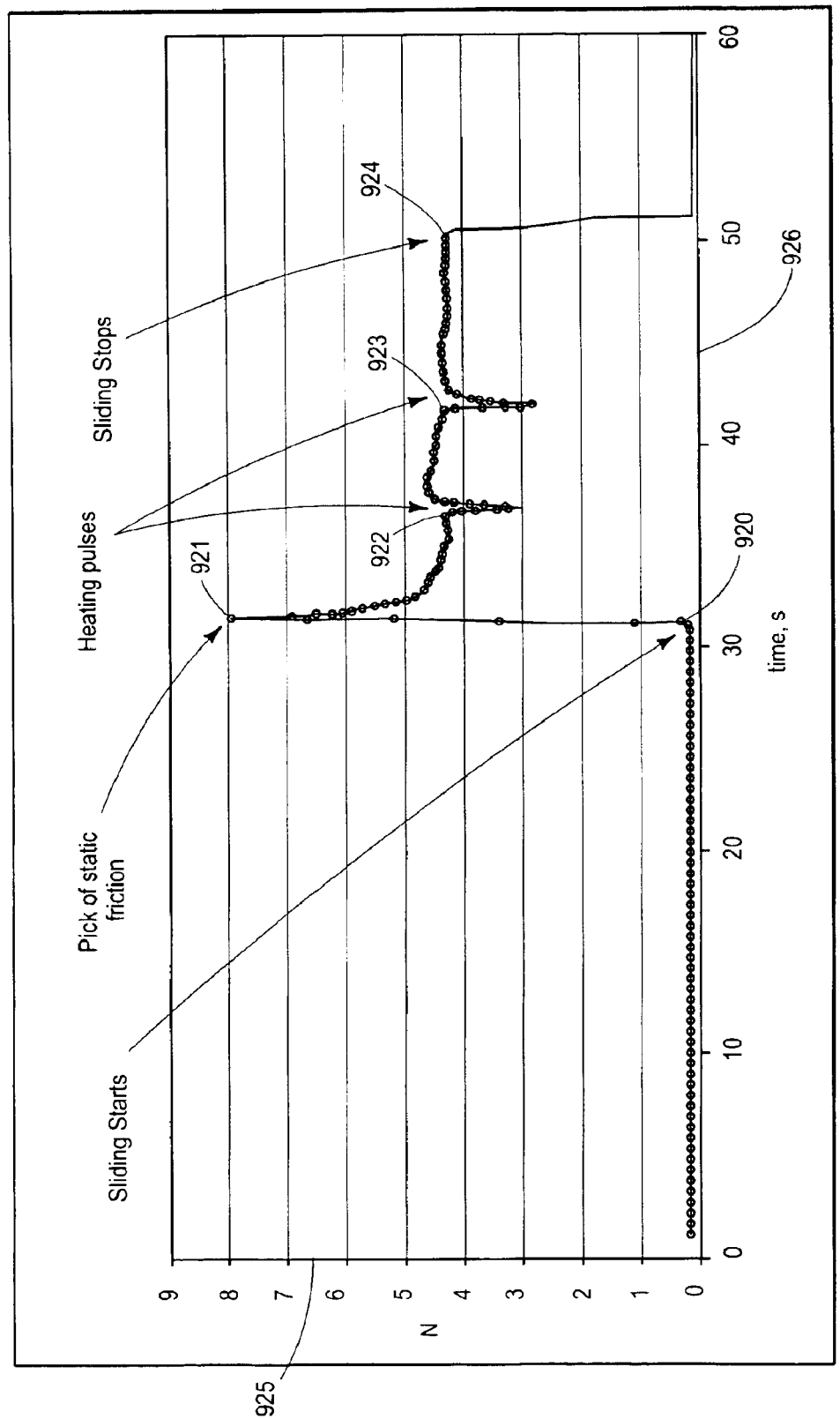

FIGS. 68 and 69 illustrate experimental results in which ice friction was reduced by either application of HF-power, as in FIG. 68, or by application of low-energy heating pulses, as in FIG. 69. In FIG. 68, Y-axis 915 represents frictional force and X-axis 914 represents time in seconds. For example, FIG. 68 shows a frictional force N versus time for the slider in motion on ice with an ambient temperature T of about −5° C., a normal pressure P of about 42 kPa, and a sliding velocity v of about 1 cm/s. In this embodiment, the system modifying the friction includes an interdigitated circuit attached to a base of the slider that interfaces with ice. The interdigitated circuit includes a copper clad Kapton polyimid film. The interdigitated circuit also includes copper electrodes having an inter electrode spacing of about 75 $\mu$m. A power supply provided HF AC voltage of about 30V rms at about 20 kHz to the electrodes. The electrodes generated heat in ice of about 100 watts/m² density. When the slider moves at a velocity of about $$1\frac{cm}{s}$$

and the power is applied to the electrodes, the friction force is lower by about 40%. For example, the power supply provided the HF-power to the electrodes at time point 910 (e.g., about time t equal to 10 s). The electrodes converted the power into thermal energy which diffused in the direction of the ice. The slider begins sliding at time point 912 (e.g., about time t equal to 13 s). In this embodiment, the HF-power is shut down at time point 911 (e.g., about time t equal to 28 s). Without the HF-power the ice friction rises from 4 N to 7 N. The latter is a background ice friction force with no power applied to the slider, which stopped at time point 913 (e.g., about time t equal to 33 s).

In this embodiment, the continuous HF-power supply increases the ice temperature, thus decreasing ice friction without generating ice melt and, thereby modifying the coefficient of friction.

FIG. 69 shows a frictional force N versus time for the slider in motion on snow with an ambient temperature T of about −10° C., a normal pressure P of about 215 kPa, and a sliding velocity v of about 3 mm/s. In FIG. 69, Y-axis 925 represents frictional force and X-axis 926 represents time in seconds. In this embodiment, the system modifying the friction includes a thin titanium-foil heater. Short heating pulses of DC power are applied to the heater at time moments 922 and 923 causing decrease in snow friction, as opposed to the braking effect by the same system described earlier. The main difference of this experiment is the pulse braking; as shown in FIG. 69, the magnitude of heating energy is not sufficient to melt snow. Without a melted layer, refreezing does not occur and there is no braking action. Nevertheless, since the heater warms snow, the friction decreases. In the experiment of FIG. 69, the snow surface is heated by the pulses from −10° C. to about −1° C. The slider experiences a rapid increase in static friction between the ice and the slider at time point 921 (e.g., about time t equal to 31 s). The power supply provides pulse power at time points 922 and 923 (time t equal to 38 s and 42 s, respectively) to the electrodes. In this embodiment, the slider stops at time point 924, when time t equals 50 s.

In some embodiments, the electrodes of the interdigitated circuit are made of hard conductive materials, such as titanium nitride, zirconium oxide (e.g., zirconia) doped with other oxides (e.g., ittrium oxide), and titanium and stainless steel foils with TiN coatings, to increase abrasion resistance of the circuit. Other embodiments may provide electrode protection through coatings of protective films, such as alumina.

Since certain changes may be made in the above methods and systems without departing from the scope, it is intended that all matter contained in the above description or shown in the accompanying drawings be interpreted as illustrative and not in a limiting sense. It is also to be understood that the following claims are to cover all generic and specific features described herein, and all statements of the scope which, as a matter of language, might be said to fall there between.

What is claimed is:

1. A method of thermally modifying an interface between ice and an object, comprising the steps of:
    applying heating energy to the interface to melt an interfacial layer of ice; and
    limiting duration of the step of applying heating energy to the interface such that the heating energy has a heat diffusion distance within the ice that extends no more than through the thickness of the interfacial layer of ice.

2. The method of claim 1, wherein the step of applying heating energy comprises the step of applying power at the interface with a magnitude that is at least about inversely proportional to a magnitude of energy used to melt the interfacial layer of ice.

3. The method of claim 2, wherein the step of limiting duration comprises the step of limiting duration of the step of applying power at the interface such that the duration is at least about inversely proportional to a square of the magnitude of the power.

4. The method of claim 1, wherein the step of applying heating energy comprises the step of applying power to the interface with a magnitude that is substantially inversely proportional to a magnitude of energy used to melt the interfacial ice, and wherein the step of limiting duration comprises the step of limiting the duration so that the duration is substantially inversely proportional to a square of the magnitude of the power.

5. The method of claim 1, further comprising the step of facilitating refreezing of the interfacial layer of the ice to affect a coefficient of friction between the object and the ice.

6. The method of claim 5, the step of facilitating comprising one or more of the following steps: (1) waiting for refreezing after the step of limiting duration; (2) blowing cold air at the interface; and (3) misting water at the interface.

7. The method of claim 1, the object selected from the group of an aircraft structure, a windshield, a mirror, a headlight, a power line, a ski lift structure, a rotor surface of a windmill, a rotor surface of a helicopter, a roof, a deck, a building structure, a road, a bridge structure, a freezer structure, an antenna, a satellite, a railroad structure, a tunnel structure, a cable, a road sign, a snowshoe, a ski, a snowboard, a skate and a shoe.

8. The method of claim 1, wherein the step of applying heating energy to the interface comprises applying heating energy to the interface to melt an interfacial layer of ice having a thickness that is less than about five centimeters.

9. The method of claim 1, wherein the step of applying heating energy to the interface comprises applying heating energy to the interface to melt an interfacial layer of ice having a thickness that is less than about one millimeter.

10. The method of claim 1, wherein the step of applying heating energy to the interface comprises applying heating energy to the interface to melt an interfacial layer of ice having a thickness that is between about one micron and one millimeter.

11. The method of claim 1, wherein the step of limiting duration of the step of applying heating energy to the interface comprises the step of applying heating energy to the interface for a maximum of 100 s.

12. The method of claim 1, wherein the step of applying heating energy to the interface comprises the step of applying power to a heating element in thermal communication with the interface.

13. The method of claim 12, wherein the step of applying heating energy to the interface comprises the step of applying power to a heating element within the object.

14. The method of claim 12, wherein the step of applying heating energy to the interface comprises the step of applying power to a heating element at a surface of the object and in contact with the interface.

15. The method of claim 12, wherein the step of applying heating energy to the interface comprises the step of electrically resisting the power with the heating element.

16. The method of claim 12, wherein the step of limiting duration comprises the step of controlling duration of the step of applying power according to the following relationship:

$$t = \frac{\pi(T_m - T)^2}{4W^2}\left[\sqrt{\rho_i c_i \lambda_i} + \sqrt{\rho_s c_s \lambda_s}\right]^2,$$

where t is the duration, $T_m$ is an ice melting temperature, T is ambient temperature, $\lambda_i$ is a thermal conductivity coefficient of the ice, $\sigma_i$ is a material density of the ice, $c_i$ is a heat capacity of the ice, $\lambda_s$ is a thermal conductivity coefficient of one or both of the object and the heating element, $\sigma_s$ is a material density of one or both of the object and the heating element, $c_s$ is material heat capacity of one or both of the object and the heating element, and W is the power.

17. The method of claim 12, wherein the step of applying power comprises the step of controlling energy according to the following relationship:

$$Q = \frac{\pi(T_m - T)^2}{4W}\left[\sqrt{\rho_i c_i \lambda_i} + \sqrt{\rho_s c_s \lambda_s}\right]^2,$$

where Q is energy that thermally melts the interfacial ice, $T_m$ is a temperature to melt the interfacial ice, T is ambient temperature, $\lambda_i$ is a thermal conductivity coefficient of the ice, $\sigma_i$ is a material density of the ice, $c_i$ is material heat capacity of the ice, $\lambda_s$ is a thermal conductivity coefficient of one or both of the heating element and the object, $\sigma_s$ is a material density of one or both of the heating element and the object, $c_s$ is material heat capacity of one or both of the heating element and the object, and W is the power.

18. The method of claim 12, wherein the step of applying power comprises the step of controlling energy according to the following relationship:

$$Q = \frac{\pi(T_m - T)^2}{4W}\left[\sqrt{\rho_i c_i \lambda_i} + \sqrt{\rho_s c_s \lambda_s}\right]^2 + d_i \cdot q_i \cdot \rho_i + d_{heater} C_{heater} \rho_{heater} (T_m - T),$$

where
Q is the energy, $T_m$ is a temperature for melting the interfacial ice, T is ambient temperature, $\lambda_i$ is a thermal conductivity coefficient of the ice, $\sigma_i$ is a material density of the ice, $c_i$ is material heat capacity of the ice, $\lambda_s$ is a thermal conductivity coefficient of one or both of the heating element and the object, $\sigma_s$ is a material density of one or both of the heating element and the object, $c_s$ is material heat capacity of one or both of the heating element and the object, $d_i$ is a thickness of an interfacial layer of ice, $\sigma_i$ is ice density, $q_i$ is ice latent heat of fusion, W is the power, and $C_{heater}$ and $\sigma_{heater}$ are specific heat capacity and density, respectively, of the heating element.

19. The method of claim 1, further comprising the step of repeating the steps of applying and limiting in a periodic manner to generate a desired coefficient of friction between the object and the ice.

20. The method of claim 1, the step of limiting duration comprising the step of limiting the duration to between about 1 ms to 10 s.

21. The method of claim 1, further comprising reapplying power at the interface after the interfacial layer refreezes to selectively control a coefficient of friction between the ice and the object while the object moves over the ice.

22. The method of claim 1, the ice comprising snow.

23. The method of claim 1, the object comprising a slider.

24. The method of claim 23, the slider comprising one of a shoe, a snowboard, and a ski.

25. A system for thermally modifying an interface between ice and an object, comprising:
a power supply for generating power;
a heating element that is within the object or in contact with the interface and that is coupled to the power supply, to convert the power into heat at the interface; and
a controller coupled to the power supply to limit a duration in which power is applied to the heating element such that only an interfacial layer of ice melts at the interface.

26. The system of claim 25, the interfacial layer having a thickness less than about five centimeters.

27. The system of claim 25, the interfacial layer having a thickness between about one micron and one millimeter.

28. The system of claim 25, the power supply configured for generating the power with a magnitude that is substantially inversely proportional to a magnitude of energy which melts the interfacial ice; the controller configured to limit the duration such that the duration has a substantially inverse proportion to a square of the magnitude of the power.

29. The system of claim 25, further comprising a sensor coupled with the controller for detecting temperature of the interface and for generating a feedback signal representative of the temperature to the controller.

30. The system of claim 25, the power supply comprising at least one of a battery, a capacitor, a flywheel and a high-voltage power supply.

31. The system of claim 30, the capacitor comprising at least one of a supercapacitor, electrolytic capacitor and an ultracapacitor.

32. The system of claim 25, the heating element comprising a thin film of conductive material that transfers the heat from the heating element to the interface to change a coefficient of friction between the object and the ice.

33. The system of claim 25, the heating element comprising a semiconductor material that converts the power into heat at the interface to change a coefficient of friction between the object and the ice.

34. The system of claim 25, further comprising a switch coupled to the controller for receiving a control signal from the controller to limit the duration in which the power is applied to the heating element.

35. The system of claim 25, the power supply, heating element and controller being configured with an object that forms the ice-to-object interface, the object being selected from the group consisting essentially of an aircraft, a windshield, a mirror, a headlight, a power line, a ski lift structure, a rotor structure of a windmill, a rotor structure of a helicopter, a roof, a deck, a building structure, a road, a bridge structure, a freezer structure, an antenna, a railroad structure, a tunnel structure, a cable, a train structure, a ship structure, a drilling platform, an icemaker structure and a road sign.

* * * * *

UNITED STATES PATENT AND TRADEMARK OFFICE
CERTIFICATE OF CORRECTION

PATENT NO.         : 6,870,139 B2
APPLICATION NO.    : 10/364438
DATED              : March 22, 2005
INVENTOR(S)        : Victor Petrenko It is certified that error appears in the above-identified patent and that said Letters Patent is hereby corrected as shown below:

Column 1, lines 39-40, 42 and 43, the word "scraper" should read --scrapper--; lines 42 and 43, each occurrence of the word "scrappers" should read --scrapers--
Column 4, line 1, the word "reapplyied" should read --reapplied--
Column 7, line 23, the word "freeing" should read --freezing--
Column 14, line 50, "Q ≈12Vx100 Ax3600 sec" should read --Q ≈12Vx100$A$x3600sec--
Column 19, line 39, the words "where l" should read --where $l$--;line 62, the words "l increases" should read --$l$ increases--
Column 20, line 6, the words "as f" should read --as $l$--; Line 36, the words "in l." should read --in $l$.--; line 58, the words "given l." should read --given $l$.--

Column 21, line 5, each occurrence of " $\frac{1}{2}$ ln " should read -- $\frac{1}{2}$ $l$n--; lines 11 and 14, each occurrence of "ln" should read --$l$n--; line 18, "0 ≤ɑ≤ " should read --0 ≤ɑ≤$l$ --;

line 25, "l=a+b" should read --$l$=a+b--; line 26, "a=b=0.5 l" should read --a=b=0.5$l$--;
Column 25, line 17, the symbol "Ω" should read -- $\omega$ --;
Column 28, line 6, "tune of de-icer" should read -- ? --;
Column 34, line 58, "Δ(x,t)" should read -- Δ(t)--

Signed and Sealed this

Twenty-sixth Day of June, 2007

JON W. DUDAS
*Director of the United States Patent and Trademark Office*